United States Patent
Andersen et al.

[11] Patent Number: 6,030,673
[45] Date of Patent: *Feb. 29, 2000

[54] MOLDED STARCH-BOUND CONTAINERS AND OTHER ARTICLES HAVING NATURAL AND/OR SYNTHETIC POLYMER COATINGS

[75] Inventors: Per Just Andersen; Simon K. Hodson, both of Santa Barbara, Calif.

[73] Assignee: E. Khashoggi Industries, LLC, Santa Barbara, Calif.

[*] Notice: This patent is subject to a terminal disclaimer.

[21] Appl. No.: 09/246,163

[22] Filed: Feb. 8, 1999

Related U.S. Application Data

[60] Continuation of application No. 08/691,861, Aug. 2, 1996, Pat. No. 5,868,824, which is a division of application No. 08/288,664, Aug. 9, 1994, Pat. No. 5,660,900, which is a continuation-in-part of application No. 08/288,667, Aug. 9, 1994, Pat. No. 5,783,126, which is a continuation-in-part of application No. 08/218,971, Mar. 25, 1994, Pat. No. 5,830,305, which is a continuation-in-part of application No. 08/109,100, Aug. 18, 1993, abandoned, which is a continuation-in-part of application No. 08/095,662, Jul. 21, 1993, Pat. No. 5,385,764, which is a continuation-in-part of application No. 07/982,383, Nov. 25, 1992, abandoned.

[51] Int. Cl.[7] .............................. B32B 3/26; B32B 31/06; B32B 31/12

[52] U.S. Cl. .................. 428/36.4; 206/524.3; 206/524.7; 428/36.5; 428/317.3; 428/317.9; 428/318.8; 428/319.1; 428/319.3; 428/319.7; 428/913; 156/78; 427/316; 427/399

[58] Field of Search ............................ 428/310.5, 317.3, 428/317.9, 318.8, 319.1, 319.3, 319.7, 319.9, 36.4, 36.5, 913; 206/524.3, 524.7; 156/78; 427/316, 399

[56] References Cited

U.S. PATENT DOCUMENTS

| | | | |
|---|---|---|---|
| 2,432,971 | 12/1947 | Ruthman et al. | 106/86 |
| 2,968,561 | 1/1961 | Birnkrant | 99/89 |
| 3,042,578 | 7/1962 | Denning | 162/171 |
| 3,052,595 | 9/1962 | Pye | 162/164 |
| 3,117,014 | 1/1964 | Klug | 106/213 |

(List continued on next page.)

FOREIGN PATENT DOCUMENTS

| | | |
|---|---|---|
| 0 032 802 A1 | 7/1981 | European Pat. Off. . |
| 0 118 240 B1 | 9/1984 | European Pat. Off. . |
| 0 265 745 A2 | 5/1988 | European Pat. Off. . |

(List continued on next page.)

OTHER PUBLICATIONS

Andersen, *Control and Monitoring of Concrete Production—A Study of Particle packing and Rheology*, The Danish Academy of TEchnical Sciences (1990), no month.

Andersen, *Effect of Organic Superplasticizing Admixtures and Their Components on Zeta Potential and Related Properties of Cement Materials*, Pennsylvania State University (1987), no month.

(List continued on next page.)

*Primary Examiner*—Blaine Copenheaver
*Attorney, Agent, or Firm*—Workman, Nydegger & Seeley

[57] ABSTRACT

Compositions, methods, and systems for manufacturing articles, particularly containers and packaging materials, having a particle packed, highly inorganically filled, cellular matrix are disclosed. Suitable inorganically filled mixtures are prepared by mixing together a starch-based binder, a solvent, inorganic aggregates, and optimal admixtures, e.g., fibers, mold-releasing agents, rheology-modifying agents, plasticizers, coating materials, and dispersants, in the correct proportions to form an article which has the desired performance criteria. The inorganically filled mixtures have a predetermined viscosity and are heated between molds at an elevated temperature and pressure to produce form-stable articles having a desired shape and a selectively controlled cellular, structure matrix. The molded articles may be placed in a high humidity chamber to obtain the necessary flexibility for their intended use. The articles may be manufactured to have properties substantially similar to articles presently made from conventional materials like paper, paperboard, polystyrene, plastic, or other organic materials. They have especial utility in the mass-production of containers, particularly food and beverage containers.

53 Claims, 13 Drawing Sheets

U.S. PATENT DOCUMENTS

| | | | |
|---|---|---|---|
| 3,493,382 | 2/1970 | Ryan et al. | 99/1 |
| 3,759,729 | 9/1973 | Fahn | 106/90 |
| 3,850,863 | 11/1974 | Clendinning et al. | 260/7.5 |
| 3,867,324 | 2/1975 | Clendinning et al. | 260/23 H |
| 3,914,359 | 10/1975 | Bevan | 264/45.3 |
| 3,921,333 | 11/1975 | Clendinning et al. | 47/37 |
| 3,949,145 | 4/1976 | Otey et al. | 428/423 |
| 3,962,155 | 6/1976 | Usamoto et al. | 260/2.5 R |
| 3,968,004 | 7/1976 | Coffey et al. | 162/152 |
| 4,017,324 | 4/1977 | Eggers | 106/288 |
| 4,043,862 | 8/1977 | Roberts | 162/135 |
| 4,044,166 | 8/1977 | Koizumi | 426/560 |
| 4,070,196 | 1/1978 | Kraak et al. | 106/38.35 |
| 4,076,846 | 2/1978 | Nakatsuka et al. | 426/62 |
| 4,080,213 | 3/1978 | Mori et al. | 106/38.5 R |
| 4,089,691 | 5/1978 | Cummisford et al. | 106/38.4 |
| 4,094,077 | 6/1978 | Schrader et al. | 34/155 |
| 4,124,550 | 11/1978 | Kobayashi et al. | 260/23.3 |
| 4,133,784 | 1/1979 | Otey et al. | 260/17.4 |
| 4,149,550 | 4/1979 | Green | 131/266 |
| 4,172,154 | 10/1979 | von Rymon Lipinski | 426/549 |
| 4,204,337 | 5/1980 | Roos et al. | 34/31 |
| 4,210,490 | 7/1980 | Taylor | 162/175 |
| 4,225,247 | 9/1980 | Hodson | 366/40 |
| 4,225,383 | 9/1980 | McReynolds | 162/156 |
| 4,230,502 | 10/1980 | Lustig et al. | 106/314 |
| 4,248,664 | 2/1981 | Atkinson et al. | 162/14.5 |
| 4,249,991 | 2/1981 | Baes et al. | 162/152 |
| 4,303,690 | 12/1981 | Haas, Sr. et al. | 426/549 |
| 4,306,059 | 12/1981 | Yokobayashi et al. | 536/1 |
| 4,328,136 | 5/1982 | Blount | 523/204 |
| 4,329,177 | 5/1982 | George | 106/38.35 |
| 4,377,440 | 3/1983 | Gasland | 162/101 |
| 4,378,271 | 3/1983 | Hargreaves et al. | 162/145 |
| 4,394,930 | 7/1983 | Korpman | 220/444 |
| 4,410,571 | 10/1983 | Korpman | 427/385.5 |
| 4,438,685 | 3/1984 | Haas, Sr. et al. | 99/342 |
| 4,445,970 | 5/1984 | Post et al. | 162/135 |
| 4,454,268 | 6/1984 | Otey et al. | 524/47 |
| 4,462,835 | 7/1984 | Car | 106/75 |
| 4,482,386 | 11/1984 | Wittwer et al. | 106/135 |
| 4,508,595 | 4/1985 | Gasland | 162/158 |
| 4,524,682 | 6/1985 | Haas, Sr. et al. | 99/477 |
| 4,529,653 | 7/1985 | Hargreaves et al. | 428/450 |
| 4,529,662 | 7/1985 | Lancaster et al. | 428/450 |
| 4,529,663 | 7/1985 | Lancaster et al. | 428/450 |
| 4,545,854 | 10/1985 | Gomez et al. | 162/135 |
| 4,550,655 | 11/1985 | Haas, Sr. et al. | 99/450.4 |
| 4,552,463 | 11/1985 | Hodson | 366/295 |
| 4,562,218 | 12/1985 | Fornadel et al. | 524/15 |
| 4,567,049 | 1/1986 | Haas, Sr. et al. | 426/275 |
| 4,588,443 | 5/1986 | Bache | 106/97 |
| 4,595,623 | 6/1986 | Du Pont et al. | 428/195 |
| 4,602,590 | 7/1986 | Haas, Sr. et al. | 118/13 |
| 4,613,627 | 9/1986 | Sherman et al. | 521/68 |
| 4,623,150 | 11/1986 | Moehlman et al. | 273/362 |
| 4,624,855 | 11/1986 | Haas, Sr. et al. | 426/501 |
| 4,625,856 | 12/1986 | Haas, Sr. et al. | 198/457 |
| 4,648,314 | 3/1987 | Plight et al. | 99/373 |
| 4,655,840 | 4/1987 | Wittwer et al. | 106/126 |
| 4,669,603 | 6/1987 | Haas, Sr. et al. | 198/432 |
| 4,673,438 | 6/1987 | Wittwer et al. | 106/26 |
| 4,694,741 | 9/1987 | Haas, Sr. et al. | 99/354 |
| 4,710,117 | 12/1987 | Haas, Sr. et al. | 425/126 R |
| 4,710,422 | 12/1987 | Fredenucci | 428/248 |
| 4,711,669 | 12/1987 | Paul et al. | 106/38.51 |
| 4,749,583 | 6/1988 | Branch | 426/549 |
| 4,753,710 | 6/1988 | Langley et al. | 162/164.3 |
| 4,755,494 | 7/1988 | Ruben | 501/148 |
| 4,775,580 | 10/1988 | Dighton | 428/284 |
| 4,789,244 | 12/1988 | Dunton et al. | 366/12 |
| 4,814,012 | 3/1989 | Paul et al. | 106/38.51 |
| 4,828,650 | 5/1989 | Wagle et al. | 162/168.1 |
| 4,833,191 | 5/1989 | Bushway et al. | 524/473 |
| 4,846,932 | 7/1989 | Karita et al. | 162/127 |
| 4,863,655 | 9/1989 | Lacourse et al. | 264/53 |
| 4,872,913 | 10/1989 | Dunton et al. | 106/88 |
| 4,889,428 | 12/1989 | Hodson | 366/1 |
| 4,892,590 | 1/1990 | Gill et al. | 106/214 |
| 4,912,069 | 3/1990 | Ruben | 501/148 |
| 4,919,758 | 4/1990 | Wagle et al. | 162/175 |
| 4,921,250 | 5/1990 | Ayres | 273/58 R |
| 4,923,665 | 5/1990 | Andersen et al. | 264/259 |
| 4,925,530 | 5/1990 | Sinclair et al. | 162/164.1 |
| 4,927,655 | 5/1990 | Ito | 426/549 |
| 4,927,656 | 5/1990 | Ito | 426/549 |
| 4,941,922 | 7/1990 | Synder | 106/214 |
| 4,943,349 | 7/1990 | Gomez | 102/158 |
| 4,944,595 | 7/1990 | Hodson | 366/65 |
| 4,952,278 | 8/1990 | Gregory et al. | 162/141 |
| 4,953,453 | 9/1990 | Haas, Sr. et al. | 99/373 |
| 4,957,558 | 9/1990 | Ueda et al. | 106/137 |
| 4,957,754 | 9/1990 | Munk et al. | 426/138 |
| 4,963,603 | 10/1990 | Felegi, Jr. et al. | 524/13 |
| 4,979,992 | 12/1990 | Bache | 106/644 |
| 5,032,413 | 7/1991 | Haas et al. | 426/231 |
| 5,032,414 | 7/1991 | Haas et al. | 426/237 |
| 5,035,930 | 7/1991 | Lacourse et al. | 428/35.6 |
| 5,039,003 | 8/1991 | Gordon et al. | 229/120.32 |
| 5,039,378 | 8/1991 | Pommier et al. | 162/128 |
| 5,043,196 | 8/1991 | Lacourse et al. | 428/35.6 |
| 5,048,403 | 9/1991 | Haas, Sr. et al. | 99/355 |
| 5,059,642 | 10/1991 | Jane et al. | 524/52 |
| 5,061,346 | 10/1991 | Taggart et al. | 162/175 |
| 5,071,512 | 12/1991 | Bixler et al. | 162/175 |
| 5,076,985 | 12/1991 | Koch et al. | 264/119 |
| 5,082,500 | 1/1992 | Nachtman et al. | 106/900 |
| 5,095,054 | 3/1992 | Lay et al. | 524/47 |
| 5,103,717 | 4/1992 | Haas, Sr. et al. | 99/353 |
| 5,104,487 | 4/1992 | Taggart et al. | 162/168.3 |
| 5,104,669 | 4/1992 | Wolke et al. | 426/94 |
| 5,106,880 | 4/1992 | Miller et al. | 521/54 |
| 5,108,677 | 4/1992 | Ayres | 264/112 |
| 5,108,807 | 4/1992 | Tucker | 428/35.2 |
| 5,110,413 | 5/1992 | Steer | 162/145 |
| 5,110,525 | 5/1992 | Kolsky et al. | 264/122 |
| 5,110,838 | 5/1992 | Tokiwa et al. | 521/81 |
| 5,115,000 | 5/1992 | Jane et al. | 524/47 |
| 5,122,231 | 6/1992 | Anderson | 162/175 |
| 5,126,013 | 6/1992 | Wiker et al. | 162/156 |
| 5,126,014 | 6/1992 | Chung | 162/164.6 |
| 5,132,155 | 7/1992 | Singh et al. | 428/114 |
| 5,134,179 | 7/1992 | Felegi, Jr. et al. | 524/13 |
| 5,141,797 | 8/1992 | Wheeler | 428/195 |
| 5,153,037 | 10/1992 | Altieri | 428/35.6 |
| 5,156,718 | 10/1992 | Neubert | 162/145 |
| 5,160,368 | 11/1992 | Begovich | 106/154.1 |
| 5,160,676 | 11/1992 | Singh et al. | 264/60 |
| 5,162,126 | 11/1992 | Thorner et al. | 426/138 |
| 5,178,677 | 1/1993 | Haas et al. | 118/25 |
| 5,178,730 | 1/1993 | Bixler et al. | 162/168.3 |
| 5,185,382 | 2/1993 | Neumann et al. | 521/84.1 |
| 5,186,990 | 2/1993 | Starcevich | 428/35.6 |
| 5,194,206 | 3/1993 | Koch et al. | 264/115 |
| 5,201,403 | 4/1993 | Haas, Sr. et al. | 198/575 |
| 5,206,087 | 4/1993 | Tokiwa et al. | 428/403 |
| 5,208,267 | 5/1993 | Newmann et al. | 521/79 |
| 5,221,435 | 6/1993 | Smith, Jr. | 162/164.1 |
| 5,224,595 | 7/1993 | Sugimoto et al. | 206/321 |
| 5,234,977 | 8/1993 | Bastioli et al. | 524/47 |
| 5,234,978 | 8/1993 | Delrue et al. | 524/53 |
| 5,240,561 | 8/1993 | Kaliski | 162/138 |

| | | | |
|---|---|---|---|
| 5,242,078 | 9/1993 | Haas et al. | 220/574 |
| 5,248,702 | 9/1993 | Neumann et al. | 521/84.1 |
| 5,252,271 | 10/1993 | Jeffs | 264/54 |
| 5,253,743 | 10/1993 | Haas, Sr. et al. | 198/347.1 |
| 5,256,711 | 10/1993 | Tokiwa et al. | 525/411 |
| 5,258,430 | 11/1993 | Bastioli et al. | 524/52 |
| 5,262,030 | 11/1993 | Bastioli et al. | 524/52 |
| 5,264,030 | 11/1993 | Tanabe et al. | 106/401 |
| 5,264,080 | 11/1993 | Shaw et al. | 162/135 |
| 5,266,368 | 11/1993 | Miller | 428/35.6 |
| 5,268,187 | 12/1993 | Quinlaln | 426/496 |
| 5,269,845 | 12/1993 | Grunau et al. | 106/692 |
| 5,272,181 | 12/1993 | Boehmer et al. | 521/84.1 |
| 5,273,167 | 12/1993 | Haas et al. | 209/591 |
| 5,273,821 | 12/1993 | Olson et al. | 428/357 |
| 5,275,774 | 1/1994 | Bahr et al. | 264/211 |
| 5,277,764 | 1/1994 | Johansson et al. | 162/175 |
| 5,278,194 | 1/1994 | Tickner et al. | 521/55 |
| 5,279,658 | 1/1994 | Aung | 106/154.1 |
| 5,280,055 | 1/1994 | Tomka | 524/47 |
| 5,284,672 | 2/1994 | Ito | 426/549 |
| 5,286,770 | 2/1994 | Bastioli et al. | 524/52 |
| 5,288,318 | 2/1994 | Mayer et al. | 106/213 |
| 5,288,765 | 2/1994 | Bastioli et al. | 521/84.1 |
| 5,290,350 | 3/1994 | Besnard et al. | 106/214 |
| 5,292,782 | 3/1994 | Bastioli et al. | 524/47 |
| 5,296,526 | 3/1994 | Delrue et al. | 524/50 |
| 5,298,273 | 3/1994 | Ito | 426/549 |
| 5,300,333 | 4/1994 | Wikerson et al. | 428/35.6 |
| 5,308,879 | 5/1994 | Akamatu et al. | 521/84.1 |
| 5,310,070 | 5/1994 | Haas et al. | 220/4.24 |
| 5,314,754 | 5/1994 | Knight | 428/532 |
| 5,317,037 | 5/1994 | Golden et al. | 523/128 |
| 5,317,119 | 5/1994 | Ayres | 219/734 |
| 5,320,669 | 6/1994 | Lim et al. | 106/157 |
| 5,346,541 | 9/1994 | Goldman et al. | 106/163.1 |
| 5,360,473 | 11/1994 | Fleche et al. | 106/210 |
| 5,360,586 | 11/1994 | Wyatt et al. | 264/54 |
| 5,360,828 | 11/1994 | Morrison | 521/64 |
| 5,360,830 | 11/1994 | Bastioli et al. | 521/84.1 |
| 5,360,844 | 11/1994 | Delrue et al. | 524/50 |
| 5,362,776 | 11/1994 | Barenberg et al. | 524/35 |
| 5,362,777 | 11/1994 | Tomka | 524/47 |
| 5,367,067 | 11/1994 | Frische et al. | 536/45 |
| 5,367,320 | 11/1994 | Tiefenbacher et al. | 264/50 |
| 5,372,877 | 12/1994 | Kannankeril | 428/283 |
| 5,376,320 | 12/1994 | Tiefenbacher et al. | 264/50 |
| 5,382,285 | 1/1995 | Morrison | 106/122 |
| 5,382,611 | 1/1995 | Stepto et al. | 524/47 |
| 5,389,322 | 2/1995 | Kim et al. | 264/112 |
| 5,393,804 | 2/1995 | George et al. | 523/128 |
| 5,397,834 | 3/1995 | Jane et al. | 525/54.1 |
| 5,405,564 | 4/1995 | Stepto et al. | 264/115 |
| 5,411,639 | 5/1995 | Kurrie | 162/175 |
| 5,412,005 | 5/1995 | Bastioli et al. | 524/47 |
| 5,462,980 | 10/1995 | Bastioli et al. | 524/47 |
| 5,462,982 | 10/1995 | Bastioli et al. | 524/47 |
| 5,476,621 | 12/1995 | Kustner | 264/53 |
| 5,480,923 | 1/1996 | Schmid et al. | 524/47 |
| 5,500,089 | 3/1996 | Huang et al. | 162/226 |
| 5,506,277 | 4/1996 | Griesbach, III | 521/84.1 |
| 5,512,090 | 4/1996 | Franke et al. | 106/154.1 |
| 5,512,378 | 4/1996 | Bastioli et al. | 426/484 |
| 5,523,293 | 6/1996 | Jane et al. | 514/21 |
| 5,525,281 | 6/1996 | Lörcks et al. | 264/101 |
| 5,531,150 | 7/1996 | Bastioli et al. | 210/640 |
| 5,569,514 | 10/1996 | Ayers | 428/35.7 |
| 5,569,692 | 10/1996 | Bastioli et al. | 524/47 |
| 5,576,049 | 11/1996 | Haas et al. | 427/389.9 |
| 5,589,518 | 12/1996 | Bastiol et al. | 521/55 |
| 5,660,900 | 8/1997 | Andersen et al. | 428/35.6 |
| 5,663,216 | 9/1997 | Tomka | 523/128 |
| 5,683,772 | 11/1997 | Andersen et al. | 428/36.4 |
| 5,705,536 | 1/1998 | Tomka | 521/84.1 |
| 5,711,908 | 1/1998 | Tiefenbacher et al. | 264/232 |
| 5,749,954 | 5/1998 | Law et al. | 106/282 |
| 5,830,548 | 11/1998 | Andersen et al. | 428/36.4 |
| 5,843,544 | 12/1998 | Andersen et al. | 428/36.5 |
| 5,844,023 | 12/1998 | Tomka | 524/47 |
| 5,849,152 | 12/1998 | Arnold et al. | 162/116 |

FOREIGN PATENT DOCUMENTS

| | | |
|---|---|---|
| 0 271 853 B2 | 6/1988 | European Pat. Off. . |
| 0 304 401 B1 | 2/1989 | European Pat. Off. . |
| 0 327 505 A2 | 8/1989 | European Pat. Off. . |
| 0 340 707 A2 | 11/1989 | European Pat. Off. . |
| 0 370 913 B1 | 5/1990 | European Pat. Off. . |
| 0 400 532 A1 | 12/1990 | European Pat. Off. . |
| 0 405 146 B1 | 1/1991 | European Pat. Off. . |
| 0 407 350 A2 | 1/1991 | European Pat. Off. . |
| 0 408 502 A2 | 1/1991 | European Pat. Off. . |
| 0 408 503 A2 | 1/1991 | European Pat. Off. . |
| 0 409 781 A2 | 1/1991 | European Pat. Off. . |
| 0 409 782 A3 | 1/1991 | European Pat. Off. . |
| 0 444 880 B1 | 9/1991 | European Pat. Off. . |
| 0 447 797 A2 | 9/1991 | European Pat. Off. . |
| 0 453 980 A2 | 10/1991 | European Pat. Off. . |
| 0 524 920 A1 | 1/1993 | European Pat. Off. . |
| 0 525 245 A1 | 2/1993 | European Pat. Off. . |
| 0 556 774 A2 | 2/1993 | European Pat. Off. . |
| 0 535 944 A1 | 4/1993 | European Pat. Off. . |
| 0 539 541 B1 | 5/1993 | European Pat. Off. . |
| 0 546 956 A2 | 6/1993 | European Pat. Off. . |
| 0 551 954 A2 | 7/1993 | European Pat. Off. . |
| 0 587 078 A1 | 3/1994 | European Pat. Off. . |
| 0 608 031 A1 | 7/1994 | European Pat. Off. . |
| 0 609 982 A2 | 8/1994 | European Pat. Off. . |
| 1 278 195 | 10/1961 | France . |
| 0 006 390 | 6/1979 | France . |
| 2 642 731 | 8/1991 | France . |
| 3346970 A1 | 7/1985 | Germany . |
| 3420195 | 12/1985 | Germany . |
| 4008862 | 4/1991 | Germany . |
| 63-232636 | 1/1988 | Japan . |
| 3-263441 | 11/1991 | Japan . |
| 5-105815 | 4/1993 | Japan . |
| 5-171049 | 7/1993 | Japan . |
| 5-246417 | 9/1993 | Japan . |
| 5-320401 | 12/1993 | Japan . |
| 32386 | 2/1994 | Japan . |
| 6-32386 | 2/1994 | Japan . |
| 6-135487 | 6/1994 | Japan . |
| 9100590 | 11/1992 | Netherlands . |
| 2050459 | 1/1981 | United Kingdom . |
| 1584387 | 2/1981 | United Kingdom . |
| 2214516 | 6/1989 | United Kingdom . |
| 2208651 | 12/1989 | United Kingdom . |
| WO 87/00828 | 2/1987 | WIPO . |
| WO 89/02225 | 3/1989 | WIPO . |
| WO 91/12186 | 8/1991 | WIPO . |
| WO 92/04408 | 3/1992 | WIPO . |
| WO 93/00399 | 1/1993 | WIPO . |
| WO 93/01242 | 1/1993 | WIPO . |
| WO 94/18384 | 8/1994 | WIPO . |
| WO 94/18388 | 8/1994 | WIPO . |
| WO 96/30186 | 10/1996 | WIPO . |

OTHER PUBLICATIONS

Davidson et al., *Water–Soluble Resins*, New York: Reinhold Publishing Corp., Chapman & Hall, Ltd., London, no date.
Fedors and Landel, An Empirical Method of Estimating the Void Fraction in Mixtures of Uniform particles of Different Size, Powder Technology, 23, 225–231 (1979), no month.

Fumas, Grading Aggregates. I–Mathematical Relations for Beds of Broken Solids of Maximum Density, Industrial and Engineering Chemistry (Sep. 1931).

Greminger, Jr. and Krumel, Alkyl and Hydroxyalkylcellulose, Dow Chemical U.S.A., Midland, Oregon, no date.

Johansen et al., Particle Packing and Concrete Properties, Materials Science of Concrete II, 111–147, no date.

McGeary, Mechanical Packing of Spherical Particles, Journal of the American Ceramic Society, vol. 44, No. 10 (Oct. 1961).

Osbaeck and Johansen, Particle Size Distribution and Rate of Strength Development, Paper for the 89th Annual Meeting of the American Ceramic Society, Inc., Pittsburgh, PA (Apr. 26–30, 1987).

Patankar and Mandal, The Packing of Some Non–Spherical Solid Particles, Trans. J. Brit. Ceram. Soc., 79, 59–66 (1980), no month.

Ridgway and Tarbuck, Particle Mixture Bulk Densities, Chemical and Process Engineering (Feb. 1968).

Robinson, Extrusion Defects, no date.

Stovall et al., Linear Packing Density Model of Grain Mixtures, Powder Technology, 48 1–12 (1986), no month.

Swientek, Formidable Films, Prepared Foods (Sep. 1993).

Vrana, Khashoggi Kin Reported Planning Private Placement of Shares in New Container Firm (Mar. 28, 1993).

Weinrich, R., German Comes Up With Recycled Product to Replace Foam Chips, no date.

Westman and Hugill, The Packing of Particles (1930).

Biomat 32—Production Unit for Natural packaging, Starch Foam Dishes at Burger King's, no date.

Biotec Product Literature, no date.

Plastic–Forming Processes, no date.

Sequa Chemicals, Inc., Technical Data, Sunrez® 700 Series Insolubilizers Coating Additive, no date.

Staley Starch and Specialty Products Group, Technical Data, Sta–Lok® 400 Cationic Potato Starch, no date.

Thermoforming Process Guide, Dow plastics, no date.

Zeneca, Biopol. Nature's Pastic—Born from Nature. Back to Nature, no date.

Zien In The Food Industry, Freemen Industries, Inc., no date.

Tokiwa et al., Development pf Biodegradable Plastics Containing Polycaprolactone and/or Starch, Polym. Mater. Sci. Eng. (1990), no month.

Weingarten, Biodegradable Polymers—Packing Material for the Future?, Forum Werkstofftechnik (1989), no month.

Westerhausen, et al., Investigation for the Use of Biodegradable Synthetic Material for Packaging, (1990), no month.

1 mm

MOLDED STARCH-BOUND CONTAINERS AND OTHER ARTICLES HAVING NATURAL AND/OR SYNTHETIC POLYMER COATINGS

RELATED APPLICATIONS

This application is a continuation of U.S. application Ser. No. 08/691,861, filed Aug. 2, 1996 (U.S. Pat. No. 5,868, 824), which is a division of U.S. application Ser. No. 08/288,664, filed Aug. 9, 1994 (U.S. Pat. No. 5,660,900), which is a continuation-in-part of U.S. application Ser. No. 08/288,667, filed Aug. 9, 1994 (U.S. Pat. No. 5,783,126), and also a continuation-in-part of U.S. application Ser. No. 08/218,971, filed Mar. 25, 1994 (U.S. Pat. No. 5,830,305), and also a continuation-in-part of U.S. application Ser. No. 08/109,100, filed Aug. 18, 1993 (abandoned), and also a continuation-in-part of U.S. application Ser. No. 08/095, 662, filed Jul. 21, 1993 (U.S. Pat. No. 5,385,764), and also a continuation-in-part of U.S. application Ser. No. 07/982, 383, filed Nov. 25, 1992 (abandoned). For purposes of disclosure of the present invention, each of the foregoing applications and patents are incorporated herein by specific reference.

BACKGROUND OF THE INVENTION

1. The Field of the Invention

The present invention relates generally to compositions for manufacturing cellular articles from highly inorganically filled materials having a starch-based binder. More particularly, the present invention relates to economically mass-produced, environmentally superior containers and other articles prepared by combining particle packed inorganic fillers and a starch-based binder with a solvent and other desired admixtures to form a mixture having a controlled viscosity. The mixture is positioned between opposing molds where the temperature and pressure are elevated to rapidly form the mixture into a form-stable article having a selectively designed cellular structural matrix. The components for the mixture and the processing parameters can be selected to produce articles that have desired properties of, e.g., thickness, stiffness, flexibility, insulation, toughness, product stability, and strength. The resulting articles can also be produced less expensively and more environmentally safe than articles made from conventional materials, e.g., paper, plastic, polystyrene foam, glass, or metal.

2. The Relevant Technology

A. Articles of Manufacture

Materials such as paper, paperboard, plastic, polystyrene, and even metals are presently used in enormous quantity in the manufacture of articles such as containers, separators, dividers, lids, tops, cans, and other packaging materials. Advanced processing and packaging techniques presently allow an enormous variety of liquid and solid goods to be stored, packaged, or shipped in such packaging materials while being protected from harmful elements.

Containers and other packaging materials protect goods from environmental influences and distribution damage, particularly from chemical and physical influences. Packaging helps protect an enormous variety of goods from gases, moisture, light, microorganisms, vermin, physical shock, crushing forces, vibration, leaking, or spilling. Some packaging materials also provide a medium for the dissemination of information to the consumer, such as the origin of manufacture, contents, advertising, instructions, brand identification, and pricing.

Typically, most containers and other packaging materials (including disposable containers) are made from paper, paperboard, plastic, polystyrene, glass, or metal materials. Each year, over 100 billion aluminum cans, billions of glass bottles, and thousands of tons of paper and plastic are used in storing and dispensing soft drinks, juices, processed foods, grains, beer, and other products. Outside of the food and beverage industry, packaging containers (and especially disposable containers) made from such materials are ubiquitous. Paper-based articles made primarily from tree derived wood pulp are also manufactured each year in enormous quantities. In the United States alone, approximately 5.5 million tons of paper are consumed each year for packaging purposes, which represents only about 15% of the total annual domestic paper production.

B. The Impact of Paper, Plastic, Glass and Metal

Recently, there has been a debate as to which of the conventional materials (e.g., paper, paperboard, plastic, polystyrene, glass, or metal) is most damaging to the environment. Consciousness-raising organizations have convinced many people to substitute one material for another in order to be more environmentally "correct." The debate often misses the point that each of these materials has its own unique environmental weaknesses. One material may appear superior to another when viewed in light of a particular environmental problem, while ignoring different, often larger, problems associated with the supposedly preferred material.

Polystyrene products, particularly containers and other packaging materials, have more recently attracted the ire of environmental groups. While polystyrene itself is a relatively inert substance, its manufacture involves the use of a variety of hazardous chemicals and starting materials. Unpolymerized styrene is very reactive, and therefore presents a health problem to those who must handle it. Because styrene is manufactured from benzene (a known mutagen and a probable carcinogen), residual quantities of benzene can be found in styrene.

More potentially damaging has been the use of chlorofluorocarbons (or "CFCs") in the manufacture of "blown" or "expanded" polystyrene products. This is because CFCs have been linked to the destruction of the ozone layer. In the manufacture of foams, including blown polystyrene, CFCs (which are highly volatile liquids) have been used to "expand" or "blow" the polystyrene into a foamed material, which is then molded into the form of cups, plates, trays, boxes, "clam-shell" containers, spacers, or packaging materials. Even the substitution of less "environmentally damaging" blowing agents (e.g., HCFCs, pentanes, and $CO_2$ with hydrocarbon combinations) are still significantly harmful and their elimination would be beneficial.

As a result, there has been widespread pressure for companies to stop using polystyrene products in favor of more environmentally safe materials. Some environmental groups have favored a temporary return to the use of more "natural" products, such as paper or other products made from wood pulp, which are believed to be biodegradable. Nevertheless, other environmental groups have taken the opposite view in order to minimize the cutting of trees and depletion of forests.

Although paper products are ostensibly biodegradable and have not been linked to the destruction of the ozone layer, recent studies have shown that the manufacture of paper probably more strongly impacts the environment than does the manufacture of polystyrene. In fact, the wood pulp and paper industry has been identified as one of the five top polluters in the United States. For instance, products made from paper require ten times as much steam, fourteen to twenty times the electricity, and twice as much cooling water as compared to an equivalent polystyrene product. Various studies have shown that the effluent from paper manufacturing contains ten to one hundred times the amount of contaminants produced in the manufacture of polystyrene foam.

In addition, a by-product of paper manufacturing is that the environment is impacted by dioxin, a harmful toxin. Dioxin, or more accurately, 2,3,7.8-tetrachlorodibenzo[b,e][1,4]-dioxin, is a highly toxic contaminant, and is extremely dangerous, even in very low quantities. Toxic effects of dioxin in animals and humans include anorexia, severe weight loss, hepatoxicity, hematoporphyrin, vascular lesions, chloracne, gastric ulcers, porphyrinuria, porphyria, cutanea tarda, and premature death. Most experts in the field believe that dioxin is a carcinogen.

Another drawback of the manufacture of paper and paperboard is the relatively large amount of energy that is required to produce paper. This includes the energy required to process wood pulp to the point that the fibers are sufficiently delignified and frayed that they are essentially self-binding under the principles of web physics. In addition, a large amount of energy is required in order to remove the water within conventional paper slurries, which contain water in an amount of up to about 99.5% by volume. Because so much water must be removed from paper slurries, it is necessary to literally suck water out of the slurry even before the drying process is begun. Moreover, much of the water that is sucked out during the dewatering processes is usually discarded into the environment.

The manufacturing processes of forming metal sheets into containers (particularly cans made of aluminum and tin), blowing glass bottles, and shaping ceramic containers utilize high amounts of energy because of the necessity to melt and then separately work and shape the raw metal into an intermediate or final product. These high energy and processing requirements not only utilize valuable energy resources, but they also result in significant air, water, and heat pollution to the environment. While glass can be recycled, that portion that ends up in landfills is essentially non-degradable. Broken glass shards are very dangerous and can persist for years.

Some of these pollution problems are being addressed; however, the result is the use of more energy, as well as the significant addition to the capital requirements for the manufacturing facilities. Further, while significant efforts have been expended in recycling programs, only a portion of the raw material needs come from recycling—most of the raw materials still come from nonrenewable resources.

Even paper or paperboard, believed by many to be biodegradable, can persist for years, even decades, within landfills where they are shielded from air, light, and water—all of which are required for normal biodegradation activities. There are reports of telephone books and newspapers having been lifted from garbage dumps that had been buried for decades. This longevity of paper is further complicated since it is common to treat, coat, or impregnate paper with various protective materials that further slow or prevent degradation.

Another problem with paper, paperboard, polystyrene, and plastic is that each of these requires relatively expensive organic starting materials, some of which are nonrenewable, such as the use of petroleum in the manufacture of polystyrene and plastic. Although trees used in making paper and paperboard are renewable in the strict sense of the word, their large land requirements and rapid depletion in certain areas of the world undermines this notion. Hence, the use of huge amounts of essentially nonrenewable starting materials in making articles therefrom cannot be sustained and is unwise from a long term perspective. Furthermore, the processes used to make the packaging stock raw materials (such as paper pulp, styrene, or metal sheets) are very energy intensive, cause major amounts of water and air pollution, and require significant capital requirements.

In light of the foregoing, the debate should not be directed to which of these materials is more or less harmful to the environment, but rather toward asking: Can we discover or develop an alternative material which will solve most, if not all, of the various environmental problems associated with each of these presently used materials?

C. Alternative Materials

Due to the more recent awareness of the tremendous environmental impacts of using paper, paperboard, plastic, polystyrene, and metals for a variety of single-use, mainly disposable, articles such as containers and other packaging materials made therefrom (not to mention the ever mounting political pressures), there has been an acute need (long since recognized by those skilled in the art) to find environmentally sound substitute materials.

One alternative has been to make the desired articles and containers out of baked, edible sheets, e.g., waffles or pancakes. Although edible sheets can be made into trays, cones, and cups which are easily decomposed, they pose a number of limitations. Edible sheets are primarily made from a mixture of water, flour, and a rising agent. The mixture is baked between heated molds into its desired shape. Fats or oils are added to the mixture to permit removal of the sheet from the baking mold. Oxidation of these fats cause the edible sheets to go rancid. From a mechanical standpoint, the resulting edible sheets are very brittle and far too fragile to replace most articles made from conventional materials. Furthermore, edible sheets are overly sensitive to moisture and can easily mold or decompose prior to or during their intended use.

Attempts have also been made to make articles using organic binders. For example, articles have been made from mixtures of starch, water, and a mold-releasing agent. The starch-based mixtures were baked between heated molds until the starch gelated and set in the desired shape for the articles. The resulting products, however, were found to be cost prohibitive. Slow processing times, expensive equipment, and the relatively high cost of starch compared to conventional materials made the articles more expensive than conventional articles. Although inorganic fillers have been added to starch-based mixtures in an attempt to cut material cost, mixtures containing any significant portion of fillers were unable to produce structurally stable articles that had functional mechanical properties.

Furthermore, the starch-based articles were found to be very fragile and brittle, giving them limited use. To improve flexibility, the articles were placed in a humidity chamber where the moisture was absorbed by the starch to soften the articles. The moisture absorption, however, took several minutes, significantly slowing down the manufacturing process. Furthermore, an additional time-consuming step of applying a coating to the article was required to prevent the moisture from escaping from the article once the article was finished. Attempts at producing organic-based articles have also failed to consistently produce articles that have a smooth, uniform surface. To disguise the surface defects, the articles have usually been made with a waffled surface.

Industry has repeatedly sought to develop inorganically filled materials for the production of disposable articles that are mass-produced and used in large quantities. Inorganic materials such as clay, natural minerals, and stone are easily accessed, non-depletable, inexpensive, and environmentally inert. In spite of economic and environmental pressures, extensive research, and the associated long-felt need, the technology simply has not existed for the economic and feasible production of highly inorganically filled materials which could be substituted for paper, paperboard, plastic, polystyrene, metal, or other organic-based containers and other articles.

Significant attempts have been made over many years to fill conventional paper with inorganic materials, such as kaolin and/or calcium carbonate, although there is a limit (about 20–35% by volume) to the amount of inorganics that can be incorporated into paper products. In addition, there have been attempts to fill certain plastic packaging materials with clay in order to increase the breathability of the product and improve the ability of the packaging material to keep fruits or vegetables stored therein fresh. In addition, inorganic materials are routinely added to adhesives and coatings in order to impart certain properties of color or texture to the final product. Nevertheless, inorganic materials only comprise a small fraction of the overall material used to make packaging materials or other articles, rather than making up the majority of the material mass. Attempts to increase the amount of inorganic filler in a polymer matrix have had significant adverse affects on the rheology and properties of the binding system, e.g., loss of strength, increased brittleness, etc.

In light of the fact that inorganic materials are typically the most economical and ecological material, what is needed are highly inorganically filled materials that can replace paper, paperboard, plastic, polystyrene, or metal materials as the material of choice for producing containers and articles currently made therefrom. What is further needed is an inexpensive, environmentally safe, organic material that, in relatively small quantities, acts as a satisfactory binder for the inorganic material.

It would be a further improvement in the art to form the highly inorganically filled mixture having an organic binder into containers and other articles currently made from paper, paperboard, polystyrene, metal, plastic, or other organic materials.

It would be a significant improvement in the art if such mixtures yielded highly inorganically filled articles which had properties similar to or superior to paper, paperboard, polystyrene, plastic, or metal materials.

It would yet be an improvement in the art if the above containers and articles could be manufactured with or without being placed in a humidity chamber to obtain the desired flexibility.

It would be still another advantage in the art if the above articles could be formed without the need to subsequently apply a coating thereto.

It would be an improvement in the art if the above articles and containers could be formed having a smoother, more uniform surface with fewer defects.

It would also be a tremendous improvement in the art if such articles could be formed using existing manufacturing equipment and techniques presently used to form such articles from paper, paperboard, polystyrene, plastic, or other organic materials.

It would be another improvement in the art if such compositions for manufacturing articles did not result in the generation of wastes involved in the manufacture of paper, paperboard, plastic, polystyrene, or metal materials.

It would be yet an advancement in the art if the compositions contained less water which had to be removed during the manufacturing process (as compared to paper manufacturing) in order to shorten the processing time and reduce the initial equipment capital investment.

In addition, it would be a significant improvement in the art if such articles were readily degradable into substances which are commonly found in the earth.

From a practical point of view, it would be a significant improvement if such materials made possible the manufacture of containers and other articles at a cost that was comparable or even superior to existing methods of manufacturing containers or other articles from paper, paperboard, plastic, polystyrene, or metal. Specifically, it would be desirable to reduce the energy requirements, conserve valuable natural resources, and reduce the initial capital investment for making articles having the desirable characteristics of conventional materials such as paper, metals, polystyrene, plastic, or other organic materials.

From a manufacturing perspective, it would be a significant advancement in the art of shaping highly inorganically filled materials to provide compositions for mass-producing highly inorganically filled articles which could rapidly be formed and ready for use within a matter of minutes from the beginning of the manufacturing process.

It would also be a tremendous advancement in the art to provide compositions which allow for the production of highly inorganically filled materials having greater flexibility, flexural strength, toughness, moldability, mass-producibility, product stability, and lower environmental impact compared to conventional materials having a high content of inorganic filler.

Such compositions and articles are disclosed and claimed herein.

SUMMARY AND OBJECTS OF THE INVENTION

The present invention discloses novel compositions and articles of manufacture prepared from particle packed, highly inorganically filled materials having a starch-based binder and a thermodynamically controlled cellular matrix. Initially, a materials science and microstructural engineering approach is used to develop an appropriate inorganically filled mixture. The components of the mixture and their amounts are selected based on an understanding of the interrelationships between processing parameters and the properties of the individual components, moldable mixture, and final article.

The mixture is designed to produce a final product having the desired properties for its intended use at minimal cost. Properties that can be optimized include thickness, density, II modulus of elasticity, compressive strength, tensile strength, flexura strength, flexibility, range of strain, thermal capabilities, and specific heat. Because of the ability to impart or alter these properties as needed, a wide variety of articles can be made, including cups, trays, cartons, boxes, bottles, crates, and numerous other articles used for, e.g., packaging, storing, shipping, serving, portioning, and dispensing.

The inventive mixtures can include a variety of environmentally safe components, including a starch-based binder, water, inorganic aggregates, inert organic aggregates, mold-releasing agents, fibers, rheology-modifying agents, cross-linkers, dispersants, plasticizers, and coatings. The mixture is designed with the primary considerations of maximizing the inorganic components, minimizing the starch component and solvent, and selectively modifying the viscosity to produce articles quickly, inexpensively, and having the desired properties for their intended use. The starch-based binder acts as the binding agent and typically includes a starch such as potato starch, corn starch, waxy corn starch, rice starch, wheat starch, their grain predecessors, e.g., flour and cracked grains, or their modified counterparts. A solvent, typically water, alcohol, or a combination thereof, is used to disperse the components within the mixture and act as an agent for the gelation of the starch-based binder. In addition, the solvent, along with other admixtures such as rheology-modifying agents, plasticizers, and dispersants, help to create a mixture having the desired rheological, or flow, properties.

The starch-based binder may be added in its ungelated, granular form, or it may be pregelated. As the starch-based binder is heated, the granules rupture, thereby allowing the long, single chain, amylose polymers located within the granules to stretch out and intertwine with other starch polymers, such as the highly branched amylopectin polymers. This process is referred to as gelation. Once the solvent is removed, the resulting interconnected mesh of starch polymers produces a solid material. However, the relatively high cost of starch-based binder and the excess time and energy necessary to remove the solvent make it impractical to make articles solely out of starch.

To decrease the cost and also to impart desirable properties to the final article, inorganic fillers or aggregates are usually added to the mixture in an amount greater than about 20% and even up to as high as about 90% by weight of the total solids in the mixture. While this range applies to most aggregates of relatively high density (greater than about 1 $g/cm^3$), in the case of lower density, or "lightweight", aggregates (having a density less than about 1 $g/cm^3$), such as expanded perlite or hollow glass spheres, the minimum weight will be less and is dependent upon the density of the particular aggregate in question. As a result, it is more appropriate to express the concentration of lightweight aggregates in terms of volume percent, which will preferably be included in a broad range from about 5% to about 85% by volume.

To obtain mixtures having a high concentration of inorganics, the inorganic aggregate particles are selected to have a shape and particle size distribution that preferably produces a high packing density. This process is referred to as particle packing. It is further preferred that the particles have a relatively small specific surface area. Using fillers with a high packing density and low specific surface area minimizes the amount of starch-based binder and solvent needed in the mixture. By minimizing the starch-based binder and solvent, the material costs and processing time to produce the article are minimized. Furthermore, by selecting aggregates having specific mechanical and physical properties, those properties can be imparted into the final articles. For example, the aggregate can help control the specific heat, density, strength, and texture of the final article. One preferred inorganic aggregate is calcium carbonate.

Rheology-modifying agents, such as cellulose-based, polysaccharide-based, protein-based, and synthetic organic materials can be added to control the viscosity and yield stress of the mixture. Increasing the viscosity helps to prevent settling or separation within the mixture and aids in the formation of the cellular, structural matrix. In general, mixtures that have a high viscosity produce relatively dense articles having small cells in the structural matrix. In contrast, mixtures with a low viscosity produce lighter articles with larger cells within the structural matrix. The formation of the cellular structural matrix is also dependent on variables such as the solvent content and the pressure and temperature applied to the mixture. The rheology-modifying agent will also act as a binder to some extent and can help increase the strength of the article.

Plasticizers, humectants, and porous aggregate may be added to the mixture to increase the flexibility of the articles. Typically, once the solvent is removed to produce the form-stable article, the resulting article is very brittle. Plasticizers include materials that can be absorbed by the starch-based binder to soften the structural matrix and which have a sufficiently high vapor point so as not to be vaporized and removed during the forming process and that will remain stable after the article is formed. In addition to water, two preferred plasticizers include glycerin and polyethylene glycol. Humectants, such as $MgCl_2$ and $CaCl_2$, absorb moisture and tightly bind it with the starch-based binder molecules so that the bound moisture is not removed during the forming process. In turn, the moisture improves the flexibility of the finished article. Porous aggregates can hold the solvent during the forming process and then disperse the solvent into the matrix of the form-stable article to increase the flexibility of the article. Of course, flexibility may also be imparted to the hardened article through the use of high humidity condition, although this process is not required in all cases.

Calcium sulfate hemihydrate ($CaSO_4 \cdot \frac{1}{2}H_2O$), the main hydratable component of plaster of paris, may be used as a water absorption agent within the mixtures of the present invention because it reacts with water to form the calcium sulfate dihydrate ($CaSO_4 \cdot 2H_2O$). This binding of water can be also be utilized as a means for holding water internally.

Medium- or long-chain fatty acids, their salts, and their acid derivatives may be added to improve the release of the hardened article from the mold. Molds having a polished metal surface, or other non-stick surface, are also useful in improving or facilitating the release of the article.

Although not necessary, other components can be added to the mixture to vary the properties of the final product. Such components include fibers, which improve the fracture energy and toughness of the article, cross-linkers, which improve the strength and stability of the article, and dispersants, which decrease the viscosity of the mixture without requiring an increase in the solvent content.

The articles of the present invention are produced through a multi-step process. Initially, the selected components are blended into a homogeneous, moldable mixture. The mixing can be carried out in a high energy mixer or an auger extruder, depending on the viscosity of the mixture. It is often preferred to apply a partial vacuum to the mixture to remove unwanted air voids that can create defects in the final product.

In the preferred embodiment, once the moldable mixture has been prepared, it is positioned within a heated mold cavity. The heated mold cavity may comprise many different embodiments, including molds typically used in conventional injection molding processes and die-press molds brought together after placing the inorganically filled mixture into the female mold. In one preferred embodiment, for example the moldable mixture is placed inside a heated female mold. Thereafter, a heated male mold is complementarily mated with the heated female mold, thereby positioning the mixture between the molds. As the mixture is heated, the starch-based binder gelates, increasing the viscosity of the mixture. Simultaneously, the mixture increases in volume within the heated molds cavity as a result of the formation of gas bubbles from the evaporating solvent, which are initially trapped within the viscous matrix.

As will be discussed later in greater detail, by selectively controlling the thermodynamic parameters applied to the mixture (e.g., pressure, temperature, and time), as well as the viscosity and solvent content, the mixture can be formed into a form-stable article having a selectively designed cellular structural matrix. That is, the size, quantity, and positioning of the cells can be selectively designed to produce articles having desired properties for their intended use. Furthermore, the surface texture and configuration of cells within the structural matrix can be controlled by selectively varying the temperature between the molds and the temperature along the length of the molds. Besides controlling the properties among different molded articles, the properties of a single article can be made to vary throughout the article, including varying thickness, varying skin thickness, varying cell structure, and varying density. This may be accomplished, for example, by creating within the molding apparatus differential relative temperatures, or differential temperature zones, throughout the molding apparatus. As a result, different temperature and processing conditions are imparted to varying locations throughout the same article.

In a preferred embodiment, the articles are formed with the previously discussed admixtures to impart the desired flexibility to the hardened articles without the need for conditioning them in high humidity. In an alternative embodiment, the hardened articles are placed in a humidity chamber where the articles are exposed to a high humidity environment at a selected temperature. The water molecules in the air are absorbed by, and become bound to through hydrogen bonding, the starch-based binder portion of the matrix, thereby reducing the brittleness of the binder material and imparting the desired flexibility to the articles. It is preferred to keep the moisture content in the final article to below about 10% by weight of the starch-based binder component, as excess moisture can allow bacterial growth. More preferably, the moisture content is kept to below about 5% by weight of the starch-based binder component.

Once the article is conditioned, a coating can be applied. The coating can have several purposes, which include providing a finished surface to the article, sealing the article, and adding additional strength. The coating can be applied through various conventional processes such as spraying, dipping, sputtering, and painting. In an alternative embodiment, selected coating materials can be added to the mixture prior to the formation of the article. If a coating material is used that has a similar melting point as the peak temperature of the mixture, it migrates to and coats the surface of the article during the formation of the article. Such coating materials include selected waxes and cross-linking agents.

As disclosed in U.S. application Ser. No. 08/218,971, filed Mar. 25, 1994 (U.S. Pat. No. 5,830,305; col. 12, lines 26–37), the teachings of which were incorporated by reference at the beginning of the application, coatings may be applied to the surface of a substantially dried molded article for a number of reasons, such as to make the article more waterproof, more flexible, or to give it a glossier surface. Coatings based upon materials such as soybean and methocel, alone or in combination with polyethylene glycol, can be applied to the surface in order to permanently soften the sheet or article, or hinge within the article. Elastomers, plastic, or paper coatings can aid in preserving the integrity of a fold or hinge (if used), whether or not the underlying hardened structural matrix fractures upon bending at the hinge.

The resulting articles can be designed to have properties similar to or better than those of articles made from conventional materials, such as paper, paperboard, polystyrene, metals, plastic, or other natural organic materials. In light of the minimal cost of inorganic fillers and the moderate cost of starch and flours, the inventive articles can also be made at a fraction of the cost of conventional articles. Finally, the inventive articles are more environmentally friendly than conventional articles. For example, the manufacturing process uses no harmful chemicals, emits no harmful emissions into the air or water, depletes no non-renewable resources, and requires only minimal processing energy. Furthermore, the inventive articles are easily recyclable or quickly decomposed back into the environment.

From the foregoing, an object of the present invention is to provide improved inorganically filled compositions for manufacturing articles of manufacture that are presently formed from, e.g., paper, paperboard, polystyrene, metals, plastic, or other natural organic materials.

Another object and feature of the present invention is to provide compositions which yield inorganically filled, cellular articles that have properties similar to those of paper, paperboard, polystyrene, plastic, or metals.

A further object of the present invention is to provide moldable mixtures which can be formed into a variety of articles using the same or similar manufacturing apparatus and techniques as those presently used to form such objects from, e.g., paper, paperboard, metals, polystyrene, plastic, or other organic materials.

Yet another object and feature of the present invention is to provide compositions for manufacturing articles from moldable mixtures which do not result in the generation of wastes involved in the manufacture of paper, paperboard, polystyrene, or metal materials.

An additional object of the present invention is to provide inorganically filled, cellular articles that are formed having the desired flexibility for their intended use.

An additional object of the present invention is to provide inorganically filled, cellular articles where the coating is formed during the formation of the article.

An additional object of the present invention is to provide inorganically filled, cellular articles that have a smooth and uniform surface.

A further object of the present invention is to provide compositions which contain less water which has to be removed during the manufacturing process (as compared to paper manufacturing) in order to shorten the processing time and reduce the initial equipment capital investment.

Still a further object is to produce articles that are readily degradable into substances which are nontoxic and commonly found in the earth.

Another object of the present invention is to provide compositions which make possible the manufacture of articles at a cost comparable to and even superior to articles manufactured from existing materials.

A further object and feature of the present invention is the ability to manufacture starch bound containers and other articles having the desired flexibility without subjecting them to high humidity conditioning in some cases.

Still another object and feature of the present invention is to provide compositions which are less energy intensive, conserve valuable natural resources, and require lower initial capital investments compared to those used in making articles from existing materials.

Finally, an additional object and feature of the present invention is to provide compositions for mass-producing articles from moldable mixtures which can rapidly be formed and ready to use within a matter of minutes from the beginning of the manufacturing process.

These and other objects and features of the present invention will become more fully apparent from the following description and appended claims, or may be learned by the practice of the invention.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

I. INTRODUCTION

Figure 1:
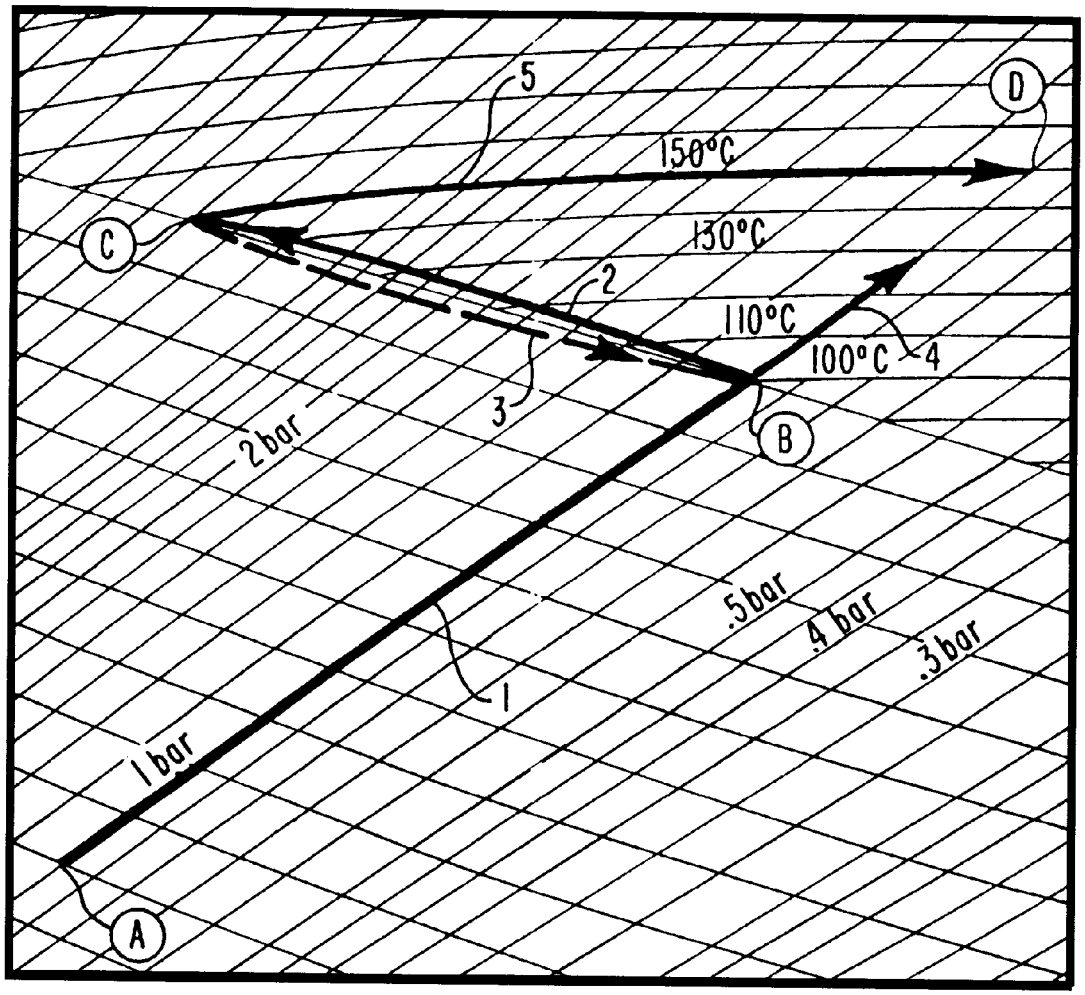
FIG. 1 is a phase diagram showing the temperature and pressure conditions that the mixture is subject to in one embodiment of the invention during formation of the articles.

The present invention relates to novel compositions for manufacturing articles of manufacture from particle packed, inorganically filled materials having a starch-based binder and a thermodynamically controlled cellular matrix. The inventive materials can include a variety of environmentally safe components, including a starch-based binder, water inorganic and organic aggregates, mold-releasing agents, fibers, rheology-modifying agents, cross-linkers, plasticizers, dispersants, and coating materials.

A materials science and microstructural engineering approach is used to select the type, size, shape, and proportion of each component that, when blended together, result in a mixture and subsequent final product having desired properties at an optimal cost. The desired properties are dependent on the required handling and the intended use of the finished article. The optimal cost is obtained by selecting components that will maximize production output while minimizing material and production costs.

Using a microstructural engineering approach, the present invention can produce a variety of articles, including plates, cups, cartons, and other types of containers and articles having mechanical properties substantially similar or even superior to their counterparts made from conventional materials, such as paper, polystyrene foam, plastic, metal and glass. The inventive articles can also be made at a fraction of the cost of their conventional counterparts. The minimal cost is a result of the relatively inexpensive aggregate which typically comprises a large percentage of the mixture and the minimum processing energy required.

The manufacturing processes and resulting articles are also less harmful to the environment than conventional processes. For example, theoretically all of the manufacturing waste can be recycled into the production line. Once the finished articles have fulfilled their intended use, the articles, which consist of naturally occurring organic and inorganic materials, are easily decomposed back into the earth, or recycled. As a result, the inventive articles do not create the environmental blight or consume the landfills as do similar articles made from conventional materials.

The articles of the present invention are produced by initially blending selected components into a homogeneous, moldable mixture. The moldable mixture includes a starch-based binder, such as potato, corn, waxy corn, rice, or wheat starch, an inorganic aggregate, such as calcium carbonate, and a solvent, such as water or alcohol. The shape, size distribution, and specific surface area of the inorganic aggregate are selected to maximize the packing density of the mixture and minimize the starch-based binder and solvent requirements. The addition of high concentrations of inorganic aggregate filler permits the articles to be made more quickly, less expensively, more environmentally safe, and with a lower specific heat in comparison to articles made without or with only low concentrations of inorganic aggregate. Accordingly, the materials and articles of the present invention are often referred to as being "inorganically filled" or "highly inorganically filled."

Admixtures can be combined with the mixture to impart desired properties to the articles. For example, rheology-modifying agents and dispersants can be added to regulate the viscosity of the mixture. High viscosity mixtures are used for making dense articles having small cells within the structural matrix. Low viscosity mixtures are used for making low density articles having large cells within the structural matrix. Plasticizers, humectants, and porous aggregates can be used for imparting the desired flexibility to the articles during the forming process. Other additives include fibers, which increase the fracture toughness of the article, dispersants, which decrease the viscosity of the mixture without the addition of solvent, and selected coating materials, which can form a coating on the articles during the formation process. Aggregate particles upon which ettringite has been formed may be used to improve the interaction between the aggregate particles and starch-based binder.

Once the moldable mixture is prepared, it is positioned within a heated mold cavity. The heated mold cavity may comprise many different embodiments, including molds typically used in conventional injection molding processes and die-press molds brought together after placing the inorganically filled mixture into the female mold. In one preferred embodiment, for example, the moldable mixture is placed inside a heated female mold. A heated male mold is then complementarily mated with the heated female mold, thereby positioning the mixture between the molds. By carefully controlling the temperature and pressure applied to the mixture, as well as the viscosity and solvent content, the mixture can rapidly be formed into form-stable articles having a selectively designed cellular structural matrix. That is, the surface texture and the formation of the cells within the structural matrix are selectively controlled by varying the components and their relative concentrations within the mixture, as well as the thermodynamic processing conditions. The result is the ability to manufacture a wide variety of containers and other articles that have greatly varying thermal and mechanical properties corresponding to the performance criteria of the article.

In one embodiment, the articles are formed having the desired flexibility for their intended use. In an alternative embodiment, the self-supporting articles are placed in a humidity chamber where they are exposed to controlled relative humidity at a selected temperature. The water is absorbed by the starch-based binder through hydrogen bonding of the water molecules to the hydroxyl groups of the starch, thereby softening the starch-based binder and imparting the desired flexibility to the articles. A coating material can be applied either in the mixture before the article is formed or the coating can be applied externally after the article is formed. Subsequent processing of the articles can include printing, stacking, and boxing.

II. DEFINITIONS

The terms "inorganically filled mixture," "mixture," or "moldable mixture" as used in the specification and the appended claims have interchangeable meanings and shall refer to a mixture that can be formed into the articles which are disclosed and claimed herein. Such mixtures are characterized by having a high concentration of inorganic filler or aggregate (from about 20% to about 90% by weight of the total solids in the mixture for most aggregates, and from about 5% to about 85% by volume of the material in the case of lightweight aggregates), a solvent, and a starch-based binder. The moldable mixtures may also include other admixtures, such as a mold-releasing agent, fibers, organic aggregates, dispersants, cross-linkers, rheology-modifying agents, plasticizers, and coating materials.

As used in the specification and the appended claims, the term "total solids" includes all solids, whether they are suspended or dissolved in the mixture. The volume of the total solids does not include the interstitial voids between the solids, but is calculated by subtracting out the volume of the interstitial voids.

The terms "inorganically filled, cellular matrix", "cellular matrix", or "structural matrix" as used in the specification and the appended claims are interchangeable and shall refer to matrices of the article after hardening of the moldable mixture.

Both the moldable mixture and the cellular matrix formed therefrom each constitute "inorganically filled, cellular materials" or "inorganically filled materials". These terms as used in the specification and the appended claims are interchangeable and shall refer to materials or compositions without regard to the amount of solvent or moisture within the mixture and without regard to the extent of gelation of the starch-based binder.

The term "hardening" as used in this specification and the appended claims refers to the process of gelation of the starch-based binder and removal of the solvent to produce a form-stable article. The term "hardening," however, is not limited by the extent of gelation or the amount of solvent removed.

The term "form-stable" as used in the specification and the appended claims means that the article has a structural matrix which can be removed from the mold, support its own weight, and can continue through subsequent processing without damaging deformation of the structural matrix. Furthermore, the term "form-stable" means that the article has sufficient solvent removed from its matrix so that the article will not bubble or crack as a result of vapor expansion once the article is removed from the molds. It will be understood, however, that molded articles are still considered form-stable even though they may contain a small percentage of moisture.

III. CONCEPTUAL OVERVIEW OF FORMATION PROCESS

A. Microstructural Engineering Design.

The inorganically filled materials of the present invention are developed from the perspective of microstructural engineering in order to build into the microstructure of the material certain desired, predetermined properties, while at the same time remaining cognizant of costs and other manufacturing complications. Furthermore, this microstructural engineering analysis approach, in contrast to the traditional trial-and-error, mix-and-test approach, has resulted in the ability to design inorganically filled materials with those properties of strength, weight, flexibility, insulation, cost, and environmental neutrality that are necessary for the production of functional and useful containers and other articles.

The number of different raw materials available to engineer a specific product is enormous, with estimates ranging from between fifty thousand and eighty thousand. They can be drawn from such disparately broad classes as metals, polymers, elastomers, ceramics, glasses, composites, and cements. Within a given class, there is some commonality in properties, processing, and use-patterns. Ceramics, for instance, have a high modulus of elasticity, while polymers have a low modulus; metals can be shaped by casting and forging, while composites require lay-up or special molding techniques; hydraulically settable materials, including those made from hydraulic cements, historically have low flexural strength, while elastomers have high flexural strength and elongation before rupture.

Compartmentalization of material properties, however, has its dangers; it can lead to specialization (the metallurgist who knows nothing of ceramics) and to conservative thinking ("we use steel because that is what we have always used"). It is this specialization and conservative thinking that has limited the consideration of using inorganically filled materials for a variety of products, such as in the manufacture of containers and other packaging materials.

Nevertheless, once it is realized that inorganically filled materials have such a wide utility and can be designed and microstructurally engineered to have desired properties, then their applicability to a variety of possible products becomes appreciable. Such materials have an additional advantage over other conventional materials, in that they gain their properties under relatively gentle, nondamaging, inexpensive conditions. (Other materials require high energy, severe heat, or harsh chemical processing that significantly affects the material components and cost of manufacturing.) Moreover, certain conventional materials, or components thereof, can be incorporated into the materials of the present invention with surprising synergistic properties or results.

The design of the compositions of the present invention has been developed and narrowed, first by primary constraints dictated by the design, and then by seeking the subset of materials which maximizes the performance of the components. At all times during the process, however, it is important to realize the necessity of designing products which can be manufactured in a cost-competitive process.

Primary constraints in materials selection are determined by the properties necessary for the article to function successfully in its intended use. With respect to a food and beverage container, for example, those primary constraints include minimal weight, strength (both compressive and tensile), flexibility, and toughness requirements, while simultaneously keeping the cost comparable to its paper, plastic, polystyrene or metal counterparts.

In its simplest form, the process of using materials science to microstructurally engineer and design an inorganically article requires an understanding of the interrelationships between each of the mixture components, the processes parameters (e.g. time, temperature, pressure, humidity), the mixture properties, and the properties of the final articles. By understanding the interrelationships between the variables at both the macro and micro level, one skilled in the art can select proportions of desired components that can be processed under selected conditions to produce articles that have desired properties for an intended use at a minimum cost.

The interrelationships between the variables will be discussed at selected locations in the application where the variables are introduced and defined. Specific compositions are set forth in the examples given later in order to demonstrate how the selection of variables can optimize properties.

B. Articles of Manufacture.

Using a microstructural engineering approach, a variety of articles can be produced from the processes and compositions of the present invention. The terms "article" and "article of manufacture" as used in the specification and the appended claims are intended to include all goods that can be formed using the disclosed process. Examples of such articles of manufacture include containers, such as food and beverage containers and packaging containers. Articles within the scope of this invention also include such disparate objects as cutlery, flower pots, mailing tubes, light fixtures, ash trays, and game boards.

The terms "container" or "containers," as used in the specification and the appended claims, are intended to include any receptacle or vessel utilized for, e.g., packaging, storing, shipping, serving, portioning, or dispensing various types of products or objects (including both solids and liquids), whether such use is intended to be for a short-term or a long-term duration of time.

Containers within the scope of this invention include, but are not limited to, the following: cartons, boxes, sandwich containers, hinged or two-part "clam shell" containers, dry cereal boxes, frozen food boxes, milk cartons, fruitjuice containers, carriers for beverage containers, ice cream cartons, cups (including, but not limited to, disposable drinking cups, two-piece cups, one-piece pleated cups, and cone cups), french fry containers used by fast-food outlets, fast-food carry out boxes, packaging, support trays (for supporting products such as cookies and candy bars), cans, yoghurt containers, sleeves, cigar boxes, confectionery boxes, boxes for cosmetics, plates, vending plates, pie plates, trays, baking trays, bowls, breakfast plates, microwaveable dinner trays, "TV" dinner trays, egg cartons, meat packaging platters, disposable single use liners which can be utilized with containers such as cups or food containers, substantially spherical objects, bottles, jars, cases, crates, dishes, medicine vials, and an endless variety of other objects.

The container should be capable of holding its contents, whether stationary or in movement or handling, while maintaining its structural integrity and that of the materials contained therein or thereon. This does not mean that the container is required to withstand strong or even minimal external forces. In fact, it may be desirable in some cases for a particular container to be extremely fragile or perishable. The container should, however, be capable of performing the function for which it was intended. The necessary properties may always be designed into the material and structure of the container beforehand.

The container should also be capable of containing its goods and maintaining its integrity for a sufficient period of time to satisfy its intended use. It will be appreciated that, under certain circumstances, the container may seal the contents from the external environments, and in other circumstances may merely hold or retain the contents.

Containment products used in conjunction with the containers are also intended to be included within the term "containers." Such products include, for example, lids, straws, interior packaging, such as partitions, liners, anchor pads, corner braces, corner protectors, clearance pads, hinged sheets, trays, funnels, cushioning materials, and other object used in packaging, storing, shipping, portioning, serving, or dispensing an object within a container.

The containers within the purview of the present invention may or may not be classified as being disposable. In some cases, where a stronger, more durable construction is required, the container might be capable of repeated use. On the other hand, the container might be manufactured in such a way so as to be economical for it to be used only once and then discarded. The present containers have a composition such that they can be readily discarded or thrown away in conventional waste landfill areas as an environmentally neutral material.

The articles within the scope of the present invention can have greatly varying thicknesses depending on the particular application for which the article is intended. They can be as thin as about 1 mm for uses such as in a cup. In contrast, they can be as thick as needed where strength, durability, and or bulk are important considerations. For example, the article may be up to about 10 cm thick or more to act as a specialized packing container or cooler. The preferred thickness for most articles is in a range from about 1.5 mm to about 1 cm, with about 2 mm to about 6 mm being most preferred.

The phrases "mass-producible" or manufactured in a "commercial" or "economic" manner are intended in the specification and the appended claims to refer to the capability of rapidly producing articles at a rate that makes their manufacture economically comparable to articles made from conventional materials, such as paper, paperboard, polystyrene, plastic, or metal.

The containers and other articles made from inorganically filled materials are intended to be competitive in the marketplace with such articles currently made of various materials, such as paper, plastic, polystyrene, or metals. Hence, the articles of the present invention must be economical to manufacture (i.e., the cost will usually not exceed a few cents per item). Such cost restraints thus require automated production of thousands of the articles in a very short period of time. Hence, requiring the articles of the present invention to be economically mass-produced is a significant limitation on the qualities of the materials and products.

C. Processing Concepts and Variables

The present section discusses the underlying concepts and processing variables used in manufacturing the articles of the present invention. A detailed description of the mechanical apparatus used in the manufacturing process will be provided later in the disclosure.

The mixture of the present invention is prepared by combining selected components and blending them until a homogeneous, moldable mixture is formed. The dry components are typically mixed first. The liquid components, such as water, are then blended into the mixture. In one embodiment, the mixture is prepared in a scaled chamber to which a negative pressure or vacuum is applied. The applied vacuum both removes and prevents the entrainment of air bubbles within the mixture. The advantage of this is because entrained air bubbles tend to migrate to the exterior surface of the article during the forming process, which may result in a product having increased surface defects and lower structural integrity.

Once the mixture has been prepared, it is formed or molded into the shape of the desired article. In one embodiment, the forming steps include positioning and locking the mixture between a heated male mold having a desired shape and a heated female mold having a complementary shape. The heat from the molds causes the mixture to expand within the molds. Excess material and vapor is expelled from between the molds through small vent holes. Once a sufficient amount of the solvent has been removed, the molds are opened, and the form-stable article having a cellular structural matrix is removed for subsequent processing.

The process is more accurately defined through the use of a phase diagram. Depicted in FIG. 1 is a phase diagram for water. FIG. 1 illustrates, by way of a general example, the pressure and temperature stages that a mixture using water as a solvent undergoes during formation of the article. Between points A and B along line 1, the mixture is locked between the molds and is rapidly heated at first at constant ambient pressure to a temperature of about 100° C. The portion of the mixture closest to the molds is heated at a faster rate and thus reaches a temperature of 100° C. before the interior section of the mixture. As the mixture begins to heat, the starch-based binder begins to gelate, increasing the viscosity of the mixture. (The process of gelation is discussed later in the section on starch-based binders.)

Once the temperature of the water within the moldable mixture in contact with the mold surface reaches 100° C., the water begins to vaporize, thereby forming air pockets or voids within the mixture. As a result of these expanding pockets, the volume of the mixture expands, causing the mixture to "rise," which thereby the mold and momentarily clogging the small vent holes. The water or solvent within the portion of the moldable mixture closest to the molds is quickly vaporized and driven off from the mixture at or near the region closest to the mold, as represented in FIG. 1 by point B, thereby hardening that portion of the mixture into a thin, dense skin. The skin is believed to be formed almost instantaneously and acts as an insulation barrier for the remaining portion of the moldable mixture, thereby slowing down the rate of heating. With the vent holes plugged, and due to the restricted flow, the pressure begins to increase between the molds, as shown by line 2, preventing the transformation of the remaining solvent into vapor at the boiling point, which is usually 100° C. for water. Instead, as also shown by line 2, the solvent in the moldable mixture is super heated as a result of the restricted flow. Eventually, the material blocking the vent holes ruptures, allowing excess material to escape from between the molds. However, as a result of the small size of the vent holes, the flow of the escaping mixture is restricted, thereby allowing the pressure and temperature within the mold to further increase to point C on FIG. 1.

The cellular structural matrix is formed when sufficient excess material has escaped to cause the pressure to drop between the molds. Under high pressure the solvent vapor which forms is nucleated because of superheating. The drop in pressure causes the superheated solvent to transform rapidly into the gaseous state through an adiabatic expansion, thereby forming a distribution of voids or cells throughout the structural matrix of the article. The tendency of the solvent vapor to become nucleated at individual points throughout the superheated mixture yields a fairly well-distributed cell structure. The transformation of the solvent to vapor is an endothermic reaction that absorbs heat from the moldable mixture, thereby substantially decreasing the temperature of the moldable mixture inside the mold. The drop in temperature and pressure of the moldable mixture is depicted by line 3 extending from point C to B. The illustration that the temperature of the mixture returns to 100° is simply by way of example. In actuality the temperature of the mixture may drop below 100° C. The drop in pressure of the solvent is depicted as line 5 extending from point C to D.

With the vent holes open and the pressure reduced, the mixture then begins to heat up again to the boiling point of the solvent, allowing the remaining solvent to freely evaporate until sufficient solvent has been removed for the article to become form-stable. This process is depicted by line 5 extending from point B. This analysis of the cellular formation is supported by the fact that producing articles under low pressure results in articles having minimal voids. For example, gradually evaporating the solvent from the mixture at a low temperature or heating the mixture rapidly on top of a single mold results in a product having a lower concentration of air voids and high density.

Figure 2:
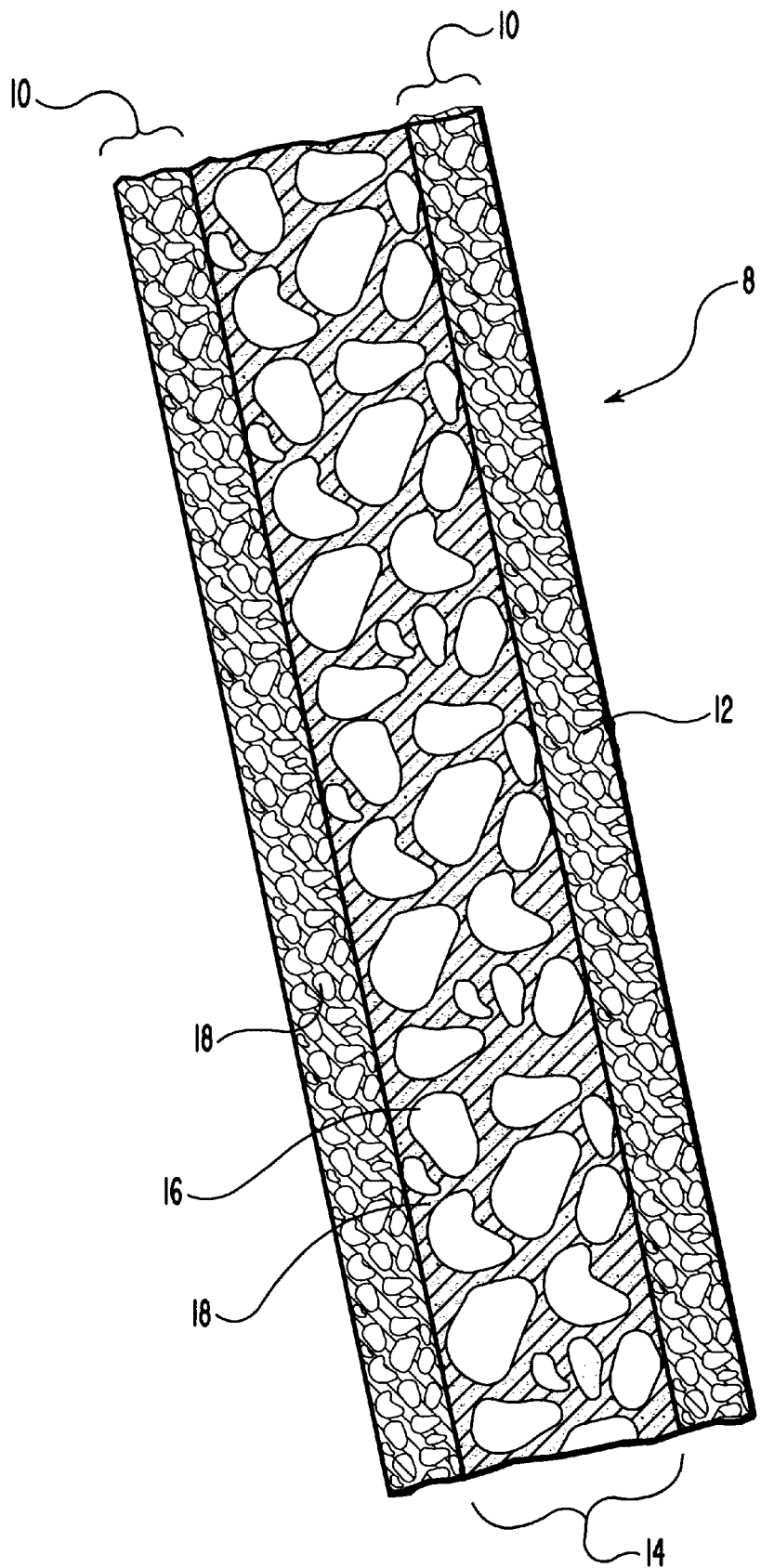
FIG. 2 is an enlarged cross-sectional view of the skin and interior section of a hardened article.

Depicted in FIG. 2 is a microscopic image of a cross-section 8 of a formed article. The figure reveals the present articles as having an outside skin 10 with small cells 12 and an interior section 14 containing large cells 16. Small cells 12 are defined as having an average diameter of less than about 250 $\mu$m. The material between adjacent cells is referred to as a cell wall 18. The distribution and size of the cells within the structural matrix are dependent on several variables including the viscosity of the mixture, temperature of the molds, and composition of the mixture, i.e., types and amounts of solvent, starch-based binder, aggregate, rheology-modifying agent, and other admixtures.

Figure 2A:
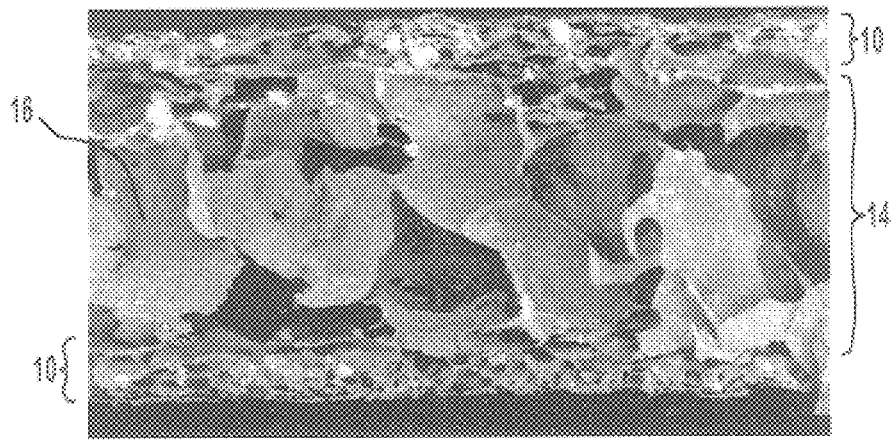
FIG. 2A is a scanning electron photomicrograph of the cross-section of an article having a thin outside skin and an interior section containing relatively large cells.
Figure 2B:
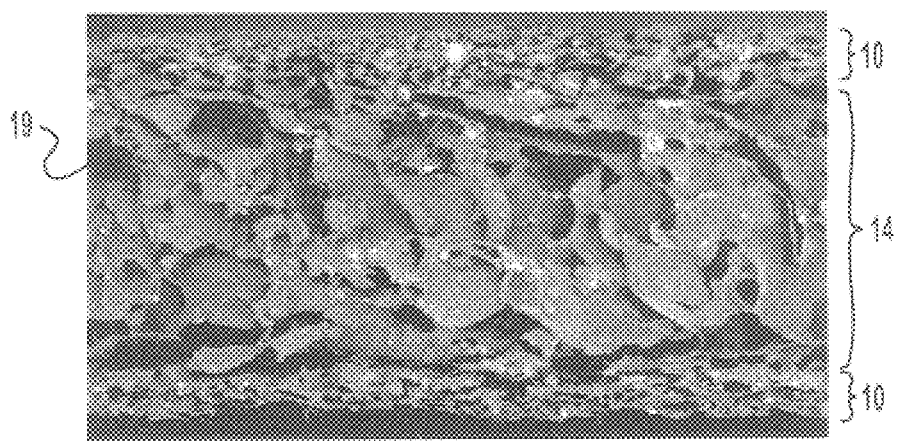
FIG. 2B is a scanning electron photomicrograph of the cross-section of an article having a thin outside skin and an interior section containing relatively medium cells.
Figure 2C:
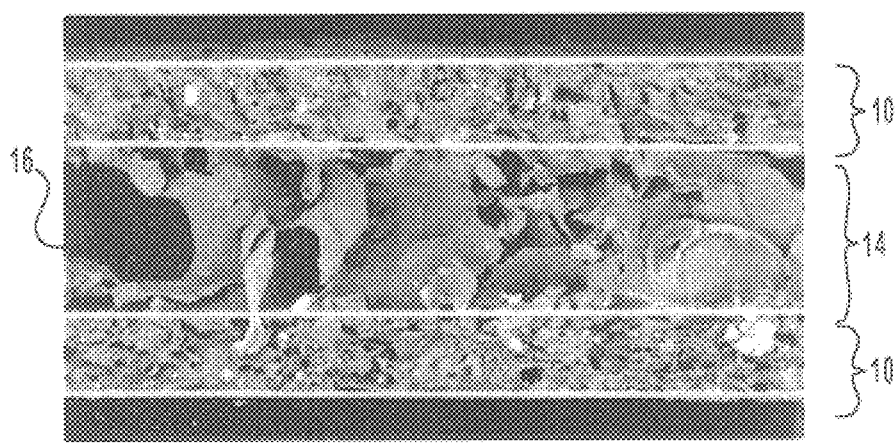
FIG. 2C is a scanning electron photomicrograph of the cross-section of an article having a thick outside skin and an interior section containing relatively large cells.
Figure 2C:
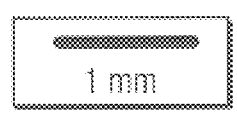

Articles can be made having a desired structural matrix by controlling the related variables. For example, FIG. 2A is a scanning electron photomicrograph of the cross-section of an article having a thin outside skin 10 and large cells 16 located in interior section 14. FIG. 2B is a scanning electron photomicrograph of the cross-section of an article having a thin outside skin 10 and medium cells 19 located in interior section 14. Finally, FIG. 2C is a scanning electron photomicrograph of the cross-section of an article having a thick outside skin 10 and large cells 16 located in interior section 14. In general, the insulation ability and the strength of the structural matrix of the article increase as the cells become more evenly dispersed throughout the matrix. Increasing the overall volume of the cellular space also would tend to improve the insulation ability, although it would be expected to have an adverse effect on the strength of the matrix. The insulation ability can be improved without significantly sacrificing strength by adding an efficiently particle packed, lightweight aggregate to the matrix.

The size of the cells within the structural matrix is heavily influenced by the viscosity and/or state of hardening of the article. As previously discussed, outside skin 10 is formed early on in the process and is important for the structural integrity of the article. Accordingly, when the pressure drops and the cells are formed within the mixture, it is much easier for the vapor to expand within interior section 14 than in outside skin 10. Thus, the cells are much larger within interior section 14. It is also possible that the cells in outside skin 10 are formed at the same time the skin is formed. That is, as the solvent vaporizes within the portion of the mixture forming outside skin 10, small bubbles begin to form within the skin. However, the outside portion of the mixture is heated so quickly that the skin becomes hard before the cells have a chance to enlarge.

As stated above, it is important to remove enough solvent so that the article can be removed from the mold and be adequately form stable. In general, the structural matrix of the molded articles will contain about 5% or less solvent at the point where the article has adequate strength and stability to be demolded. The need to remove this relatively high quantity of solvent in order to create a form stable article that can be demolded properly results from the tendency of the vaporized solvent within the cellular matrix to further expand after the demolding step. Thus, an inadequately dried article has a tendency to "blow up" upon demolding due to the high internal pressure of the vaporized solvent.

However, this high internal pressure can be greatly reduced by the application of a cooling cycle immediately following the heating cycle before the article is demolded. Cooling the structural matrix of the article causes the solvent to recondense, thereby reducing the internal pressure caused by the vaporizing solvent during the heating cycle. The application of a cooling cycle allows for the demolding of the article while maintaining adequate internal moisture to maintain flexibility and resilience, which, in turn, obviates the need for a subsequent conditioning step.

The viscosity of the mixture during the formation process is a function of the composition of the mixture and the processing parameters. As will be discussed later in the section on compositions, the viscosity of the mixture can be selectively adjusted by the types of starch-based binder and the amount of solvent added. Rheology-modifying agents and dispersants are also used to control the viscosity. By using mixtures having a low viscosity, the vapor formed by the solvent can more easily expand, thereby producing low-density articles having large cells. Mixtures having a high viscosity make it more difficult for the vapor to expand, thereby producing denser articles having smaller cells.

In one embodiment, in order to control the cell size the mixture is pre-cooked before being formed into the desired shape. The moldable mixture is pre-cooked by heating the mixture, such as by a pressure cooker or microwave, to the point of gelation of the starch-based binder. The exact temperature depends on the type of starch-based binder being used. For example, potato starch gelates at about 65° C. By gelating the starch-based binder before positioning it between the molds, the amylose polymers within the starch granules are better able to extend and fully intertwine before hardening. Furthermore, the viscosity of the mixture is higher when first placed between the molds. As a result, the finished article has increased strength and smaller, more uniform cells. As will be discussed later, different types of starch-based binder have different effects on the formation of the cells.

The processing variables associated with the formation of the inventive articles and the cellular structural matrix include mold temperature, time for removing the solvent, filling volume, vent hole size, and the cycles of opening and closing of the molds prior to locking of the molds. The articles of the present invention are preferably removed from the locked molds after most, but not all, of the solvent (typically greater than about 95%) has been removed. While the mixture is locked between the molds, the outside edges of the articles are supported by the opposing molds. Vapor formed by the evaporation of the solvent is thus forced to travel under pressure to the vent holes, where it is expelled. The outside walls of the article are the first to form and are brittle as a result of the loss of water. Separation of the molds prior to removing substantially all of the solvent permits the vapor to expand between the article walls, resulting in bubbling, cracking, or deformation of the outside walls of the articles. Furthermore, attempts to remove the article from the molds prior to removal of a sufficient amount of moisture can result in the article sticking to the molds and damage to the structural matrix.

Since the article cannot be removed until after the solvent has been substantially removed, it is preferable to have the mold temperature as high as possible. This minimizes the time for removal of the solvent and permits the quickest production of articles. Studies, however, have found that temperatures above about 240° C. result in dextrification or breaking down of the starch molecules in the surface of the article. Dextrification carmelizes the starch, produces a brown color on the article, and reduces the structural integrity of the article. Temperature above about 240° C. can also burn certain organic fibers if used. In addition, overdrying the molded articles leads to shrinkage and cracking. Some amount of moisture should, therefore, remain within the structural matrix of the article.

In contrast, it is difficult to form an article having a cellular structural matrix at mold temperatures below about 120° C. At such low temperatures, there is little pressure build-up and only slow evaporation of the solvent. Studies have found that increasing the processing temperature to between about 140–240° C. decreases the production time and the density of the article. With temperatures ranging between 140–180° C., the decrease in production time is substantial. After about 180° C., however, the decrease in processing time is rather limited. Again, this finding is consistent with the cellular formation model. The higher temperatures result only in a marginal decrease in the formation time because they only marginally shorten the incubation period before the drop in pressure and they only marginally shorten the time for removing the moisture after the cellular structure is formed. The temperature of the molds has little, if any, significant effect on the rate of formation of the cells after the drop in pressure.

As the temperature increases, the size of the cells also increases. The size of the cells within the structural matrix, and thus the strength and insulating capability of the articles, can thus be selected in part by adjusting the temperature of the molds. Furthermore, by varying the temperature differential between the male and female molds, the cell size can be selectively varied between the walls of the article. For example, by making the female mold hotter than the corresponding male mold, a cup can be formed having relatively large cells and higher insulating capability at its outside surface where the cup is held. In contrast, the cup will be more dense and be more water tight at its inside surface where liquid will be held.

A temperature of 200° C. is preferred for the rapid production of thin-walled articles, such as cups. Thicker articles require a longer time to remove the solvent and are preferably heated at lower temperatures to reduce the propensity of burning the starch-based binder and fiber. Leaving the articles within the locked molds too long can also result in cracking or deformation of the articles. It is theorized that removing greater than about 98% of the solvent within the mixture results in shrinking of the structural matrix, which in turn can crack the article. Accordingly, the article is optimally removed from the mold when approximately 2%–5% of the moisture remains within the article. It should be understood, however, that these figures are only rough approximations.

The temperature of the mold can also effect the surface texture of the molds. Once the outside skin is formed, the solvent remaining within the interior section of the mixture escapes by passing through minute openings in the outside skin and then travelling between the skin and the mold surface to the vent holes. If one mold is hotter than the other, the laws of thermodynamics would predict, and it has been empirically found, that the steam will tend to travel to the cooler mold. As a result, the surface of the article against the hotter mold will have a smoother and more uniform surface than the surface against the cooler mold.

Figure 3:
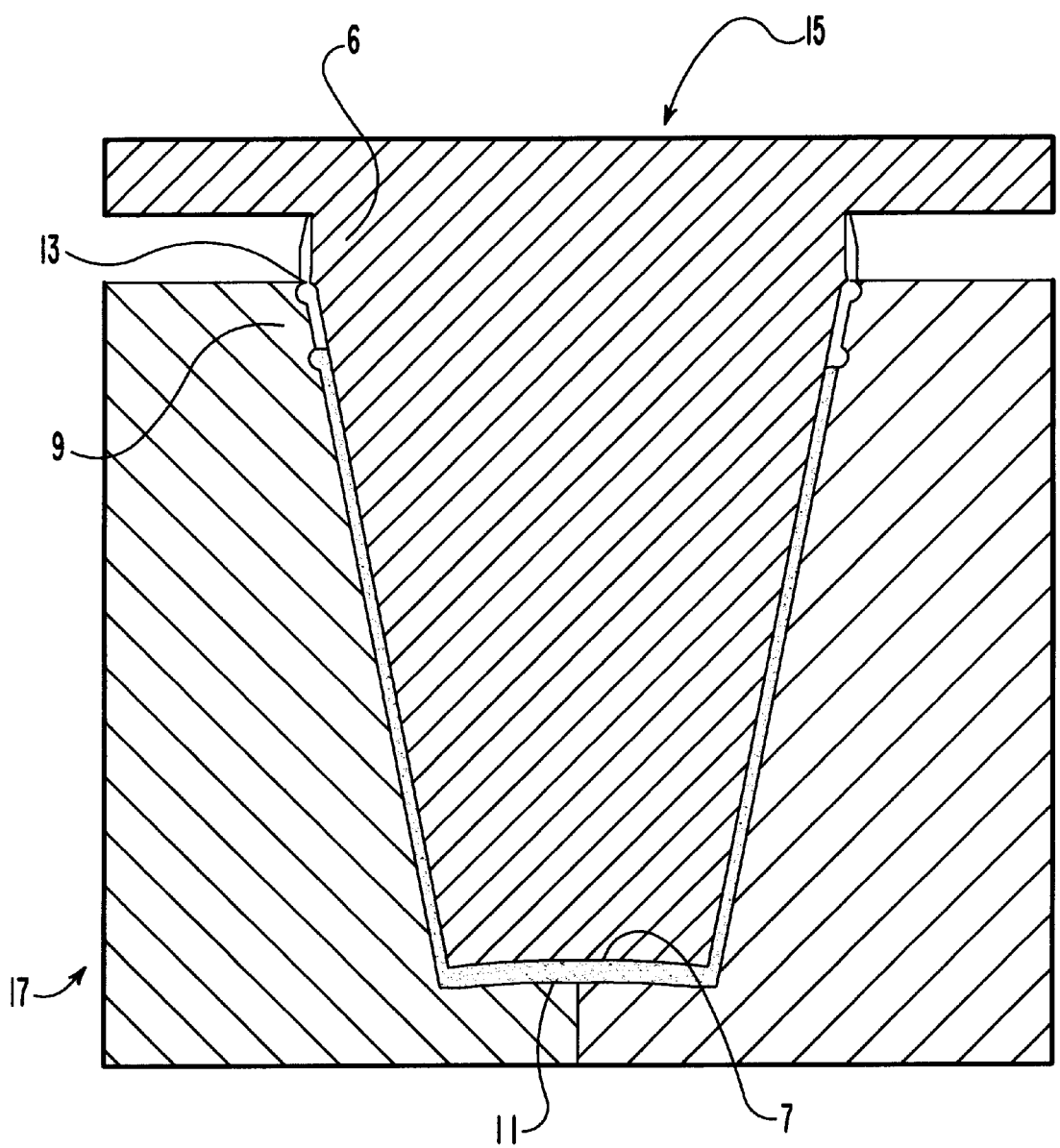
FIG. 3 is a cross-sectional view of a male mold and a female mold being mated.

The temperature of the molds can also be varied along the length of the molds. Depicted in FIG. 3 is a male mold 15 mated with a female mold 17, with a moldable mixture being positioned therebetween. In general, the male mold includes a top end 6 and a bottom end 7. Likewise, the female mold includes a top end 9 and a bottom end 11. Located near top ends 6 and 9 are vent holes 13, through which the excess material and vapor can escape. Studies have found that for deep recessed articles such as cups, a smoother surface and more uniform structural matrix can be obtained if the mixture is hardened sequentially from the point furthermost from the vent hole to the point closest to the vent holes. For example referring to FIG. 3, it is preferable in some cases for the temperature of the molds to be the highest at bottom ends 7 and 11, with the temperature gradually decreasing toward top ends 6 and 9, where the temperature is the lowest.

Such a temperature zone differential within the molds helps to direct the vapor and air out the vent holes. As the solvent is vaporized at the bottom end of the molds, the vapor is absorbed into the adjacent mixture. The vapor thus gradually travels to the vent holes. Furthermore, since the mixture closest to the vent holes is the last to harden, the excess material is more easily expelled from between the molds. In contrast, if the molds were hottest near top ends 6 and 9, the vapor near bottom ends 7 and 11 would be forced to travel over the already hardened surface of the article, thereby possibly damaging the surface texture. Likewise, the excess material would already be hardened and its removal could result in disrupting the structural integrity of the article.

The mold temperature and the time for removing the solvent are interdependent and are further dependent on the thickness of the article and the amount of solvent present. The mold temperature of the present invention is preferably in a range from about 150° C. to about 220° C., with about 170° C. to about 210° C. being more preferred, and from about 190° C. to about 200° C. being most preferred. However, thicker articles may require lower temperatures. The time in which the solvent is preferably removed from the mixture ranges from about 1 second to about 15 minutes, with about 15 seconds to about 5 minutes being more preferable, and from about 30 seconds to about 1 minute being most preferable. It should be noted that in light of the endothermic process of the vaporization of the solvent and the rather short period of time that the molds are in contact with the mixture, the mixture within the interior of the molded article generally does not get as hot as the molds. Typically, the temperature of the mixture will not exceed about 130° C.

The volume of material positioned between the molds for subsequent heating also affects the resulting density of an article. If not enough material is introduced into the mold to form a complete article (no excess material is discharged) the resulting material will have a higher density and moisture content. This results from a lack of pressure build up and subsequent expansion. When sufficient material is added to produce the desired pressure (a minimum of excess material) the density of the article dramatically decreases.

Further increases in the amount of material will decrease the density of the article up to a point. Past this point, the addition of more material will have little or no further effect on the resulting density. For example, in the production of 12 oz. cups, the addition of 1 gram of extra material resulted in a decrease in density of about 0.005 g/cm$^3$. However, adding more than 35 grams of material resulted in no further decrease in the density and was merely wasted.

The pressure buildup within the molds is dependent both on the temperature of the molds and the size of the vent holes. The larger the vent holes, the less pressure that builds within the moldable mixture, resulting in less expansion and a more dense structural matrix of the molded article. Accordingly, the larger the vent holes, the smaller the cells within the structural matrix. However, if the vent holes are too large, the mixture will not be able to plug the vent holes, thereby preventing the required pressure buildup for the formation of the desired cell structure. (Such an arrangement may be preferred, however, if a more dense article is desired.) Another drawback to large vent holes is that they can create larger deformities on the surface of the articles at the point where the excess material is removed. The size of the deformities can be reduced by decreasing the size and increasing the number of the vent holes.

If the vent holes are too small, an excessive pressure will build up, resulting in deformation or even explosion of the article upon release of the pressure. The size of the cells can further be regulated by controlling the release of pressure. For example, by slowing down the rate of pressure drop, the sudden expansion force caused by vaporization of the solvent is decreased. This results in articles having smaller cells and thicker cell walls, which together produce a stronger article.

As previously discussed, by regulating the size of the vent holes, the size of the cells in the structural matrix can be regulated. The exact size and number of vent holes depends on the size of the article being produced. Larger articles require more vent holes. Examples of vent sizes and numbers to produce articles is shown later in the application in the Example Section. In the production of most articles of the present invention, the vent sizes will preferably range from about 0.05 mm² to about 15 mm², more preferably from about 0.2 mm² to about 5 mm², and most preferably from about 0.5 mm² to about 2 mm². The number of vent holes will preferably be in a range from about 1 to about 10, with about 2 to about 8 being more preferred, and about 4 to about 6 being most preferred. In a preferred method for manufacturing cups, it has been found that using 4 vent holes, each having a vent hole of about 1.9 mm², is preferred.

Cyclic separation of the molds is used to produce articles having increased skin thickness and density over a faster heating time. The step of cyclic separation is performed immediately after the mixture is positioned between the molds and includes the repeated steps of slightly raising or separating the molds and then bringing them back together. By separating the molds, vapor is permitted to easily and quickly escape through the sides of the molds, as opposed to having to be forced through the vent holes. Releasing the vapor helps to dry out the moldable material, which in turn increases the skin thickness of the resulting article. Once the step of cyclic separation is completed, the molds are locked and the process of forming the cellular article is completed with the remaining amount of solvent in the mixture.

As will be discussed later in greater detail, by decreasing the amount of solvent in the mixture through cyclic separation, the resulting article will have a higher density. Cyclic separation also permits the solvent to escape at a faster rate, thereby yielding an article in a shorter period of time. However, if speed is the only consideration, the mixture can initially be made with less solvent, and thus lessen or eliminate the need for cyclic separation of the molds.

The variables associated with cyclic separation include the time the molds are open, the time the molds are closed between openings, the number of separations, and the distance the molds are separated. Depending on the desired properties of the articles, the time the molds are opened and the time they are closed during the cyclic separation (which do not have to be the same) are each in a preferred range from about 0.2 seconds to about 5 seconds, with 0.3 seconds to about 1 second being more preferred, and from about 0.4 seconds to about 0.7 seconds being most preferred. The number of separations is typically in a preferred range from about 1 to about 20, with about 3 to about 10 being more preferred, and about 4 to about 7 being most preferred. Finally, the separation distance will preferably be within a range from about 1 mm to about 25 mm, with about 2 mm to about 10 mm being more preferred, and about 3 mm to about 5 mm being most preferred.

As will be discussed later in greater detail, selected admixtures such as humectants or plasticizers can be added to the mixtures to impart desired flexibility to the article during the forming step. If no such admixtures are combined with the mixture, and as a result of the removal of substantially all the solvent from the mixture, the article removed from the molds is often brittle and may be cracked or crushed. To instill the necessary flexibility and deformation-before-cracking to make the article useful, moisture is incorporated back into the starch-bound structural matrix. This process is referred to as "conditioning." The moisture is preferably applied by placing the article within a high humidity chamber at a predetermined temperature and humidity. Moisture within the highly humid environment is absorbed by the starch-based binder. The moisture softens the starch-based binder and increases the flexibility of the article. Since the starch-based binder has a natural affinity for water, the article can be conditioned by simply exposing the article to normal environmental conditions. Over time, the article will absorb moisture from the air until it reaches a point of equilibrium. However, depending on the humidity in the air, such a process can take hours, days, or even weeks. Furthermore, in very dry climates, there may be insufficient moisture in the air to adequately condition the article.

The use of a humidity chamber speeds up the process to within a matter of minutes, making it possible to mass-produce the articles. The variables associated with the humidity chamber include time, temperature, and humidity. Studies have found that higher humidities up to about 95% are preferred, as they decrease the amount of time necessary for the article to absorb sufficient moisture. It is preferred, however, that water not be directly applied to the article, nor should the humidity be so high that water condenses on the article. The application of water directly onto the surface of the article can cause the starch-based binder to swell, thereby forming an irregularity on the surface of the article. Accordingly, the humidity within the high humidity chamber of the present invention will preferably be in a range from about 50% to about 95%, with about 75% to about 95% being more preferred, and about 85% to about 95% being most preferred.

Although increasing the temperature in the humidity chamber also increases the rate of absorption of moisture, if the article absorbs moisture at an excessive rate, the exterior will become unstable and lose its shape prior to the interior of the article obtaining the required moisture content. Furthermore, it is difficult and expensive to obtain humidity chambers that can create an environment having both high temperature and humidity. Accordingly, the temperature within the humidity chamber will preferably be in a range from about 30° C. to about 60° C., with about 35° C. to about 55° C. being more preferred, and from about 40° C. to about 50° C. being most preferred.

The time in which the articles remain in the humidity chamber is, of course, dependent on the temperature and humidity level. Most articles obtain desired properties with a moisture content of less than about 20% by weight of the article. The present articles can be manufactured having a moisture content preferably in a range from about 2% to about 20% by weight of the article, with about 2% to about 15% being more preferred, and about 4% to about 10% being most preferred. As will be discussed later in greater detail, the required moisture content is in part dependent on the concentration of inorganic fillers in the articles. The time period for an article to obtain the desired moisture content is also dependent on the thickness of the article. The thicker the article, the longer it will take for the moisture to penetrate to the center of the article. The rate of absorption and the necessary moisture content to yield an article with the desired properties are also dependent on the type and quantity of filler, which will be discussed later in the section on aggregates.

From a health standpoint, it is desirable to minimize the moisture content in an article, preferably to below about 10%. The lower the moisture content, the less chance of bacterial growth in the article and mold formation on the surface. This is especially important for food and beverage containers. Furthermore, absorbing too much moisture can cause the article to become unstable. Based on the above parameters for temperature and humidity, the present articles are preferably left in the humidity chamber for a period of time in a range from about 1 minute to about 30 minutes, with from about 5 minutes to about 15 minutes being more preferred, and from about 5 minutes to about 10 minutes being most preferred. Such periods, however, can be extended for very thick articles and shortened for very thin articles.

Using the above processes in conjunction with the mixture components outlined below, cellular articles of the present invention are preferably manufactured to have a density in a range from about 0.05 g/cm$^3$ to about 1 g/cm$^3$, with about 0.1 g/cm$^3$ to about 0.5 g/cm$^3$ being more preferred, and about 0.15 g/cm$^3$ to about 0.25 g/cm$^3$ being most preferred.

The remaining processing steps include optional steps, such as printing and coating. These steps, along with stacking, bagging, and boxing, are performed substantially identically to that of conventional articles made from materials such as paper, plastic, polystyrene foam, and other organic materials. These steps are discussed later in the disclosure.

IV. COMPOSITIONAL EFFECTS ON FORMATION

To facilitate implementation of the microstructural engineering approach, each of the components in the moldable mixture is discussed. The discussion includes the properties and preferred proportions of each of the components, along with how each component is interrelated with processing parameters, properties of the moldable mixture, and properties of the final article.

A. Starch-based Binders.

The moldable mixtures used to manufacture the inorganically filled, cellular articles of the present invention develop their strength properties through the gelation and subsequent drying out of substantially solvated starch-based binder. Starch is a natural carbohydrate chain comprising polymerized sugar molecules (glucose). Plants manufacture and store the starch as food for itself and for seeds. Starch is formed in granules that comprise two types of glucose polymers: the single-chain amylose that is soluble in water and other solvents and the branched amylopectin that is insoluble in water.

In general, starch granules are insoluble in cold water; however, if the outer membrane has been broken by, e.g., grinding, the granules can swell in cold water to form a gel. When the intact granule is treated with warm water, the granules swell and a portion of the soluble starch (amylose) diffuses through the granule wall to form a paste. In hot water, the granules swell to such an extent that they burst, resulting in gelation of the mixture. The exact temperature at which a starch-based binder swells and gelates depends on the type of starch-based binder.

Gelation is a result of the linear amylose polymers, which are initially compressed within the granules, stretching out and cross-linking with each other and with the amylopectin. After the water is removed, the resulting mesh of interconnected polymer chains forms a solid material that can have a tensile strength up to about 40–50 MPa. The amylose polymers can also be used to bind individual aggregate particles and fibers within the moldable mixture (thereby forming a highly inorganically filled matrix). Through careful microstructural engineering, highly inorganically filled containers and other articles can be designed having desired properties including flexural strengths up to about 8 MPa.

Although starch is produced in many plants, the most important sources are seeds of cereal grains (e.g., corn, waxy corn, wheat, sorghum, rice, and waxy rice), which can also be used in the flour and cracked state. Other sources include tubers (potato), roots (tapioca (.i.e., cassava and maniac), sweet potato, and arrowroot), and the pith of the sago palm.

As used in the specification and the appended claims, the term "starch" or "starch-based binder" includes unmodified starches (amylose and amylopectin) and modified starches. By modified, it is meant that the starch can be derivatized or modified by typical processes known in the art such as, e.g. esterification, etherification, oxidation, acid hydrolysis, cross-linking, and enzyme conversion. Typical modified starches include esters, such as the acetate and the half-esters of dicarboxylic acids/anhydrides, particularly the alkenyl-succinic acids/anhydrides; ethers, such as the hydroxyethyl and hydroxypropyl starches; oxidized starches, such as those oxidized with hypochlorite; starches reacted with cross-linking agents, such as phosphorus oxychloride, epichlorohydrin, hydrophobic cationic epoxides, and phosphate derivatives prepared by reaction with sodium or potassium orthophosphate or tripolyphosphate, and combinations thereof. Modified starches also include seagel, long-chain alkylstarches, dextrins, amine starches, and dialdehyde starches. Unmodified starch-based binders are generally preferred over modified starch-based binders because they are significantly less expensive and produce comparable articles.

Pre-gelatinized starch-based binders can also be added to the moldable mixture. Pregelatinized starch-based binders are starches that have previously been gelated dried, and ground back into a powder. Since pro-gelatinized starch-based binders gelate in cold water, such starch-based binders can be added to the moldable mixture to increase the mixture viscosity prior to being heated. The increased viscosity prevents settling and helps produce thicker cell walls as will be discussed later in greater detail. In such cases, the pre-gelated starch-based binder might be considered to be acting as a rheology-modifying agent.

Preferred starch-based binders are those that gelate and produce a high viscosity at a relatively low temperature. For example, potato starch quickly gelates and reaches a maximum viscosity at about 65° C. The viscosity then decreases, reaching a minimum at about 95° C. Wheat starch acts in a similar fashion and may be preferred, depending on cost and availability. Such starch-based binders are valuable in producing thin-walled articles having a smooth surface and a skin with sufficient thickness and density to impart the desired mechanical properties.

As previously discussed, the portion of the moldable mixture closest to the heated molds is rapidly heated. By using a mixture containing potato starch, the portion of the moldable mixture closest to the heated molds is at a maximum viscosity during drying and formation of the cellular structure. Accordingly, the cells near the sides of the article have a minimum cell size and a maximum cell wall thickness. In contrast, the cellular structure in the moldable mixture at the interior section of the article is not formed until after the viscosity has decreased. As a result, the cells in the interior section are much larger. This theory is consistent with the formation of the cellular matrix as previously described.

It may be preferred to combine different types of starch-based binders to regulate the cellular matrix. In contrast to potato starch, the viscosity of a mixture containing corn starch gradually increases as the temperature increases. Accordingly, corn starch produces a relatively low viscosity mixture compared to potato starch at 65° C., but produces a relatively high viscosity mixture compared to potato starch at 95° C. By combining both corn starch and potato starch within the same mixture, the viscosity of the mixture at the interior section of the article is increased at the point when the cells are formed. The increased viscosity decreases the cell size and increases the cell wall thickness, thereby increasing the fracture toughness of the article.

The concentration of starch-based binder within the moldable mixtures of the present invention arc preferably in a range from about 10% to about 80% by weight of total solids, more preferably in a range from about 30% to about 70%, and most preferably from about 40% to about 60% by weight. Furthermore, combinations of different starches may be employed to more carefully control the viscosity of the mixture throughout a range of temperatures, as well as to affect the structural properties of the final hardened article.

B. Solvent.

A solvent is added to the moldable mixture in order to lubricate the particles, solvate or at least disperse the starch-based binder, and act as an agent for gelating the starch-based binder. A preferred solvent is water, but can include any liquid that can disperse and gelate the starch-based binder and be subsequently removed form the moldable mixture.

The amount of heat energy required to remove the solvent must be great enough to overcome the boiling point of the solvent being used. Besides boiling at 100° C., water has a relatively large heat of vaporization compared to most other solvents, including alcohols. Both the boiling point and the heat of vaporization of water can be reduced through the addition of alcohol co-solvents with the water. Alcohols, such as ethanol and isopropyl alcohol, are preferable because they form lower boiling point azeotropic mixtures with water and are relatively inexpensive and readily available. Production costs may be optimized by using a mixture of water and alcohol as long as the benefits of using alcohol co-solvents, such as the savings in time and energy, are not outweighed by the increased cost of the alcohol.

The solvent also serves the function of creating a moldable mixture having the desired rheological properties, including viscosity and yield stress. These properties are general ways of approximating the "workability" or flow properties of the moldable mixture. The viscosity of the mixtures of the present invention may range from being relatively low (similar to that of a thin batter) up to being very high (similar to paste or clay). Where the viscosity is so high that the material is initially moldable and dough-like in the green state, it is generally better to refer to the yield stress, rather than the viscosity, of the mixture. The yield stress is the amount of force necessary to deform the mixture. As will be discussed later, the amount of solvent required to impart a certain viscosity and/or yield stress to the mixture is highly dependent on the packing density and specific surface area of the aggregate material. These are also dependent on the addition of admixtures, such as rheology-modifying agents and dispersants.

At a minimum, a sufficient amount of the solvent should be added to disperse and uniformly gelate the moldable mixture. The solvent content should also be sufficient to function with the processing equipment. As will be discussed later in greater detail, moldable mixtures with high viscosity and yield stress may require an auger apparatus to mix and convey the mixture to the mold. In contrast, low viscosity mixtures can use conventional mixers to combine the components and pumps to transfer the mixture.

Increasing the solvent content also increases the number and size of the cells in the structural matrix and lowers the density of the resulting article. In theory, the more solvent in a mixture, the more vapor that is produced, and thus, the more cells that are formed. Furthermore, the more solvent in a mixture, the lower the viscosity of the mixture, and thus, the larger the size of the cells. However, the more solvent added to a mixture, the more time and energy required to remove the solvent, and thus, the slower and more expensive the process. In addition, if the solvent content gets too high, the mixture may be unable to produce form-stable, crack free articles. In contrast, using low water yields a more dense product having smaller cells.

Very low viscosity mixtures can also result in settling of the components, most notably the ungelated starch-based binder and aggregate particles. Settling may occur in the mixing stage, transfer stage, or forming stage. Settling can yield articles having varying properties from batch to batch or within the structural matrix of a single article. Experiments have also found that very low viscosity mixtures can splash out of the female mold during mating with the male mold. This is especially true for shallow articles such as plates.

Based on the above discussion, the percentage of solvent in the mixture depends, in part, on the processing equipment, the desired viscosity, and the desired properties. The amount of solvent added to the mixtures of the present invention will preferably be in a range from about 20% to about 70% by total weight of the mixture, more preferably from about 30% to about 60%, and most preferably from about 40% to about 50%.

As stated above, the viscosity of the moldable mixture is dependent on several variables such as the water content, the presence of admixtures such as rheology-modifying agents and dispersants, whether the starch-based binder has been pre-cooked, and the packing density of the aggregate. Functional articles can be made from moldable mixtures having a large range of viscosities, from as low as about 0.05 Pa·s to as high as about $10^{10}$ Pa·s. Low viscosity mixtures can be poured into the molding apparatus while high viscosity mixtures may be placed into the molds by auger or piston insertion. Furthermore, high viscosity mixtures having a consistency similar to that of clay or dough can be cut into small portions which can then be mechanically placed between the molds. In general, the moldable mixtures of the present invention will preferably have a viscosity in a range from about 0.01 Pa·s to about 300 Pa·s, more preferable from about 0.05 Pa·s to about 30 Pa·s, and most preferably from about 0.2 Pa·s to about 3 Pa·s. The rheology of the moldable mixtures may also be described in terms of yield stress, which will preferably range up to about 500 kPa, more preferably up to about 300 kPa, and most preferably up to about 100 kPa.

C. Aggregates.

The terms "aggregate" and "fillers" as used in the specification and the appended claims include both inorganic and inert organic particles but do not typically include fibers. The term "inert organic particles" is further defined to include organic components that are not intended to primarily chemically or mechanically act as a binding agent within the moldable mixture. Examples of inert organic particles include seeds, grains, cork, and plastic spheres. Although most aggregates within the scope of the present invention are insoluble in water, some aggregates are slightly soluble in water, and some aggregates can be formed in situ by precipitation or polymerization. (However, many seeds contain starch, proteins, or other polymeric materials in high enough quantities that they may be released into the moldable mixture and impart a binding force within the mixture.)

Articles with a high filler or aggregate content can be made having a lower cost, improved mechanical and structural properties, better health safety, and minimal environmental impact. Studies have found that functional articles of the present invention can be made using fillers up to about 90% by volume.

From a materials cost stand point, it is more economical to replace the relatively expensive starch-based binder with a less expensive aggregate. Typically, the density and weight of an article increase with increased filler. As the density of the mixture increases, the volume of material used to make the article also increases. For example, holding all other variables constant, a 40% increase in the concentration of calcium carbonate results in about a 30% savings in the consumption of starch-based binder. It is believed that as the percentage of filler increases, however, the ability of the cells within the starch-bound matrix to expand is decreased, thereby increasing the density and requiring more material to make the same article. Nevertheless, even with the increase in density, it may be more economical to produce articles having a higher filler content compared to those having a relatively low filler content.

Increasing the filler is also beneficial from a processing standpoint. Starch has a natural affinity for water (the most common solvent used). Accordingly, more energy is required to remove water from the starch-based binder than from a filler. By increasing the filler content, there is less starch-based binder to absorb the water and less water is needed to gelate the starch-based binder. Furthermore, more of the water is absorbed by the filler. Accordingly, processing costs are decreased by using high concentrations of filler, since less solvent and energy is required to produce a form-stable article. Furthermore, the inorganic aggregate can also be used as a means for conducting heat quicker and more uniformly throughout the entire structural matrix. As a result, form-stable articles can be made quicker and with a more uniform cross-section. The ability of the aggregate to conduct heat is, of course, a function of the type of aggregate and can be selected by those skilled in the art.

By selecting an appropriate filler, the specific heat of the final article can also be decreased. For example, articles made with calcium carbonate were found to have a lower specific heat than those that contain only starch. As a result, such articles can be used for heating up food or other items without significantly heating up the article. For example, the present articles can be used for heating up or cooking food in an oven or microwave without destruction of the article. By selecting fillers with low specific heat, the articles of the present invention can be made having a specific heat in a preferred range from about 0.3 J/g·K to about 2.0 J/g·K at a temperature of 20° C., with about 0.5 J/g·K to about 1.5 J/g·K being more preferred, and about 0.7 J/g·K to about 1.0 J/g·K being most preferred.

Increasing the filler content is also beneficial in varying the shape of the structural matrix of the article. As previously discussed, if insufficient moisture is removed from the mixture during formation of the article, the remaining solvent can cause the mixture to stick to the mold and may also cause the article to crack or bubble. Likewise, the article can also crack if too much moisture is removed from the mixture. There is, therefore, a margin of time (dependent on variables such as the heat of the molds and amount of solvent in the mixture) within which the articles should be removed from the heated molds to prevent cracking or sticking of the articles. This margin of time becomes narrower as the concentration of starch-based binder within a moldable mixture is increased. As the margin of time for removal of the article from the mold decreases, it becomes more difficult to manufacture articles having cross-sections of varying thicknesses.

That is, at times it may be preferred to increase the thickness at a specific section of an article to increase properties such as strength or insulation at that section. However, heating the mixture for a sufficient period of time to remove the solvent from the thick section may remove too much moisture from the thinner sections. Thus, mixtures having a high starch-based binder content are typically limited to the manufacture of articles having a more uniform cross-section.

In contrast, studies have found that as the percentage of inorganics increases and the percentage of starch-based binder decreases, the margin of time in which the articles can be removed form the molds without sticking or cracking increases. As a result, articles having a high concentration of inorganics can be used to more effectively manufacture articles having varying cross-section thickness. Articles have been made in which the thickness of the article varies by a factor of three.

There are also health benefits to using higher concentrations of filler. Increasing the amount of aggregate or filler in a mixture decrease the amount of water needed to be absorbed by the article during the conditioning stage to obtain the desired properties. As previously discussed, minimizing the amount of water in an article is preferred since it minimizes the chance for bacterial growth. Studies have found that the more calcium carbonate in a mixture, the slower the moisture is absorbed by the article in the conditioning stage. It was also discovered that the more calcium carbonate in a mixture, the less moisture needed to be adsorbed by the article to produce the same properties. Accordingly, increasing the filler content decreases the required moisture content in the final product, as well as the propensity of the article to absorb even more water from the atmosphere.

By selecting the type of filler used, the properties of the filler can be transferred to the finished article. The aggregate materials employed in the present invention can be added to increase the strength (tensile modulus and, especially, compressive strength), increase the modulus of elasticity and elongation, decrease the weight, and/or increase the insulation ability of the resultant inorganically filled article. In addition, plate-like aggregates, such as mica and kaolin, can be used in order to create a smoother surface finish in the articles of the present invention. Typically, larger aggregates, such as calcium carbonate, give a matte surface, while smaller particles give a glassy surface.

Finally, there are also environmental benefits to having a high filler content. Articles with high filler contents are more easily decomposed back into their natural components, thereby minimizing visual blight. Furthermore, minimizing the starch-based binder reduces the amount of water that is consumed in the growing of starch-bearing plants.

Particle packing is a preferred process that can be used to maximize the amount of inorganics within the mixture and thus optimize the above discussed properties. Studies have found that the packing density of a mixture is increased where two or more types of aggregate having a difference in their average particle size diameter are used. Particle packing is the processes of selecting different sizes, shapes, and concentration of the aggregates to minimize the interstitial space between the particles and maximize the packing density. By minimizing the interstitial space, less solvent and starch-based binder needs to be added to the mixture to fill the interstitial space.

To form an article having a more form-stable, crack-free structural matrix, the starch-based binder must usually be added in an amount sufficient to bind the aggregate together. As previously discussed, the mixture is prepared by combining an inorganic aggregate with a solvent and starch-based binder. The solvent disperses the starch-based binder and controls the viscosity. During the formation process, a majority of the solvent is removed. The volume of solvent and starch-based binder that remains within the final article must be sufficient to coat the aggregate particles and fill the interstitial voids between the particles so that the starch-based binder can bind the aggregate particles together.

If insufficient quantities of the starch-based binder are added, minute pores form between the aggregate particles. These minute pores are different from the cells which are preferably designed within the structural matrix. Whereas the cells result from the expansion of the solvent during the processing step, the pores result from an insufficient amount of starch-based binder to bind the aggregate particles together. If the volume of starch-based binder is further decreased, the volume of the binder becomes so minute that either the structural matrix will crack during the formation process or the mixture will never consolidate into a form-stable article.

The ability of the starch-based binder to hold the aggregate particles together is a function of its intrinsic bond strength, covering power, and its ability to bond with the surface of a particular material. In the manufacture of articles in which a binder matrix holds together a very large concentration of matter, the binder preferably envelops each of the matter particles. If the matter to be held together has a relatively high surface area, then the amount of binder required to envelop the matter particles increases. That is, the ratio of binder to matter increases as the specific surface area of the matter increases. In the present invention, it is often preferable to select an aggregate material having lower specific surface area in order to reduce the binder to matter ratio. In addition, as explained more fully below, increasing the particle packing density of the aggregate material also decreases the amount of binder needed to fully envelop the aggregate particles. An understanding of the interaction between particle size distribution, the particle packing density, specific surface area, and binder volume is at the core of the successful loading of relatively high levels of inorganic solids within the starch-bound matrix.

In addition to specific surface area, the volume of starch-based binder required is related to the volume of interstitial space between the particles. The volume of interstitial space increases in a mixture as either the packing density of the aggregate decreases or the percentage of the aggregate in the mixture increases. Accordingly, by holding the concentration of starch-based binder and aggregate constant by weight of the solids within a mixture and decreasing the packing density of the aggregate, the interstitial space will increase to a point in which the volume of starch-based binder is insufficient to adequately fill the interstitial space. Likewise, by adding a higher concentration of aggregates, although the percentage of interstitial space remains relatively constant, the total volume of interstitial space increases. As a result, more starch-based binder must be added to the mixture to adequately fill the spaces. As more starch-based binder is added, however, the concentration of inorganics decreases in the final articles, thereby increasing the cost and minimizing the above discussed benefits.

In contrast, as the packing density of the aggregate increases, the interstitial space between the particles decreases. As a result, less starch-based binder and solvent are needed to fill the interstitial space. By decreasing the amount of starch-based binder to only the minimum amount needed to bind the aggregate particles and impart the desired physical properties, the percentage of inorganics in the final articles may be increased without sacrificing the desired strength and rheological properties. As such, the cost of the articles is decreased and the above discussed properties are enhanced.

The volume of starch-based binder required is also dependent on the size and shape of the aggregate. Aggregates having a large specific surface area compared to aggregates of equal volume having a small specific surface area require more starch-based binder to coat the particles. Coating the aggregate with the gelated starch-based binder is necessary to bind the aggregate together. In addition, the greater specific surface area utilizes more of the available water within the mixture in the coating of the particle surfaces, resulting in less water being available to react with and gelate the starch.

Accordingly, in order to maximize the inorganics and minimize the volume of starch-based binder, it is preferable for the aggregates to have a smaller specific surface area. The highly inorganically filled articles of the present invention preferably employ aggregates having a specific surface area in a range from about 0.1 $m^2/g$ to about 400 $m^2/g$, with about 0.15 $m^2/g$ to about 50 $m^2/g$ being more preferred, and about 0.2 $m^2/g$ to about 2.0 $m^2/g$ being most preferred. Particles having a relatively small specific surface area typically have a large average diameter and are spherical in shape.

For a mixture to obtain the desired viscosity to form an article, the solvent must be added in an amount sufficient to coat all of the particles and fill all remaining interstitial space between the particles. The interstitial space relevant to the solvent include the spaces between the aggregates and also between the any remaining ungelated starch granules. Even with the interstitial space filled with solvent, however, the mixture still may have a relatively high viscosity. To obtain a desired lower viscosity, an additional amount of solvent must be added to the mixture. That is, it is the amount of solvent added beyond what is necessary to coat the particles and fill the interstitial space that actually provides the lubrication between the surfaces of the particles.

The following illustrates how increasing the packing density decreases the amount of solvent and starch-based binder needed to fill the interstitial space. If the particle packing density of the moldable mixture is 0.65, a solvent will be included in an amount of roughly 35% by volume in order to substantially fill the interstitial voids between the particles. On the other hand, a moldable mixture having a particle-packing density of 0.95 will only require solvent in an amount of about 5% by volume in order to substantially fill the interstitial voids. This is a seven-fold decrease in the amount of solvent which must be added in order to substantially fill the interstitial voids. Reducing the amount of solvent that would otherwise be required to fill the interstitial space permits the articles to be made more quickly and with a lower energy consumption.

In order to optimize the packing density, differently sized aggregates with particle sizes ranging from as small as about 0.05 μm to as large as about 2 mm may be used. To maximize the strength of the cell walls, it is preferred that the particles not be greater then ¼ the thickness of the cell walls. Spherical particles having minimal fractured surfaces are preferred since they can be packed to a higher density and have the lowest specific surface area. In order to obtain an optimized level of particle packing, it is preferable for the average particle size within one size range to be roughly 10 times the particle size of the next smallest particle range. (In many cases, the ratio will differ and is dependent on the relative natural packing densities of the different aggregates to be combined.) For example, in a two-component system, it will be preferable for the average particle size of the coarse component to be at about 10 times the average particle size of the fine component. Likewise, in a three-component system, it will be preferable for the average particle size of the coarse component to be about 10 times the average particle size of the medium component, which will likewise preferably be about 10 times the size of the fine component. Nevertheless, as more differently sized particles are added, the ratio between the particle size magnitudes need not always be this great and may only be two-fold in some cases.

In general, a two-component (or binary) packing system will seldom have an overall packing density higher than about 80%, while the upper limit for a three-component (or ternary) system is about 90%. To obtain higher particle packing it will be necessary in most cases to add four or more components, although having broader and more optimized particle sizes among two- or three-component systems can yield higher overall particle packing than 80% and 90%, respectively.

For example, in a three-component system, it has been found preferable for the fine aggregate particles to have diameters in a range from about 0.01 $\mu$m to about 2 $\mu$m, for the medium aggregate particle to have diameters in a range from about 1 $\mu$m to about 20 $\mu$m, and for the coarse aggregates to have a diameter in a range from about 100 $\mu$m to about 2 mm. In a two component system, any two of these ranges may be preferable.

Improved packing densities for the aggregate can be obtained by physically combining different sizes and amounts of aggregates and then using conventional testing methods to determine the combination of aggregates that has the highest packing density. In light of the possible permutations, however, such a process is very time consuming and does not necessarily provide the best results. In the preferred embodiment, the aggregates are selected to obtain a desired packing density based on the particle packing process as disclosed in the following article coauthored by one of the inventors of the present invention: Johansen, V. & Andersen, P. J., "Particle Packing and Concrete Properties," *Materials Science of Concrete II* at 111–147, The American Ceramic Society (1991). Further information is available in the Doctoral Dissertation of Anderson, P. J., "Control and Monitoring of Concrete Production—A Study of Particle Packing and Rheology," The Danish Academy of Technical Sciences. The preferred process of particle packing is also discussed in detail in U.S. patent application Ser. No. 08/109,100, now abandoned, entitled "Design Optimized Compositions and Processes for Microstructurally Engineering Cementitious Mixtures", to Per Just Andersen and Simon K. Hodson, filed on Aug. 18, 1993. For purposes of disclosure, the foregoing article, doctoral dissertation, and patent application are incorporated herein by specific reference.

The above references teach the use of mathematical models to determine the combination of defined groups of particles that will result in the maximum packing density. The models are based on the average diameter size and natural packing density for each type of aggregate. In general, the combined particle packing density for the aggregate mixture will preferably be in a range from about 0.65 to about 0.99, more preferably from about 0.70 and about 0.95, and most preferably from about 0.75 and about 0.90. (The added cost of achieving 99% particle packing efficiency is often prohibitive; therefore, most preferred packing densities are somewhat less).

There are a variety of types of aggregates that can be used in the present invention. Inorganic materials commonly used in the paper industry, as well as more finely ground aggregate materials used in the concrete industry, may be used in the moldable mixtures of the present invention. The size of the aggregate or inorganic filler will usually be many times greater than the inorganic filler materials typically used in the paper industry.

Examples of useful aggregates include perlite, vermiculite, sand, gravel, rock, limestone, sandstone, glass beads, aerogel, xerogels, seagel, mica, clay, synthetic clay, alumina, silica, fly ash, fused silica, tabular alumina, kaolin, microspheres, hollow glass spheres, porous ceramic spheres, gypsum (calcium sulfate dihydrate), calcium carbonate, calcium aluminate, lightweight polymers, xonotlite (a crystalline calcium silicate gel), lightweight expanded clays, hydrated or unhydrated hydraulic cement particles, pumice, exfoliated rock, and other geologic materials. Partially hydrated and hydrated cement, as well as silica fume, have a high surface area and give excellent benefits such as high initial cohesiveness of the freshly formed article. Even discarded inorganically filled materials, such as discarded containers or other articles of the present invention can be employed as aggregate fillers and strengtheners. It will also be appreciated that the containers and other articles of the present invention can be easily and effectively recycled by simply adding them to fresh moldable mixtures as an aggregate filler. Hydraulic cement can also be added in either its hydrated or unhydrated form.

Both clay and gypsum are particularly important aggregate materials because of their ready availability, extreme low cost, workability, ease of formation, and because they can also provide a degree of binding and strength if added in high enough amounts (in the case of gypsum hemihydrate). Because gypsum hemihydrate can react with the water within the moldable mixture, it can be employed as a means for holding water internally within the molded article.

In some cases, it may be desirable to form ettringite on the surface of the aggregate particles in order to improve the interaction and bond interface between the aggregate particles and the starch-based binder.

Because of the nature of the moldable mixtures and articles made therefrom, it is possible to include lightweight aggregates having a high amount of interstitial space in order to impart an insulation effect with the molded articles. Examples of aggregates which can add a lightweight characteristic and higher insulation to the molded articles include perlite. vermiculite, glass beads, hollow glass spheres, synthetic materials (e.g, porous ceramic spheres, tabular alumina, etc.), cork, pumice, and lightweight expanded clays, sand, gravel, rock, limestone, sandstone, and other geological materials.

Porous aggregates can also be used to remove unwanted air bubbles from the article during formation. Solvents escape from the moldable mixture by first traveling to the surface of the molds and then traveling along the mold surface to the vent holes. At times, air bubbles get trapped between the male mold and the outside surface of the article, thereby pocking the surface. A porous aggregate within the moldable mixture can be used to absorb a significant portion of this entrapped gas, thereby helping to reduce the incidence of pocking. Of course, the entrapped gas bubbles can be removed through the application of a vacuum.

Porous, lightweight aggregates, including zeolites, can be used as a means for conditioning the article during the forming process. Porous aggregates can be presoaked in a solvent or held in the mixture for a sufficient period of time to absorb the solvent. As the mixture containing the presoaked aggregate is heated to form the article, the solvent is released more slowly from within the porous aggregate than from the remainder of the mixture. As a result, a portion of the solvent will remain within the porous aggregate in the form-stable article. Once the article is formed and removed from the heated molds, the solvent within the porous aggregate can diffuse into the surrounding structural matrix, thereby conditioning and softening the structural matrix.

In addition to conventional aggregates used in the paper and cement industries, a wide variety of other aggregates, including metals and metal alloys (such as stainless steel, iron, copper, silver, and gold), balls or hollow spherical materials (such as glass, polymeric, and metals), filings, and pellets can be added to the mixture.

Another class of aggregates that may be added to the inorganically filled mixture includes gels and microgels such as silica gel, calcium silicate gel, aluminum silicate gel, and the like. These can be added in solid form as any ordinary aggregate material might, or they may be precipitated in situ. Because they tend to absorb solvents, they can be added to reduce the solvents content (which will increase the viscosity and yield stress) of the moldable mixture.

In addition, the highly hygroscopic nature of silica-based gels and microgels allows them to be used as moisture regulation agents within the final hardened article. By absorbing moisture from the air, the gels and microgels will cause the articles to retain a predetermined amount of moisture under normal ambient conditions. (Of course, the rate of moisture absorption from the air will correlate with the relative humidity of the air). Controlling the moisture content of the articles allows for more careful control of the elongation, modulus of elasticity, bendability, foldability, flexibility, and ductility of the articles. Other moisture retention admixtures, such a $MgCl_2$, are discussed more fully below.

It is also within the scope of the present invention to include polymerizable inorganic aggregate materials, such as polymerizable silicates, within the moldable mixture. These may be added to the mixture as ordinary silica or silicates, which are then treated to cause a polymerization reaction in situ in order to create the polymerized silicate aggregate. Polymerized inorganic aggregates are often advantageous in certain applications because of their increased flexibility compared to most other inorganic aggregate materials.

The thermal conductivity or "k-factor" (defined as $W/m\cdot K$) of the present articles can be selected by controlling the cellular structural matrix. Articles can be made having a low k-factor by having a higher concentration of cells within the structural matrix. In embodiments in which it is desirable to obtain a container or other article having an even higher insulation capability, it may be preferable to incorporate into the highly inorganically filled matrix a lightweight aggregate which has a low thermal conductivity. Generally, aggregates having a very low k-factor also contain large amounts of trapped interstitial space, air, mixtures of gases, or a partial vacuum which also tends to greatly reduce the strength of such aggregates. Therefore, concerns for insulation and strength tend to compete and should be carefully balanced when designing a particular mixture.

Preferred insulating, lightweight aggregates include expanded or exfoliated vermiculite, perlite, calcined diatomaceous earth, and hollow glass spheres—all of which tend to contain large amounts of incorporated interstitial space. However, this list is in no way intended to be exhaustive, these aggregates being chosen because of their low cost and ready availability. Nevertheless, any aggregate with a low k-factor, which is able to impart sufficient insulation properties to the container or other article, is within the scope of the present invention. In light of the foregoing, the amount of aggregate which can be added to the moldable mixture depends on a variety of factors, including the quantity and types of other added components, as well as the particle packing density of the aggregates themselves. By controlling the cellular structure and the addition of lightweight aggregate, articles can be made having a preferred k-factor in a range of about 0.03 $W/m\cdot K$ to about 0.2 $W/m\cdot K$. Insulating articles can have a more preferred k-factor in a range of about 0.04 $W/m\cdot K$ to about 0.06 $W/m\cdot K$. Non-insulating articles can have a more preferred k-factor in a range of about 0.1 $W/m\cdot K$ to about 0.2 $W/m\cdot K$.

The inorganic aggregates will preferably be included in an amount in a range from about 20% to about 90% by weight of the total solids within the inorganically filled moldable mixture, more preferably in a range from about 30% to about 70%, and most preferably in a range from about 40% to about 60%. The inert organic aggregates will preferably be included in an amount in a range from about 5% to about 60% by weight of the total solids, more preferably in a range from about 15% to about 50%, and most preferably in a range from about 25% to about 40% by weight. Lightweight aggregates, defined as those having a density lower than about 1 $g/cm^3$, are preferably included in an amount in a range from about 5% to about 85% by volume of the inorganically filled moldable mixture, more preferably in a range from about 15% to about 65%, and most preferably in a range from about 25% to about 55% by volume.

As set forth above, differently sized aggregate materials may be added in varying amounts in order to affect the particle-packing density of the moldable mixture. Depending upon the natural packing density of each aggregate material, as well as the relative sizes of the particles, it is possible that the resulting volume of the combined aggregates will be less than the sum of the volumes of the aggregates before they were mixed.

D. Mold-Releasing Agents.

To assist in removing the form-stable article from the molds, a mold-releasing agent can be added to the moldable mixture. A preferred mold-releasing agent is magnesium stearate. Magnesium stearate functions as a lubricant and emulsifier and is well known as an anti-caking agent that is insoluble in water. On a more general scale, medium- and long-chain fatty acids, their salts, and their acid derivatives can be used as mold-releasing agents. The preferred medium and long chain fatty acids typically occur in the production of vegetable and animal fats and have a carbon chain greater than $C_{12}$. The most preferred fatty acids have a carbon chain length from $C_{16}$ to $C_{18}$. The fats and salts used herein need not be in a pure form but merely need to be the predominant component. That is, the shorter or longer chain length fatty acids, as well as the corresponding unsaturated fatty acids, can still be present.

Various waxes, such as paraffin and bees wax, and Teflon-based materials can also be used as a mold releasing agent. One of the added benefits of using wax is that it can also act as a coating material, as discussed later. Other materials, such as CaS, calcium silicate and Lecithin, have been found to work as mold releasing agents. To further assist in releasing the articles from the molds, the molds can be polished, chrome plated, or coated with, e.g., nickel, Teflon, or any other material that limits the tendency of the article to stick to the molds.

The above mold releasing agents are preferably added to the mixture in a range from about 0.05% to about 15% by weight of the total solids, more preferably in a range from about 0.1% to about 10%. and most preferred in a range from about 0.5% to about 5%.

E. Fibers.

As used in the specification and the appended claims, the terms "fibers" and "fibrous materials" include both inorganic fibers and organic fibers. Fibers have successfully been incorporated into brittle materials, such as ceramics, to increase the cohesion, elongation ability, deflection ability, toughness, fracture energy, and flexural, tensile, and, on occasion, compressive strengths of the material. In general, fibrous materials reduce the likelihood that the highly inorganically filled containers or other articles will shatter when cross-sectional forces are applied. Although fibers have been found useful in increasing these properties in the articles of the present invention, their success has been limited.

As was previously discussed, the formed articles of the present invention have a foamed or cellular structural matrix. As a result, there is a limited amount of interfacial surface area for load transfer between the fibers and structural matrix. That is, the fibers are connected to the structural matrix of the formed articles only by the walls dividing the cells. The remainder of the fiber is suspended in the cell. In some cases, the fibers are small enough to reside within the cell. As a result of the minimal contact between the fibers and the structural matrix of the article, only a limited portion of the properties of the fibers are incorporated into the structure matrix.

Fibers which may be incorporated into the inorganically filled matrix preferably include naturally occurring organic fibers, such as cellulosic fibers extracted from hemp, cotton, plant leaves, sisal, abaca, bagasse, wood (both hard wood or soft wood, examples of which include southern hardwood and southern pine, respectively), or stems, or inorganic fibers made from glass, graphite, silica, ceramic, or metal materials.

Recycled paper fibers can be used, but they are somewhat less desirable because of the fiber disruption that occurs during the original paper manufacturing process. Any equivalent fiber, however, which imparts strength and flexibility is also within the scope of the present invention. The only limiting criteria is that the fibers impart the desired properties without adversely reacting with the other constituents of the inorganically material and without contaminating the materials (such as food) stored or dispensed in articles made from the material containing such fibers. For purposes of illustration, sisal fibers are available from International Filler, abaca fibers are available from Isarog Inc. in the Philippines, while glass fibers, such as Cemfill®, are available from Pilkington Corp. in England.

Studies have found that fibers having a relatively higher diameter or width arc more effective in increasing the energy to failure and the displacement to failure. For example, sisal fibers having an average diameter of about 100 μm were far more effective in increasing the above properties than the wood fibers having an average diameter of 10 μm. The addition of the sisal fibers also dramatically decreased the stiffness in the dry cups.

Larger diameter fibers result in less surface area than small diameter fibers of equal volume. As the exposed surface area of the fiber decreases, less solvent is adsorbed by the fibers, and, accordingly, the solvent is removed quicker with less energy. The fibers used in the present invention preferably have an average diameter in a range from about 10 μm to about 100 μm, with about 50 μm to about 100 μm being more preferred, and about 75 μm to about 100 μm being most preferred. Furthermore, the fibers should have an average aspect ratio (length-to-width ratio) of at least about 10:1.

The amount of fibers added to the moldable mixture will vary depending upon the desired properties of the final product. The flexural strength, toughness, flexibility, and cost are the principle criteria for determining the amount of fiber to be added in any mix design. The concentration of fibers within the final hardened article will preferably be in the range from about 0.5% to about 60% by volume of the total solids content, more preferably from about 2% to about 40%, and most preferably from about 5% to about 20%.

Fiber strength is a consideration in determining the amount of the fiber to be used. The greater the flexural strength of the fiber, the less the amount of fiber that must be used to obtain a given flexural strength in the resulting article. Of course, while some fibers have a high flexural, tear and burst strength, other types of fibers with a lower flexural strength may be more elastic. A combination of two or more fibers may be desirable in order to obtain a resulting product that maximized multiple characteristics, such as higher flexural strength, higher elasticity, or better fiber placement.

It should also be understood that some fibers, such as southern pine and abaca, have high tear and burst strengths, while others, such as cotton, have lower strength but greater flexibility In the case where better placement, higher flexibility, and higher tear and burst strength are desired, a combination of fibers having varying aspect ratios and strength properties can be added to the mixture.

It is known that certain fibers and inorganic fillers are able to chemically interact with and bind with certain starch-based organic polymer binders, thereby adding another dimension to the materials of the present invention. For example, it is known that many fibers and inorganic fillers are anionic in nature and have a negative charge. Therefore, in order to maximize the interaction between the organic binder and the anionic fibers and inorganic materials, it may be advantageous to add a positively charged organic binder, such as a cationic starch.

Better water resistance can be obtained by treating the fibers with rosin and alum ($Al_2(SO_4)_3$) or $NaAl(SO_4)_2$, the latter of which precipitate out the rosin onto the fiber surface, making it highly hydrophobic. The aluminum floc that is formed by the alum creates an anionic adsorption site on the fiber surface for a positively charged organic binder, such as a cationic starch.

Finally, the fibers may be coated with a variety of substances in order to improve the desired properties of the final product. For example, the fibers may be coated in order to make them more resistant to water absorption. In addition, ettringite can be formed on the surface of the fibers in order to improve the interaction or interface between the fibers and the starch-based binder.

F. Rheology-Modifying Agents.

Rheology-modifying agents act to increase the viscosity or cohesive nature of the moldable mixture. As previously discussed, increasing the viscosity decreases the size of the cells and increases the size of the cell walls within the structural matrix. The resulting article is thus denser and has a higher strength. Increasing the viscosity is also used to prevent settling of the aggregates and starch-based binder within the mixture. Aggregates and ungelated starch granules have a natural tendency to settle in low viscosity mixtures. As a result, during the time period between the preparation and heating of the mixture to the point of gelation, the aggregate and any ungelated starch granules may begin to settle, thereby producing an article having non-uniform properties. Depending on the density of the aggregate, one of ordinary skill in the art can select the type and amount of rheology-modifying agent to be added to the mixture to prevent settling.

A variety of natural and synthetic organic rheology-modifying agents may be used which have a wide range of properties including viscosity and solubility in water. The various rheology-modifying agents contemplated by the present invention can be roughly organized into the following categories: (1) cellulose-based materials and derivatives thereof, (2) proteins and derivatives thereof, and (3) synthetic organic materials.

Suitable cellulose-based rheology-modifying agents include, for example, methylhydroxyethylcellulose, hydroxymethylethyicellulose, carboxymethylcellulose, methyl-cellulose, ethylceliulose, hydroxyethylcellulose, hydroxyethylpropylcellulose, hydroxypropylmethylcellulose, etc. The entire range of possible permutations is enormous and shall not be listed here, but other cellulose materials which have the same or similar properties as these would also work well.

Other natural polysaccharide-based rheology-modifying agents include, for example, alginic acid, phycocolloids, agar, gum arabic, guar gum, locust bean gum, gum karaya, and gum tragacanth. Suitable protein-based rheology-modifying agents include, for example, Zein® (a prolamine derived from corn), collagen (derivatives extracted from animal connective tissue such as gelatin and glue), and casein (the principle protein in cow's milk).

Finally, suitable synthetic organic rheology-modifying agents that are water dispersable include, for example, polyvinyl pyrrolidone, polyethylene glycol, polyvinyl alcohol, polyvinylmethyl ether, polyacrylic acids, polyacrylic acid salts, polyvinyl acrylic acids, polyvinyl acrylic acid salts, polyacrylamides, ethylene oxide polymers, polylactic acid, and latex (which is a broad category that includes a variety of polymerizable substances formed in a water emulsion; an example is styrene-butadiene copolymer). Synthetic organic polymers, especially the polyvinyl compounds, are also used as film binders to produce a hydrophobic surface on the starch-based binder. The hydrophobic surface slows down the rate of water absorption by the starch-based binder in the mixing process, thereby permitting quicker formation of form-stable articles.

Rheology-modifying agents within the moldable mixtures of the present invention are preferably included in an amount such that a hardened article will contain from about 0.5% to about 20% rheology-modifying agent by weight of article, more preferably from about 1% to about 10%, and most preferably from about 2% to about 5%.

G. Dispersants.

The term "dispersant" shall refer in the specification and the appended claims to the class of materials which can be added to reduce the viscosity and yield stress of the moldable mixture. A more detailed description of the use of dispersants may be found in the Master's Thesis of Andersen, P. J., "Effects of Organic Superplasticizing Admixtures and their Components on Zeta Potential and Related Properties of Cement Materials" (The Pennsylvania State University Materials Research laboratory, 1987). For purposes of disclosure, the foregoing Master's Thesis is incorporated herein by specific reference.

Dispersants generally work by being adsorbed onto the surface of the aggregate particles and/or into the near colloid double layer of the particles. This creates a negative charge on or around the surfaces of the particles causing them to repel each other. This repulsion of the particles adds "lubrication" by reducing the friction or attractive forces that would otherwise cause the particles to have greater interaction. This increases the packing density of the material somewhat and allows for the addition of less solvent while maintaining the workability of the moldable mixture. Dispersants can be used to create low viscosity, workable mixtures having a low concentration of solvent. Such mixtures are suited for the production of high density articles.

Due to the nature of the coating mechanism of the dispersant, the order in which the dispersant is added to the mixture can often be important. If certain water-dispersible organic polymer rheology-modifying agents (such as Tylose® are used, the dispersant should be added to a mixture containing water and at least part of the inorganic aggregates first and then the rheology-modifying agents should be added second. Otherwise, the dispersant will be less able to become adsorbed onto the surface of the aggregate particles because the Tylose® will first be irreversibly adsorbed thereby forming a protective colloid on the surface and thereby preventing the dispersant from being adsorbed.

A preferred dispersant is polyacrylic acid. Another dispersant which can also work well is meta phosphate. The amount of added dispersant will generally range up to about 5% by weight of the solvent, more preferably in the range from about 0.5% to about 4%, and most preferably within the range from about 1% to about 2%.

The dispersants contemplated within the present invention have sometimes been referred to in the concrete industry as "superplasticizers." In order to better distinguish dispersants from other rheology-modifying agents, which often act as plasticizers, the term "superplasticizer" will not be used in this specification.

H. Other Admixtures.

A variety of other components can be added to the moldable mixture to impart desired properties to the final article. For example, enzymes such as carbohydrase, amylase, and oxidase produce holes in the surface of starch granules permitting the starch-based binder to gelate faster in the case where ungelated starch is used. As a result, the viscosity of the mixture increases at a faster rate, thereby producing articles with a stronger and more uniform cell structure.

Articles can initially be formed having a desired flexibility (as opposed to obtaining flexibility through the use of a humidity chamber) by adding components that will tightly bind the water within the starch molecules. This can be achieved with the addition of humectants or deliquescent chemicals, such as $MgCl_2$, $CaCl_2$, NaCl, or calcium citrate. Because all of these chemicals are readily water soluble, they are able to distribute and retain water within the starch molecules to provide a more uniform distribution of moisture. In turn, the moisture improves flexibility.

Flexibility can also be obtained by adding softeners or plasticizers to the moldable mixture. Such plasticizers include Polysorbate 60, SMG, mono and diglycerides and distilled monoglycerides. Other specialized plasticizers having a boiling point above the maximum temperature reached by the mixture during the forming process can also be used. These chemicals, which include polyethylene glycol (below 600 MW), glycerin, and sorbitol, tend to take the place of water and function as plasticizers with moisture as low as 5%. They are believed to attach themselves to the hydroxyl groups of starch molecules and form a hinge-like structure. Since the plasticizers do not vaporize during the forming process, they remain within the form-stable article, thereby softening the starch-bound matrix.

Finally, cross-linking admixtures such as dialdehydes, methylureas, and melamine formaldehyde resins can be added to the mixture to produce a less water soluble starch-based binder. The cross-linking admixtures bind to the hydroxyl ions of the starch-based binder, which slow down the water reabsorption rate of the starch-based binder. As a result, the final articles obtain form stability at a faster rate, have higher strength, and are able to retain liquids longer before failure (e.g., a cup can hold water longer before it starts to leak).

The above-listed admixtures are typically added in a range between about 0.5% to about 15% by weight of the total solids in the mixture, or preferably about 1% to about 10%, and more preferably from about 1% to about 5%.

V. PROCESSING APPARATUS, CONDITIONS, AND RESULTS

The articles of manufacture of the present invention are produced through a multi-step process. The steps include preparing the mixture, forming the mixture into the desired articles, and conditioning the resulting articles. Additional steps can selectively include the printing, coating, and packaging of the final articles. The apparatus used in the processing steps are discussed below. The inventive articles can be prepared using conventional equipment well known to those skilled in the arts of polystyrene foam, paper, plastic, cement, and edible wafers. The equipment, however, must be uniquely combined and arranged to form a functional system that can manufacture the present articles. Furthermore, slight modification of the equipment may be required to optimize production of the articles. The arrangement, modification, and operation of the equipment needed to manufacture the inventive articles can be performed by those skilled in the art of using the conventional equipment in light of the present disclosure.

A. Preparing the Mixture.

Figure 4:
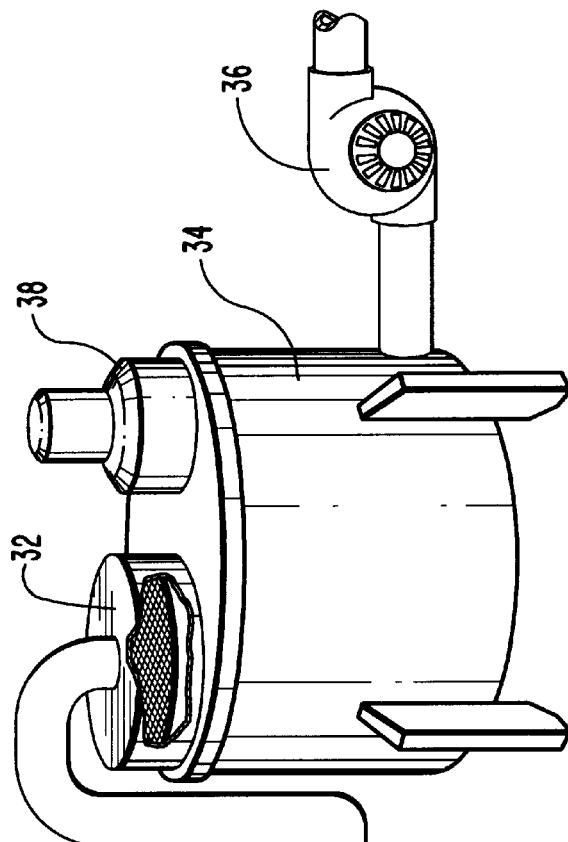
FIG. 4 is a perspective view of load cells and mixing apparatus.
Figure 4:
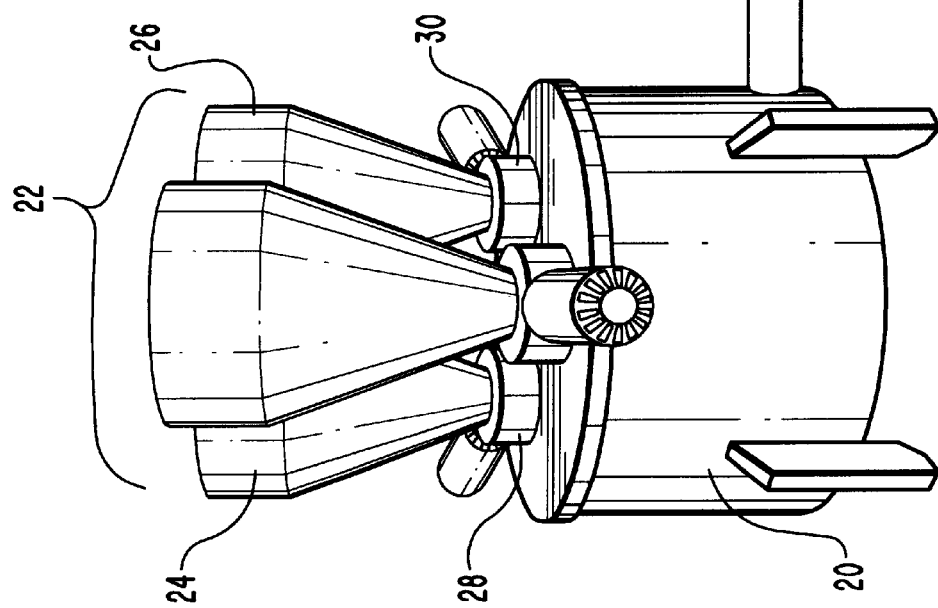

As depicted in FIG. 4, the moldable mixture is preferably prepared in a mixing tank 20 fed by bulk storage cells 22. The number of storage cells 22 is dependent on the number of components to be incorporated into the mixture. Storage cells 22 typically comprise dry load cells 24 and liquid load cells 26. Dry load cells 24 house solid components such as the starch-based binder, fillers, and fibers. Dry material metering units 28, typically consisting of some form of auguring system, automatically and accurately measure and feed the desired amount of dry mixture into mixing tank 20.

Liquid load cells 26 house liquid components such as the solvent and different liquid rheology-modifying agents. When appropriate, automatic stirrers can be positioned within the liquid load cells 26 to help prevent separation or settling of a liquid. Metering pumps 30 automatically and accurately measure and feed the liquids into mixing tank 20.

Mixing tank 20 is preferably a high energy mixer capable of quickly blending the components into a homogenous, moldable mixture. Such high energy mixers include the TMN turbo batter mixers that are available from Franz Haas Waffelmaschinen of Vienna, Austria. Alternative high energy mixers are disclosed and claimed in U.S. Pat. No. 4,225,247 entitled "Mixing and Agitating Device"; U.S. Pat. No. 4,552,463 entitled "Method and Apparatus for Producing a Colloidal Mixture"; U.S. Pat. No. 4,889,428 entitled "Rotary Mill"; U.S. Pat. No. 4,944,595 entitled "Apparatus for Producing Cement Building Materials"; and U.S. Pat. No. 5,061,319 entitled "Process for Producing Cement Building Material". For purposes of disclosure, the foregoing patents are incorporated herein by specific reference.

Alternatively, a variable speed mixer can be used to provide low energy mixing. Variable speed mixers include the Eirich Rv-11. Where fragile fillers or aggregates, such as glass spheres, are being incorporated into a mixture, it is preferred to use low energy mixing so as not to crush the aggregate. Low energy mixing is more important for high viscosity mixtures. As the viscosity increases, the shear force applied to the mixture increases, thereby increasing the damage to the fragile aggregates.

As further depicted in FIG. 4, once the mixture is prepared, it is pumped through an oscillating screen 32 to a storage mixer 34. Oscillating screen 32 helps to separate out and disperse unmixed clumps of the solids. Storage mixer 34 functions as a holding tank to permit continuous feeding of the moldable mixture to the forming apparatus. The moldable mixture is fed to the forming apparatus via a conventional pump 36.

In one embodiment, storage mixer 34 is sealed closed and a vacuum pump 38 is attached thereto. Vacuum pump 38 applies a negative pressure to the mixture to remove air bubbles entrained in the mixture. As previously discussed, air bubbles can cause surface defects within the final products.

Figure 5:
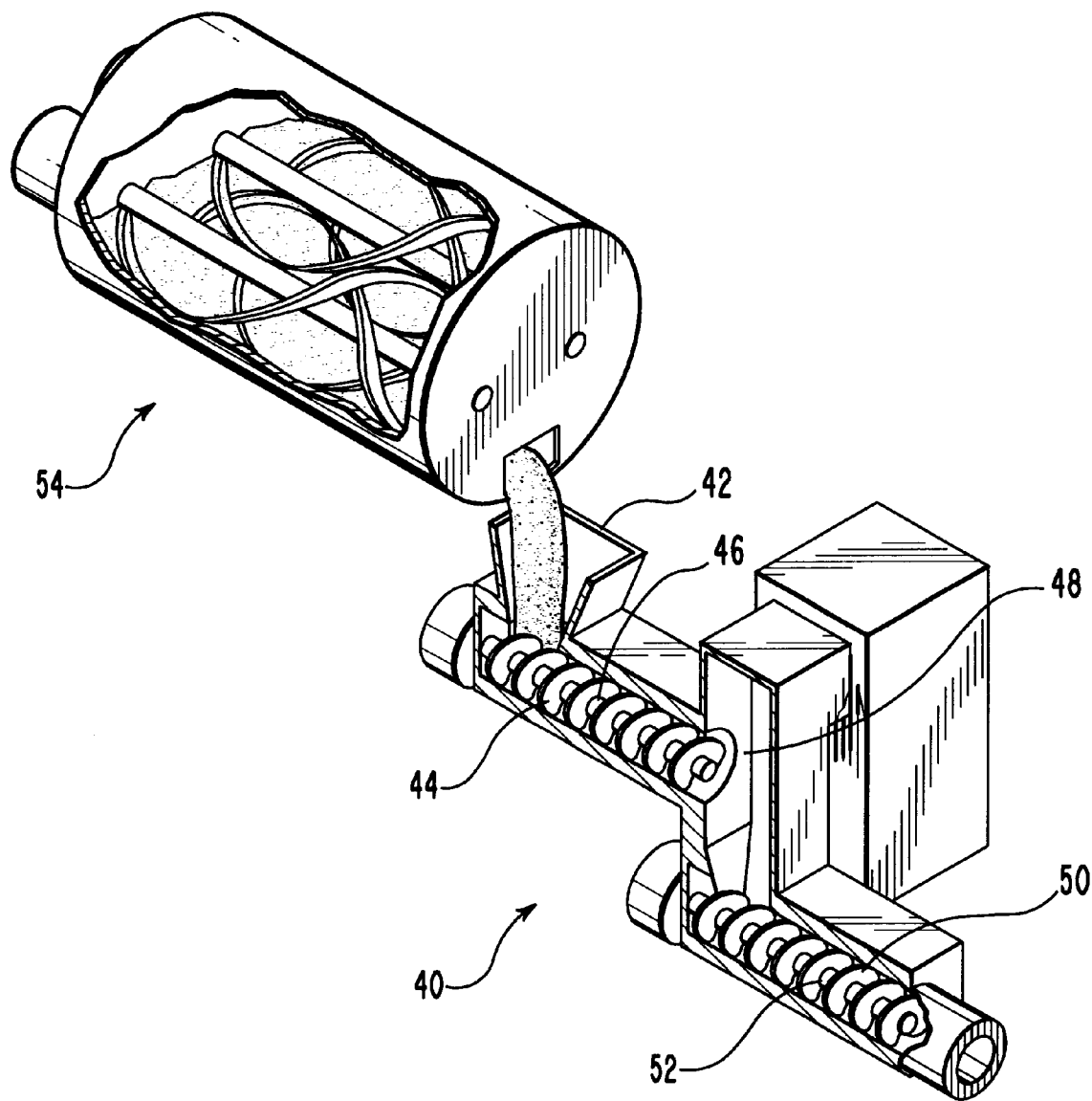
FIG. 5 is a cross-sectional view of an auger extruder apparatus.

Storage mixer 34 continuously stirs or mixes the moldable mixture at low energy to prevent settling within the moldable mixture. Where the forming apparatus operates on batch processing, as opposed to continuous processing, storage tank 34 can be eliminated and the mixture fed directly from mixing tank 20 to the forming apparatus.

Where a thicker or more viscous moldable mixture is desired, it may be necessary to use an auguring system to mix and transfer the moldable mixture. In one embodiment the materials incorporated into the moldable mixture are automatically and continuously metered, mixed, and deaired by a dual chamber auger extruder apparatus. FIG. 5 depicts a dual chamber auger extruder 40, which includes a feeder 42 that feeds the moldable mixture into a first interior chamber 44 of extruder 40. Within first interior chamber 44 is a first auger screw 46 which both mixes and exerts forward pressure advancing the moldable mixture through first interior chamber 44 toward an evacuation chamber 48. Typically, a negative pressure or vacuum is applied to evacuation chamber 48 in order to remove unwanted air voids within the moldable mixture.

Thereafter, the moldable mixture is fed into a second interior chamber 50. A second auger screw 52 advances the mixture toward the article forming apparatus. Auger screws 46 and 52 can have different flight pitches and orientations to assist in advancement of the mixture and performing low and high shear energy mixing.

Auger extruder 40 can be used to independently mix the components for the moldable mixture, or, as shown in FIG. 5, can be fed by a mixer 54. A preferable twin auger extruder apparatus utilizes a pair of uniform rotational augers wherein the augers rotate in the same direction. Counterrotational twin auger extruders, wherein the augers rotate in the opposite directions accomplish the same purposes. A pugmil may also be utilized for the same purposes. Equipment meeting these specifications are available from Buhler-Miag, Inc., located in Minneapolis, Minn.

Figure 6:
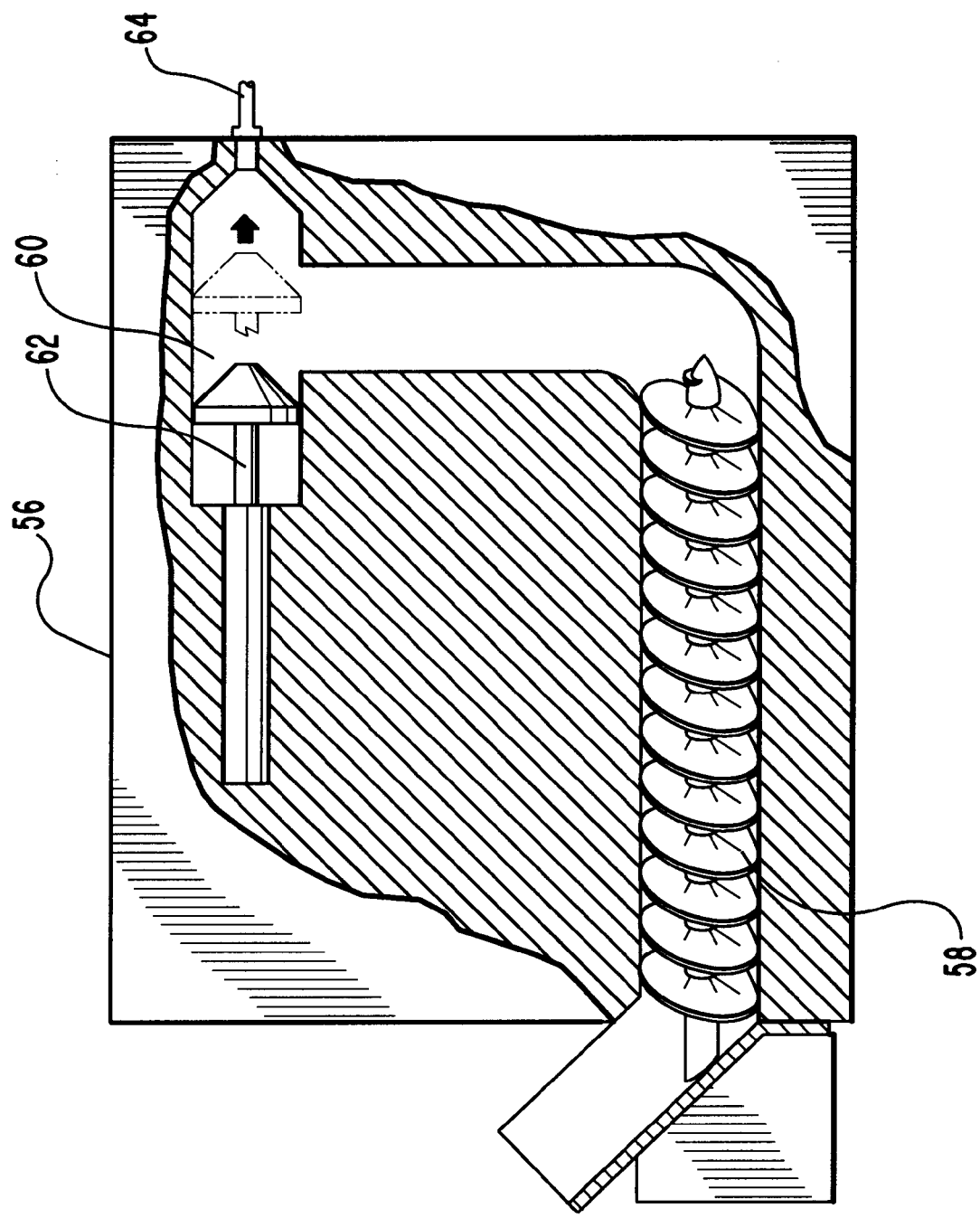
FIG. 6 is a cross-sectional view of a two-stage injector.

High viscosity, moldable mixtures are typically fed into the forming apparatus by either a two-stage injector or a reciprocating screw injector. As depicted in FIG. 6, a two-stage injector 56 has separate compartments for mixing or advancing and injecting. The mixture is conveyed to an extruder screw 58, which feeds the mixture to a shooting pot 60. Once shooting pot 60 is filled, an injection piston 62 pushes a defined quantity of the mixture into a flow channel 64 that feeds the forming apparatus.

Figure 7:
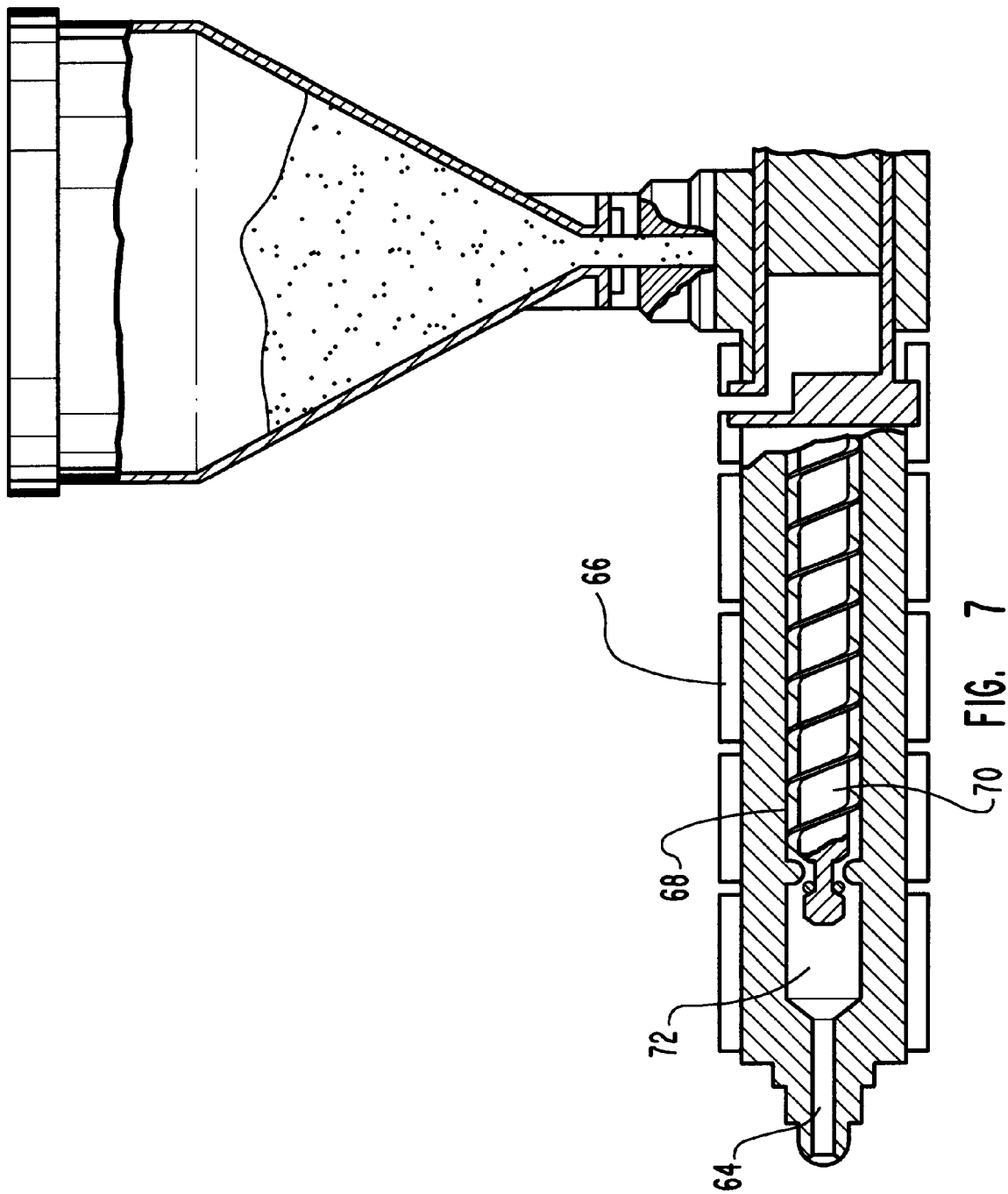
FIG. 7 is a cross-sectional view of a reciprocating screw injector.

As depicted in FIG. 7, a reciprocating screw injector 66 comprises a chamber 68 having a screw auger 70 longitudinally positioned therein. The moldable mixture is fed into chamber 68 and advanced by screw auger 70. As screw auger 70 rotates, it retracts and feeds the mixture to injection end 72 of screw auger 70. When the required volume of the mixture has accumulated at end 72, screw auger 70 stops rotating and moves forward to inject the mixture into flow channel 64 and subsequently to the forming apparatus.

B. Forming the Mixture into the Desired Article.

Figure 8:
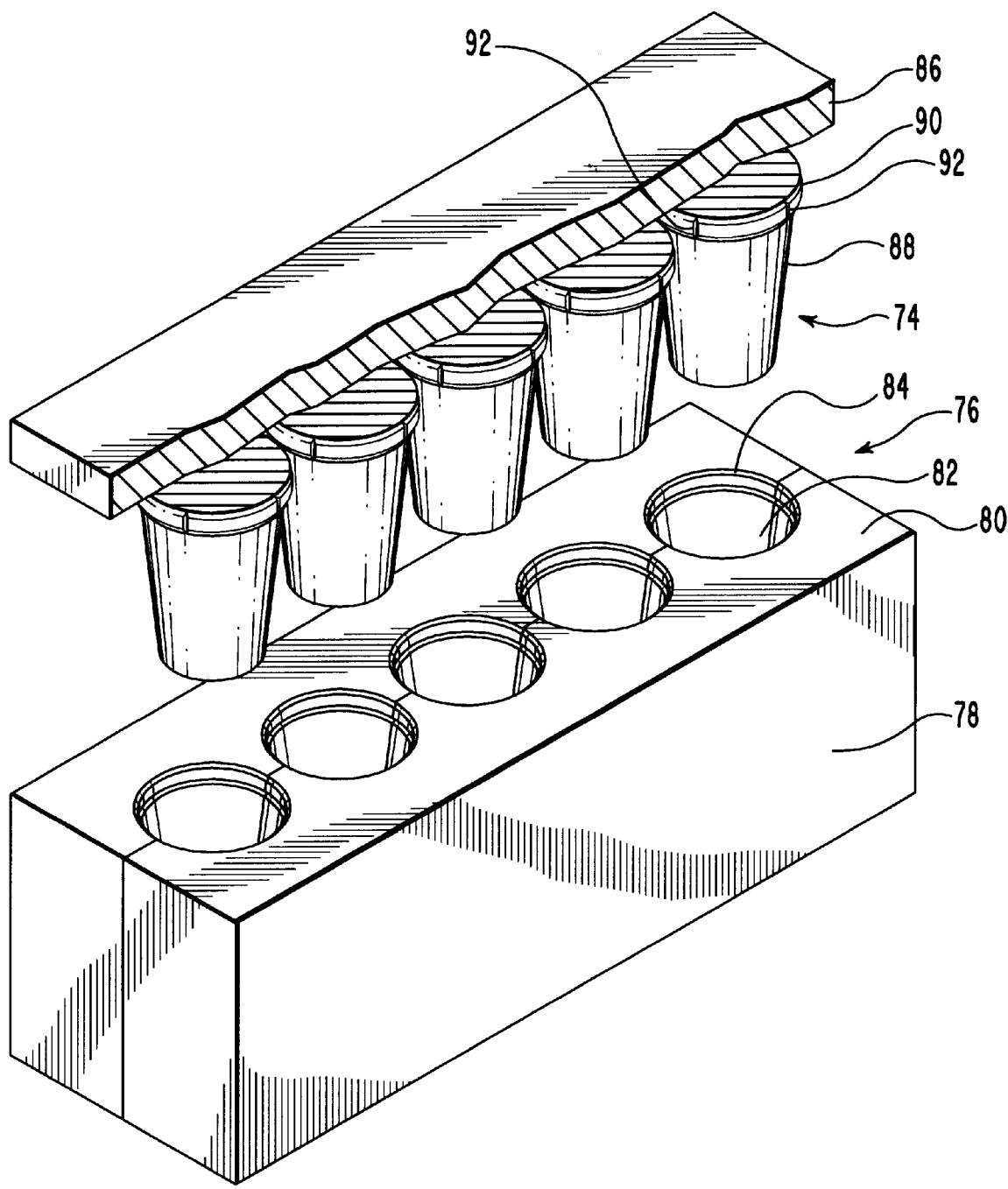
FIG. 8 is a perspective view of a male mold and a female mold.

Once the mixture is prepared, it is preferably formed into the desired shape of the article through the use of heated molds. FIG. 8 depicts a heated male mold 74 having a desired shape and a heated female mold 76 having a complementary shape. Female mold 76 comprises a mold body 78 having a flat mold face 80 with a receiving chamber 82 bored therein. Receiving chamber 82 has a mouth 84 through which it is accessed. Male mold 74 comprises an attachment plate 86, a die head 88 having a shape substantially complementary to the shape of receiving chamber 82, and a venting ring 90 extending between attachment plate 86 and die head 88. Venting ring 90 is slightly larger than mouth 84 of receiving chamber 82 and contains a plurality of venting grooves 92 that are longitudinally aligned with die head 88.

Figure 9:
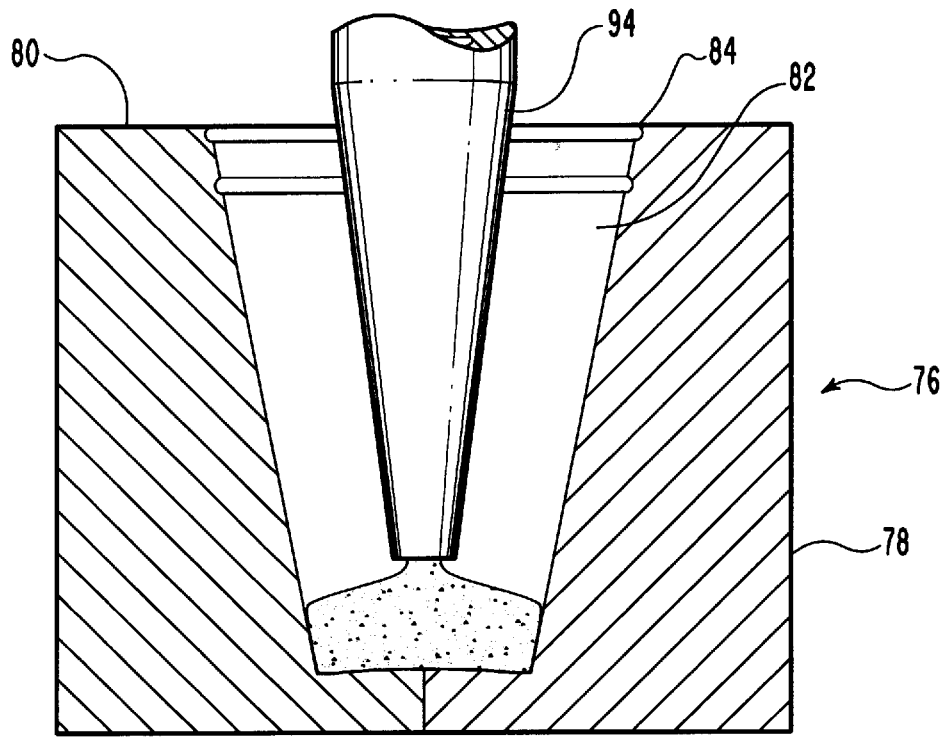
FIG. 9 is a cross-sectional view of the female mold being filled with a moldable mixture by a filling spout.
Figure 10:
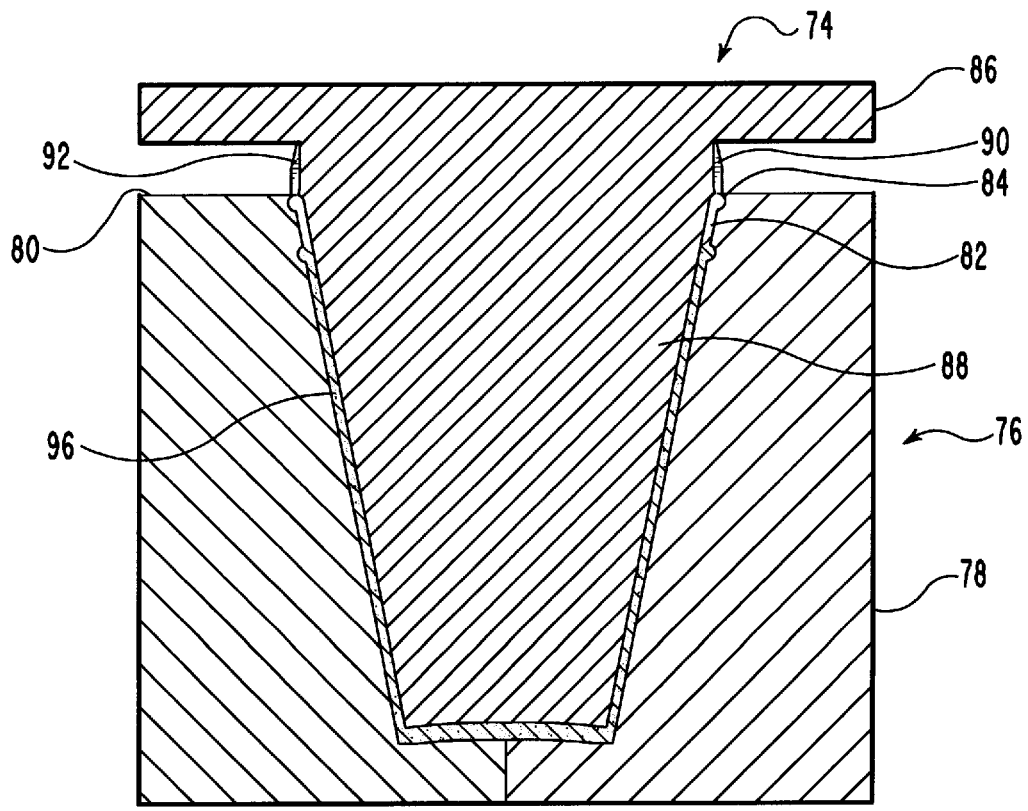
FIG. 10 is a cross-sectional view of the above male mold and female mold being mated.

In the preferred embodiment, the molds are vertically aligned with female mold 76 being positioned below male mold 74. In this orientation, as shown in FIG. 9, receiving chamber 82 acts as a container for receiving the moldable mixture from a filling spout 94. Once the mixture is positioned within female mold 76, the molds are mated, as shown in FIG. 10, by inserting die head 88 into receiving chamber 82 until vent ring 90 comes to rest on mold face 80 around mouth 84. Die head 88 is slightly smaller than receiving chamber 82 so that when the molds are mated, a mold area 96 exists between male mold 74 and female mold 76. As previously discussed, the amount of moldable mixture positioned in female mold 76 preferably only fills a portion of mold area 96.

Figure 11:
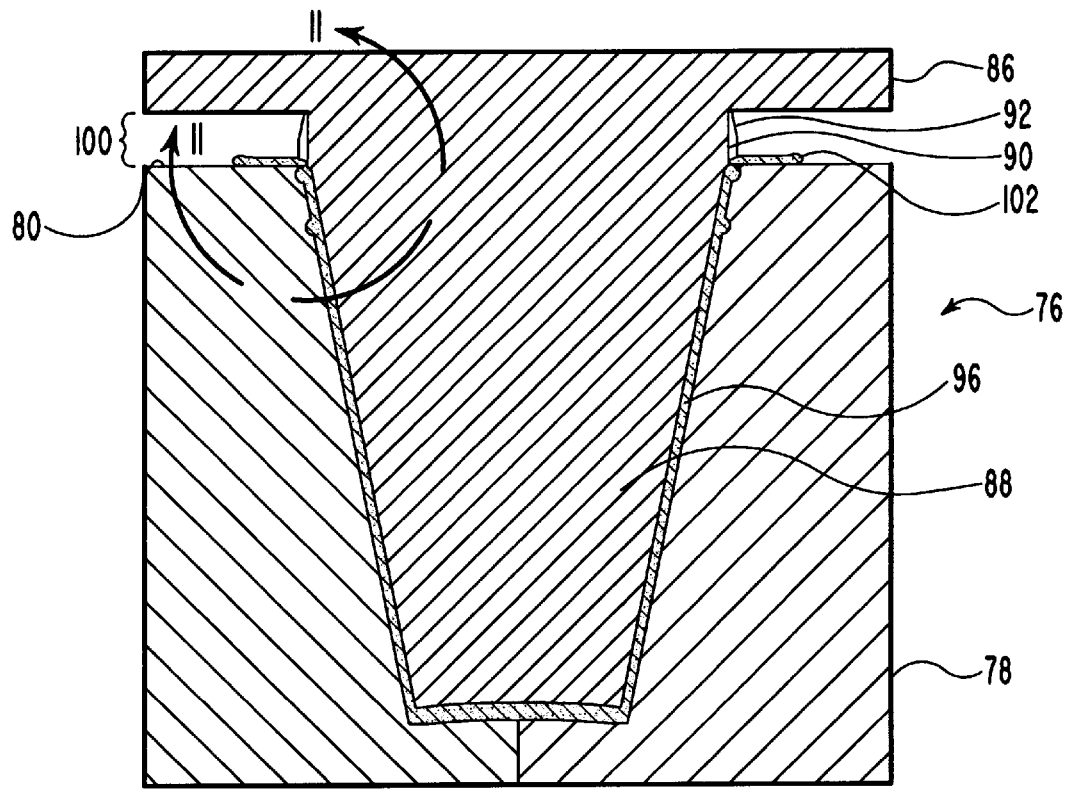
FIG. 11 is a cross-sectional view of the inventive article baked between mated molds.
Figure 11A:
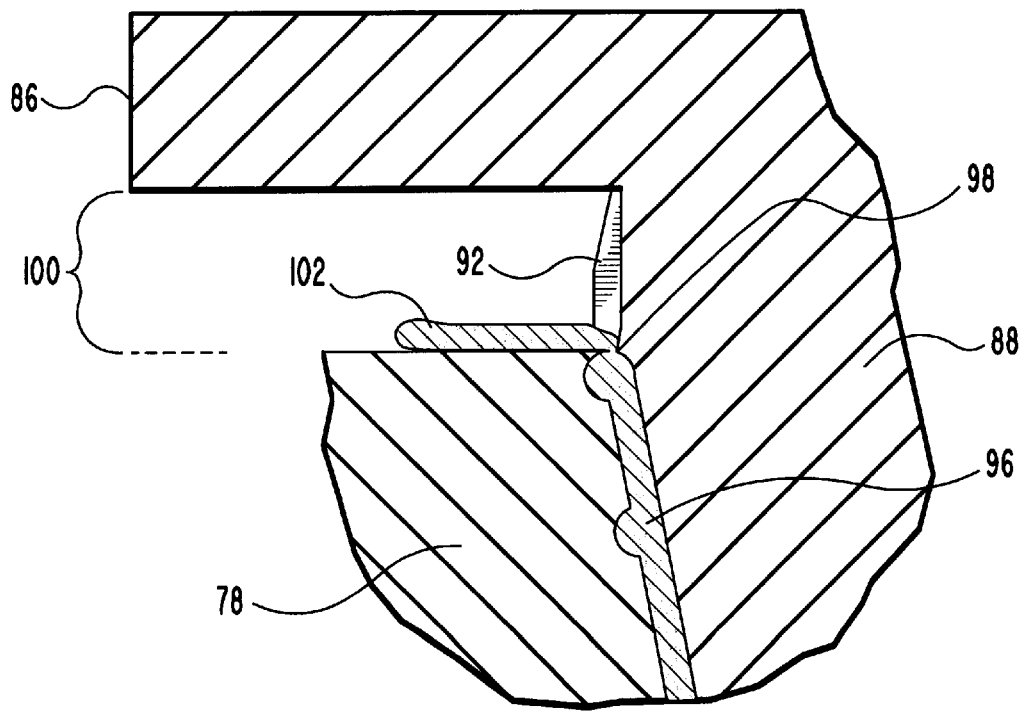
FIG. 11A is an enlarged cross-sectional view of the vent holes between the mated male mold and female mold.
Figure 12:
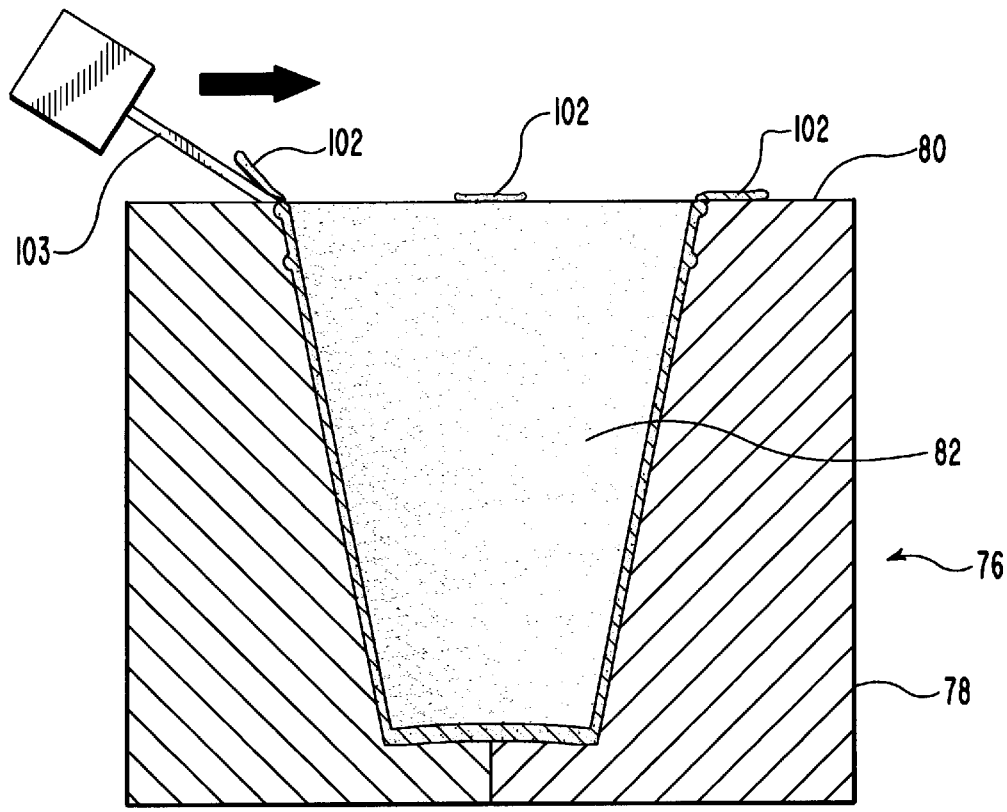
FIG. 12 is a cross-sectional view of the female mold having a scraper blade removing excess material.

In the mated position as shown in FIGS. 11 and 11A, vent grooves 92 communicate with mold area 96 to form vent holes 98. Furthermore a venting gap 100 is formed between mold face 80 and attachment plate 86 as a result of venting ring 90 resting on mold face 80. During operation, the heated molds cause the moldable mixture to expand and dry into a solid article according to the process and parameters as previously discussed. Excess material 102 and vapor is expelled from mold area 96 through vent holes 98 and into venting gap 100. Once the mixture becomes form-stable in the desired shape of the article, male mold 74 and female mold 76 are separated. As depicted in FIG. 12, a scraper blade 103 can then be pressed along the length of mold face 80 to remove excess material 102.

Figure 13:
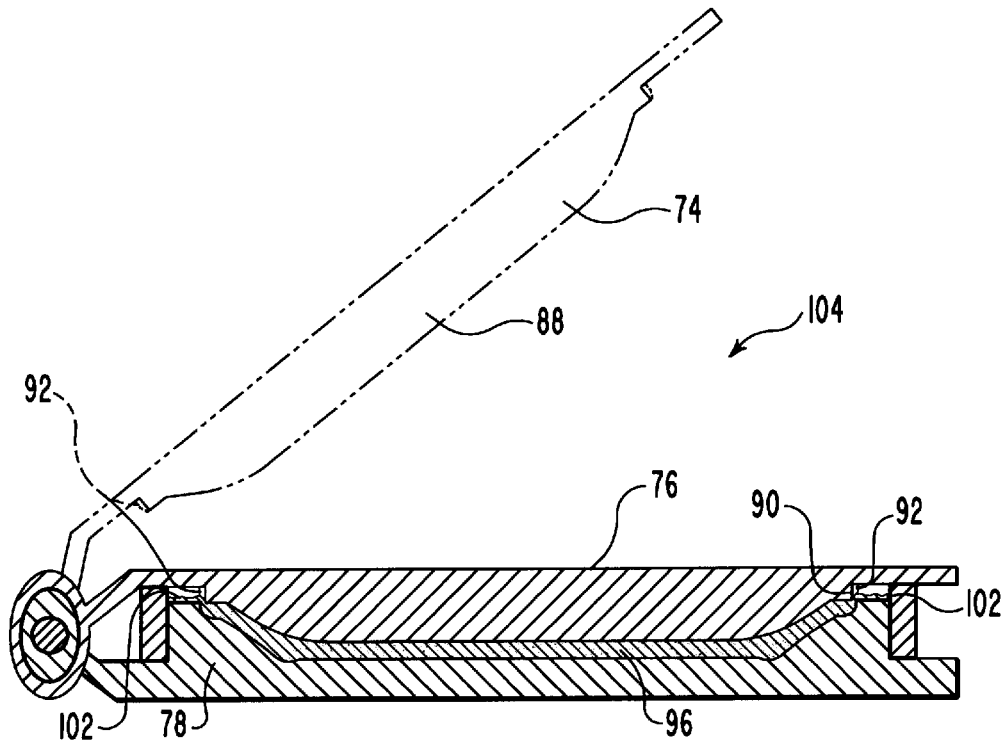
FIG. 13 is a cross-sectional view of a dual mold.
Figure 14:
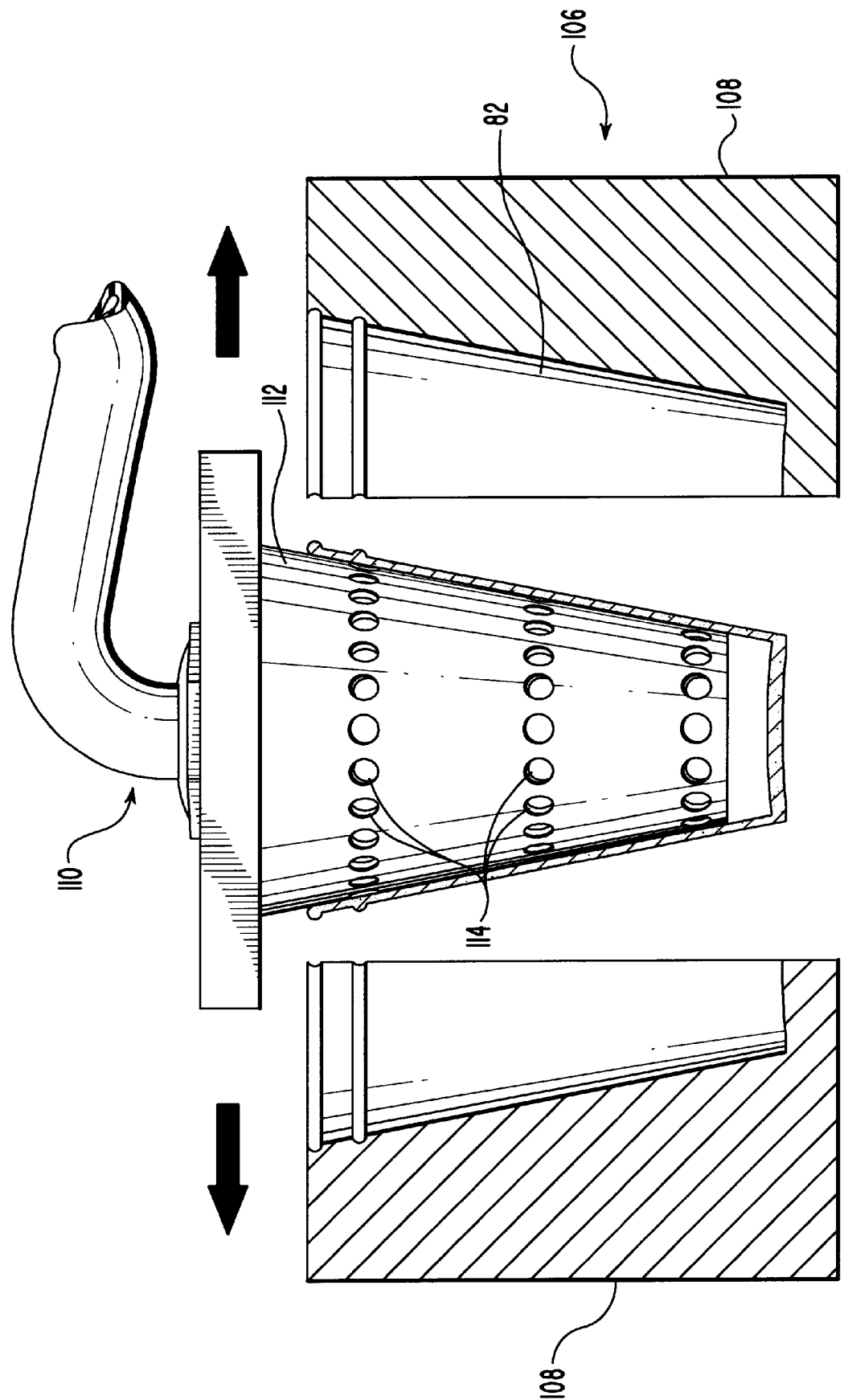
FIG. 14 is a cross-sectional view of a split mold with suction nozzle.

The molds can have a variety of shapes and sizes to form the desired article. However, there are two general types of molds: dual molds and split molds. As shown in FIG. 13, dual mold 104 comprises a single male mold 74 and a single female mold 76. This type of mold is used for making shallow articles, such as plates and lids, that are easily removed from the molds. Split molds 106, as shown in FIG. 14, comprise a single male mold 74 and a female mold 76 that can be separated into mold halves 108. Mold halves 108 are separated after the article is formed to permit easy removal of the article. Split molds 106 are used for the production of deep recessed articles such as cups and bowls that can be difficult to remove from a mold.

One method for removing articles from the mold is by a suction nozzle 110. As shown in FIG. 14, suction nozzle 110 has a head 112 with vacuum ports 114 located thereon. Head 112 is designed to complementarily fit within the hardened article. Accordingly, by inserting head 112 into the article and applying a slight negative pressure through vacuum ports 114, the article can be picked up and moved to a conveyor belt for subsequent processing.

The molds are preferably made of metals such as steel, brass, and aluminum. Polished metals, including chrome and nickel, along with Teflon coatings, make it easier to remove the articles from the molds and create a smoother finish. The material of the molds must be able to withstand the temperatures and pressures, as previously discussed, encountered during the manufacturing process.

The molds can be heated in a variety of ways. For example, external heating elements, such as gas burners, infrared light, and electrical heating elements, can be attached or directed at the molds. Alternatively, heated liquids, such as oils or heated gases, such as steam, can be piped through the molds to heat them. Various types of heating can also be used to vary the temperature of the molds along the length of the molds in order to vary the properties of the hardened matrix within the molded article. It is also possible to heat the mixtures without heating the molds. For example, the molds can be made out of ceramic and microwaves be applied to heat the mixture.

By varying the temperature and processing time it is possible to affect the density, porosity, and thickness of the surface layer, or skin. Generally, in order to yield a molded article having a thinner but more dense surface layer, the molding temperature is lower, the molds have fewer vents, and the moldable mixture has a higher viscosity. The viscosity of the mixture can be increased by adding a rheology-modifying agent, such as Tylose®, including less water, or by using an aggregate material having a higher specific surface area.

C. Conditioning the Articles.

If the resulting form-stable articles have insufficient flexibility for their intended use, they are transferred to a high humidity chamber. As previously discussed, the humidity chamber provides an environment of controlled temperature and humidity to permit rapid moisture absorption by the form-stable articles. Increasing the moisture content in the articles improves certain properties, such as the elasticity, displacement-before-failure, and flexibility.

The humidity chamber can be designed for either batch processing or continuous processing. In continuous processing, the humidity chamber comprises either a tunnel or tower through which the articles pass without stopping. The length or height of the chamber, speed of the conveyor system, humidity within the chamber, and temperature within the chamber are optimized to produce an article having the desired moisture content in a minimum time period and minimum cost. Preferred variables for moisture content, humidity level, and temperature are previously discussed.

The moisture can be produced through conventional hot and cold steam processes as well as vaporization with ultrasound. Examples of commercially available humidity chambers that can be used in the present invention include the KTV, KT, and KTU wafer sheet conditioning tunnels and towers available from Franz Haas Waffelmaschinen of Vienna, Austria.

D. Coatings and Coating Apparatus.

It is within the scope of the present invention to apply coatings or coating materials to the articles. Coatings can be used to alter the surface characteristics of the articles in a number of ways, including sealing and protecting the article. Coatings may provide protection against moisture, base, acid, grease, and organic solvents. They may also fill in voids on the surface of the article and provide a smoother, glossier, or scuff-resistant surface. Furthermore, coatings can help prevent aggregate and fiber "fly away". Coatings may also provide reflective, electrically conductive or insulative properties. They may even reinforce the article, particularly at a bend, fold, edge or corner. Some of the coatings can also be utilized as laminating materials or as adhesives.

Application of a coating may also be used to regulate the moisture content of the present articles. It is theorized that the moisture content of an article will eventually reach a point of equilibrium with its environment. That is, relatively dry articles will adsorb moisture in a humid climate and conditioned articles will loose moisture in a dry climate. The application of a coating after conditioning the article to the proper moisture content can prevent the exchange of moisture between article and the surrounding environment.

The object of the coating process is usually to achieve a uniform film with minimal defects on the surface of the article. Selection of a particular coating process depends on a number of substrate (i.e., article) variables, as well as coating formulation variables. The substrate variables include the strength, wettability, porosity, density, smoothness, and uniformity of the article. The coating formulation variables include total solids content, solvent base, surface tension, and rheology.

The coating can be applied either during the forming process or after the article is formed. The coating can be formed during the forming process by adding a coating material that has approximately the same melting temperature as the peak temperature of the mixture. As the mixture is heated, the coating material melts and moves with the vaporized solvent to the surface of the article where it coats the surface. Such coating materials include selected waxes and cross-linking agents.

The coatings may be applied to the article after formation by using any coating means known in the art of manufacturing paper, paperboard plastic, polystyrene, sheet metal, or other packaging materials, including blade, puddle, airknife, printing, Dahlgren, gravure, and powder coating. Coatings may also be applied by spraying the article with any of the coating materials listed below or by dipping the article into a vat containing an appropriate coating material. The apparatus used for coating will depend on the shape of the article. For example, cups will usually be coated differently than flat plates.

As the articles having a starch-based binder have a high affinity for water, the preferred coatings are non-aqueous and have a low polarity. Appropriate coatings include paraffin (synthetic wax); shellac; xylene-formaldehyde resins condensed with 4,4'-isopropyl-idenediphenolepichlorohydrin epoxy resins; drying oils; reconstituted oils from triglycerides or fatty acids from the drying oils to form esters with various glycols (butylene glycol, ethylene glycol), sorbitol, and trimethylol ethane or propane; synthetic drying oils including polybutadiene resin; natural fossil resins including copal (tropical tree resins, fossil and modern), damar, elemi, gilsonite (a black, shiny asphaltite, soluble in turpentine), glycol ester of damar, copal, elemi, and sandarac (a brittle, faintly aromatic translucent resin derived from the sandarac pine of Africa), shellac, Utah coal resin; rosins and rosin derivatives including rosin (gum rosin, tall oil rosin, and wood rosin), rosin esters formed by reaction with specific glycols or alcohols, rosin esters formed by reaction formaldehydes, and rosin salts (calcium resinate and zinc resinate); phenolic resins formed by reaction of phenols with formaldehyde; polyester resins; epoxy resins, catalysts, and adjuncts; coumarone-indene resin; petroleum hydrocarbon resin (cyclopentadiene type); terpene resins; urea-formaldehyde resins and their curing catalyst; triazine-formaldehyde resins and their curing catalyst; modifiers (for oils and alkyds, including polyesters); vinyl resinous substances (polyvinyl chloride, polyvinyl acetate, polyvinyl alcohol, etc.); cellulosic materials (carboxymethyl-cellulose, cellulose acetate, ethylhydroxyethylcellulose, etc.); styrene polymers; polyethylene and its copolymers; acrylics and their copolymers; methyl methacrylate; ethyl methacrylate; waxes (paraffin type I, paraffin type II, polyethylene, sperm oil, bees, and spermaceti); melamine; polyamides; polylactic acid; Biopol® (a polyhydroxybutyrate-hydroxyvalerate copolymer); soybean protein; other synthetic polymers including biodegradable polymers; and elastomers and mixtures thereof. Biopol® is manufactured by ICI in the United Kingdom. Appropriate inorganic coatings include sodium silicate, calcium carbonate, aluminum oxide, silicon oxide, kaolin, clay, ceramic and mixtures thereof. The inorganic coatings may also be mixed with one or more of the organic coatings set forth above.

In some cases, it may be preferable for the coating to be elastomeric or deformable. Some coatings may also be used to strengthen places where the articles are severely bent. In such cases, a pliable, possibly elastomeric, coating may be preferred. A waterproof coating is desirable for articles intended to be in contact with water. If the articles are intended to come into contact with foodstuffs, the coating material will preferably comprise an FDA-approved coating.

Polymeric coatings such as polyethylene are useful in forming generally thin layers having low density. Low density polyethylene is especially useful in creating containers which are liquid-tight and even pressure-tight to a certain extent. Polymeric coatings can also be utilized as an adhesive when heat sealed.

Aluminum oxide and silicon oxide are useful coatings, particularly as a barrier to oxygen and moisture. The coatings can be applied to the article by any means known in the art, including the use of a high energy electron beam evaporation process, chemical plasma deposition and sputtering. Another method of forming an aluminum oxide or silicon oxide coating involves the treating of the article with an aqueous solution having an appropriate pH level to cause the formation of aluminum oxide or silicon oxide on the article due to the composition of the article.

Waxes and wax blends, particularly petroleum and synthetic waxes, provide a barrier to moisture, oxygen, and some organic liquids, such as grease or oils. They also allow an article such as a container to be heat sealed. Petroleum waxes are a particularly useful group of waxes in food and beverage packaging and include paraffin waxes and microcrystalline waxes.

E. Printing.

It may be desirable to apply print or other indicia, such as trademarks, product information, container specifications, or logos, on the surface of the article. This can be accomplished using any conventional printing means or processes known in the art of printing paper or cardboard products, including planographic, relief, intaglio, porous, and impactless printing. Conventional printers include offset, Van Dam, laser, direct transfer contact, and thermographic printers. However, essentially any manual or mechanical means can be used.

The type of printing and printer used depends in part on the shape of the article. For example, flat plates will require a different printing apparatus than a cup. In addition, the molds can be specially designed to provide embossing on the surface of the article. The article can also be provided with a watermark. Because the articles have a relatively high porosity, the applied ink will tend to dry rapidly. One skilled in the art will appreciate that the article porosity and ink quantities must be compatible. In addition, decals, labels or other indicia can be attached or adhered to the article using methods known in the art.

F. Packaging.

A custom automatic stacker can be installed at the end of manufacturing line to create stacks of articles. The stacks are loaded into poly bags and then sealed. Finally, standard carton handling/palletizing equipment is used to package the articles and prepare them for shipping. The packaging equipment includes conventional equipment used in packaging articles made from paper, plastic, polystyrene foam, or metal.

G. Physical Properties of the Articles.

In view of the foregoing, it is possible, by using a microstructural engineering approach, to obtain a wide variety of articles of varying shapes, strengths, flexibilities, stiffness, insulation, and other physical properties. In general, the flexural strength of the articles will preferably be in a range of about 0.5 MPa to about 8 MPa, more preferably in a range from about 0.75 MPa to about 6 MPa, and most preferably in a range from about 1 MPa to about 4 MPa. The range of strain of the articles (i.e., the amount of strain before rupture), which will preferably be in a range from about 1% to about 15%, more preferably from about 1% to about 10%, and most preferably from about 1% to about 5%. The specific strength of the articles will vary in a range from about 2 MPa·cm3/g to about 80 MPa·cm$^3$/g. The fracture energy of the articles will preferably be in a range from about 5 J/m$^2$ to about 3000 J/m$^2$, more preferably from about 15 J/m$^2$ to about 1500 J/m$^2$, and most preferably from about 25 J/m$^2$ to about 600 J/m$^2$.

VI. EXAMPLES OF THE PREFERRED EMBODIMENTS

Outlined below are a number of examples showing the manufacture of articles from the inorganically filled, starch-bound, moldable mixtures of the present invention. The examples compare the properties of the articles for varying compositions and processing conditions.

Examples 1–13

Drinking cups were formed from moldable mixtures containing different types of inorganic aggregates to determine the effects of the different aggregates. Each of the moldable mixtures had the following basic mix design measured by weight:

39.8% Stalok 400 (modified potato starch)

9.95% inorganic aggregate 49.75% water 0.5% magnesium stearate

Each moldable mixture was prepared in a small Hobart mixer. First, the dry ingredients (including the inorganic aggregate, starch, and magnesium stearate) were completely mixed. Then the water was added slowly while the dry materials were being mixed until a homogeneous mixture was obtained. The mixtures were extracted from the Hobart mixing bowl using a syringe. The weight of the moldable material used to manufacture a cup for each mixture was determined by first weighing the syringe containing the moldable mixture, expelling the contents of the syringe into the molding apparatus, and then weighing the syringe.

The molding system included a male mold made out of tooled brass and a female mold made out of tooled steel, the molds being configured substantially according to FIG. 8. The molds were designed to produce 12 oz, drinking cups having a smooth surface and a thickness of about 4 mm. The male mold contained four vent grooves that formed four vent holes.

The cups of Examples 1–13 were obtained by heating each selected moldable mixture between the molds at a temperature of about 200° C. Once the articles became significantly form-stable, they were removed from the molds and placed in an oven for about 1.5 hours at a temperature of 105° C. to remove the remaining moisture. The moisture was removed so that subsequent testing of the cups would better reflect the effects of the component as opposed to the effects of the starch-based binder moisture content. It was assumed that the weight loss of the cup during drying in the oven was a loss of water. The measured weight loss was thus used to determine the moisture of cups upon being removed from the mold. The cups were then sealed in plastic bags to maintain a constant humidity until the cups could be tested.

Summarized below is a list of the selected inorganic aggregates and the resulting properties of the cups formed from each of the mix designs:

| Example | Inorganic Aggregate | Cup Density (g/cc) | Moisture Out of Mold (% W/W) | Thermal Conduct. (W/m · K) | Thermal Resist. (ft$^2$h-° F./BTU-in) |
|---|---|---|---|---|---|
| 1 | Gama Sperse | 0.190 | 3.0 | 0.046 | 3.15 |
| 2 | Carbital 50 | 0.185 | 2.5 | 0.044 | 3.25 |
| 3 | R040 | 0.215 | 2.7 | 0.045 | 3.20 |
| 4 | Mica 4k | 0.205 | 2.6 | 0.048 | 3.10 |
| 5 | Glass Bubbles B38/4000 | 0.190 | 4.9 | 0.047 | 3.15 |
| 6 | Polymica 400 | 0.195 | 2.0 | 0.049 | 2.90 |
| 7 | Aerosil R972 | 0.125 | 4.2 | 0.040 | 3.68 |
| 8 | Aerosil 130 | 0.135 | 4.0 | 0.054 | 2.70 |
| 9 | Aerosil 200 | 0.145 | 4.1 | 0.046 | 3.15 |
| 10 | Aerosil 380 | 0.155 | 4.3 | 0.048 | 3.10 |
| 11 | Cabosil EH5 | 0.140 | 2.8 | 0.041 | 3.60 |
| 12 | Wollastonite | 0.195 | 2.1 | N/A | N/A |
| 13 | Sil-co-sil Silica Sand | 0.200 | 2.1 | N/A | N/A |

| Example | Inorganic Aggregate | Energy to Failure (mJ) | Displacement to Failure (%) | Peak Load (N) | Stiffness (N/m) |
|---|---|---|---|---|---|
| 1 | Gama Sperse | 6.0 | 3.1 | 5.00 | 2.5 |
| 2 | Carbital 50 | 9.0 | 3.5 | 5.10 | 2.7 |
| 3 | R040 | 7.0 | 3.1 | 5.05 | 2.6 |
| 4 | Mica 4k | N/A | N/A | N/A | N/A |
| 5 | Glass Bubbles B38/4000 | 9.5 | 3.2 | 5.20 | 3.4 |
| 6 | Polymica 400 | 10.0 | 2.7 | 5.15 | 2.4 |
| 7 | Aerosil R972 | 7.0 | 4.0 | 4.95 | 1.9 |
| 8 | Aerosil 130 | 7.0 | 3.5 | 4.90 | 1.8 |
| 9 | Aerosil 200 | 9.0 | 3.5 | 5.00 | 2.1 |
| 10 | Aerosil 380 | 6.0 | 3.1 | 4.95 | 2.2 |
| 11 | Cabosil EH5 | 7.0 | 3.4 | 4.95 | 2.0 |
| 12 | Wollastonite | 8.5 | 3.1 | 5.10 | 2.9 |
| 13 | Sil-co-sil Silica Sand | 8.0 | 2.8 | 5.05 | 3.0 |

The properties analyzed include thermal properties and mechanical properties. The thermal properties include thermal conductance and thermal resistivity which were determined by a transient hot-wire method. Three measurements were recorded for the thermal conductivity of the side walls of the cups and the average value was reported. Mechanical properties were defined by developing a test that would simulate the pinching between the thumb and the other four fingers that a cup might experience during use. The results served as a means to compare cups produced from different compositions and under different conditions. The strength and ductility were not easily quantifiable due to the complex geometry. Instead the data is reported without normalization to the cross-sectional area.

The cups were positioned on an inclined platform. The inclination was adjusted so that the side edge of the cup was normal to the loading direction. The area below the top rim of the cup was chosen as the point of load application. This resulted in the most reproducible results. Loads were applied to the cups at the rate of 15 mm/min. until a clear failure was observed. The displacements and the corresponding loads were recorded.

The test provided a qualitative evaluation of the mechanical properties. Using the defined testing method, a comparison was made on the basis of peak load, maximum displacement before failure, energy absorbed during fracture, and stiffness. The energy of failure is the area under the load displacement curve measured from the origin to the point of first fracture. Each of the above properties are based on a statistical average of seven identical tests.

The tests showed that the fumed silica aggregates (Acrosil R972, 130, 200, 380 and Cabosil EH5) resulted in a density of about 30% lower compared to those where a different inorganic aggregate was added. The other inorganic aggregates had a limited effect on the density of the cups, with the exception of Polymica which also decreased the density by about 30% relative to cups using the other inorganic aggregates.

The dry peak load and stiffness of the cups containing fumed silica were affected to the same extent as the density; approximately 30% of each was lost compared to cups produced without fumed silica. The dry displacement-to-failure and energy-to-failure measurements exhibited little or no change due to the addition of inorganic materials.

The addition of Mica 4k, glass bubbles, Wollastonite, Polymica 400, and silica sand did not affect the energy-to-failure displacement-to-failure, peak load, and stiffness to any significant degree. The one exception was Mica 4k, which had a 30% increase in peak load. The value for thermal properties were found to be in a band width of about ±10% of the value for cups produced with no starch-based binder substitute. The values were independent of the type of inorganic aggregate used.

Based on the above tests, fumed silica aggregates appear to be less preferred since they adversely affect the mechanical properties of the articles. In contrast, the other inorganic aggregates can be used to replace at least 20% by weight of the starch-based binder without significantly affecting the mechanical properties of the articles. It is believed that fumed silicas produce a detrimental effect as a result of their low strength in comparison to the other inorganic aggregates.

Examples 14–27

Cups were made using different concentrations of calcium carbonate to determine the effect of replacing the relatively expensive starch-based binder with less expensive calcium carbonate filler. The same procedures and apparatus as discussed in Examples 1–13 were used to make and test the cups of Examples 14–27. Each of the moldable mixtures included the following basic mix design measured by weight:

49.75% combination Stalok 400 potato starch and inorganic aggregate 49.75% water 0.5% magnesium stearate Tests were run for two different types of calcium carbonate (Gama Sperse and RO40) at 20, 40, 50, and 60 weight percent inorganic aggregate based on the total weight of the combination of the starch-based binder and the inorganic aggregate. The same tests were also run on a mixture of Gama Sperse to which 2% by weight of polyacrylamide has been added.

Summarized below are the selected compositions and the properties of the resulting 12 oz. cups.

| Example | Inorganic Aggregate (weight %) | Density (g/cc) | Thermal Conduct. (W/m·K) | Energy to Fail. (mJ) | Displacement to Failure (%) | Peak load (N) | Stiffness (N/m) |
|---|---|---|---|---|---|---|---|
| | | | Gama Sperse | | | | |
| 14 | 0 | 0.19 | 0.044 | 7.0 | 2.9 | 3.2 | 6.0 |
| 15 | 20 | 0.21 | 0.046 | 6.0 | 2.9 | 2.5 | 5.0 |
| 16 | 40 | 0.24 | 0.052 | 6.0 | 2.5 | — | — |
| 17 | 50 | 0.27 | 0.054 | 6.0 | 2.2 | 4.5 | 6.5 |

-continued

| Example | Inorganic Aggregate (weight %) | Density (g/cc) | Thermal Conduct. (W/m · K) | Energy to Fail. (mJ) | Displacement to Failure (%) | Peak load (N) | Stiffness (N/m) |
|---|---|---|---|---|---|---|---|
| 18 | 60 | 0.28 | 0.053 | 6.0 | 2.1 | 4.6 | 6.0 |
| | | | Gama Sperse w/2% polyacrylamide | | | | |
| 19 | 0 | 0.16 | — | 4.5 | 2.5 | 2.4 | 4.0 |
| 20 | 20 | 0.19 | 0.043 | 8.0 | 3.4 | 2.7 | 6.0 |
| 21 | 40 | 0.21 | 0.045 | 7.0 | 2.6 | 3.2 | 5.5 |
| 22 | 50 | 0.24 | 0.050 | 7.5 | 2.9 | 3.0 | 5.4 |
| | | | | RO40 | | | |
| 23 | 0 | 0.19 | 0.044 | 7.0 | 2.9 | 3.2 | 6.0 |
| 24 | 20 | 0.21 | 0.044 | 6.5 | 2.9 | 2.5 | 5.5 |
| 25 | 40 | 0.25 | 0.044 | 4.0 | 2.5 | 2.8 | 4.5 |
| 26 | 50 | 0.30 | 0.050 | 4.0 | 2.2 | 3.5 | — |
| 27 | 60 | 0.38 | 0.058 | 4.5 | 2.1 | 4.5 | 6.0 |

The tests showed that the density of the articles increases approximately 0.8% for each weight percent of added Gama Sperse or RO40 calcium carbonates. This relationship held true for the full range of Gama Sperse (0–60% by weight) and for RO40 in a range from 0–40% by weight. Adding higher than 40% RO40 by weight roughly doubled the rate of increase of the density. The effect was similar for the samples that contained Gama Sperse with 2% polyacrylamide by weight.

The thermal conductivity results were somewhat unclear; however there was an increase in conductivity as the fraction of the inorganic aggregate was increased. The increase was in the order of about 0.2% per weight percent of calcium carbonate added.

The addition of calcium carbonate had little effect on the energy-to-failure, displacement-to-failure, or the peak load. Although the dry stiffness was substantially constant initially, it exhibited an increase of about 50% at the highest weight fractions of 50 and 60%. Based on the above tests, there was only a limited detrimental effect on the mechanical behavior by substituting up to 60% of starch-based binder with calcium carbonate.

Examples 28–39

Cups were made using different types of calcium carbonate to determine their effect on the final article. The same procedures and apparatus set forth in Examples 1–13 were used to make and test the cups of the present examples. Each of the moldable mixtures included the following components by weight:

39.8% Stalok 400 (modified potato starch)

9.95% calcium carbonate 49.5% water 0.5% magnesium stearate.

Summarized below is a list of the selected types of calcium carbonate and the properties resulting from their use.

| Example | Calcium Carbonate Aggregate | Density (g/cc) | Thermal Conduct. (W/m · K) | Energy to Fail. (mJ) | Displacement to Failure (%) | Peak load (N) | Stiffness (N/m) |
|---|---|---|---|---|---|---|---|
| 28 | None | 0.19 | 0.044 | 7 | 2.9 | 6.0 | 3.1 |
| 29 | Gama Sperse | 0.22 | 0.047 | 6 | 2.9 | 5.0 | 2.5 |
| 30 | Carbital 50 | 0.19 | 0.045 | 9 | 3.5 | 7.0 | 2.7 |
| 31 | RO40 | 0.22 | 0.46 | 7 | 4.1 | 5.5 | 2.7 |
| 32 | Albacar | 0.19 | 0.046 | 6 | 4.1 | 4.0 | 1.5 |
| 33 | Albacar Lo | 0.19 | 0.047 | — | — | — | — |
| 34 | Multiflex MM w/211 | 0.25 | 0.048 | 6 | 2.6 | 5.5 | 3.1 |
| 35 | RX 3694w/211 | 0.24 | 0.043 | 7 | 2.5 | 6.0 | 3.5 |
| 36 | Heavy w/211 | 0.24 | 0.049 | 6 | 2.5 | 5.5 | 3.5 |
| 37 | RX 3697 w/211 | 0.25 | 0.048 | 6 | 2.5 | 6.0 | 3.8 |
| 38 | Albacar Lo w/211 | 0.24 | 0.045 | 7 | 2.5 | 6.0 | 3.7 |
| 39 | Ultra Phlex w/211 | 0.17 | 0.045 | 8 | 3.7 | 5.0 | 2.0 |

The tests revealed that for a 20 weight percent by solids addition of a calcium carbonate aggregate, the mechanical and thermal properties of the resulting cups were only moderately affected by the type of calcium carbonate used. The changes in cup densities were minimal, being no greater than about 10%. The thermal conductivities deviated from that of the reference cups by only about 5%, independent of the type of calcium carbonate used.

The energies-to-failure showed a slightly higher value (about 20%) for Carbital 50 then those of the articles made using other calcium carbonate aggregates, which were all approximately at the same level as the reference cups. The displacement-to-failure and peak load were relatively insensitive to the different kinds of calcium carbonate aggregates used except for Albacar. Albacar resulted in the lowest values in these categories. The cups that contained 20% calcium carbonate possessed about the same stiffness as the cups made without an inorganic aggregate, the exception being Albacar and Ultra Phlex, which resulted in cups having about half the stiffness.

In general, the different types of calcium carbonate aggregates had similar effects on the properties of the final cups. The most notable exception was Albacar, which had a detrimental effect on several properties.

Examples 40–44

Cups were made using collamyl starch with different concentrations of calcium carbonate to determine the effect of using collamyl starch. The same procedures and apparatus set forth in Examples 1–13 were used to make and test the cups of Examples 40–44. A base mixture was first prepared by combining the following components by weight:

49.75% collamyl starch and RO40 calcium carbonate
49.75% water
0.5% magnesium stearate.

The calcium carbonate was added to the mixture in amounts of 20, 40, 50, and 60% by total weight of the calcium carbonate and starch-based binder. Summarized below are the properties of the articles made using different percentages of calcium carbonate.

concentrations, the increase was substantial, being about 2% for each weight percent of added RO40. Increases in the thermal conductivity followed a similar pattern as for the density. The increase in thermal conductivity for concentrations of RO40 exceeding 20% was about 0.5% per percent of added RO40. The energy and displacement-to-failure for the cups was largely unaffected by the addition of RO40. The peak load increased linearly at the rate of about 1% per percent of added RO40. The stiffness curve was similar to the density curve; a relatively flat region up to 20% RO40 and a linear increase for higher concentrations. The rate of increase in stiffness was approximately 1% for each percent of added RO40 in mixtures exceeding 20% RO40.

Based on the above observations, collamyl starch can be used to make the articles of the present invention. Furthermore, relatively high concentrations of calcium carbonate can be added to mixtures containing collamyl starch without significantly reducing the desired mechanical properties.

Examples 45–52

Cups were made using different types of admixtures to determine their effects, if any, on the properties of the mixtures. The same procedures and apparatus set forth in Examples 1–13 were used to make and test the cups of the present examples. A base mixture was first prepared by combining the following components by weight:

39.8% Stalok 400 (modified potato starch)
9.95% RO40 calcium carbonate
49.5% water
0.5% magnesium stearate.

Admixtures including Methocel® 240, Tylose® 15002 and polyvinyl alcohol (PVA), were then combined to the mixture by weight percentage of the total solids in the

| Example | Calcium Carbonate Aggregate (weight %) | Density (g/cc) | Thermal Conduct. (W/m · K) | Energy to Fail. (mJ) | Displacement to Failure (%) | Peak load (N) | Stiffness (N/m) |
|---|---|---|---|---|---|---|---|
| 40 | 0 | 0.79 | 0.043 | 6 | 3.5 | 4.5 | 1.9 |
| 41 | 20 | 0.17 | 0.043 | 7 | 4.3 | 4.5 | 1.7 |
| 42 | 40 | 0.24 | 0.046 | 7 | 3.5 | 5.2 | 2.2 |
| 43 | 50 | 0.27 | 0.045 | 7 | 3.2 | 5.8 | 2.5 |
| 44 | 60 | 0.32 | 0.053 | 7 | 2.6 | 6.5 | 3.5 |

The increase in density was negligible for the first 20% of RO40 calcium carbonate that was added. For higher mixture. Summarized below is a list of the moldable mixtures and the properties resulting from their use.

| Example | Admixtures (weight %) | Density (g/cc) | Thermal Conduct. (W/m · K) | Energy to Fail. (mJ) | Displacement to Failure (%) | Peak load (N) | Stiffness (N/m) |
|---|---|---|---|---|---|---|---|
| 45 | None | 0.26 | 0.045 | 4 | 2.2 | 4.5 | 2.8 |
| | PVA | | | | | | |
| 46 | 1.9 | 0.26 | 0.046 | 6 | 3.1 | 5.5 | 2.7 |
| 47 | 2.9 | 0.27 | 0.048 | 5 | 2.6 | 5.5 | 3.3 |
| 48 | 3.4 | 0.26 | 0.044 | 4 | 2.8 | 5.0 | 2.8 |

| | | | | Displace- | | |
|---|---|---|---|---|---|---|
| | | Thermal | Energy | ment to | Peak | |
| | Admixtures | Density | Conduct. | to Fail. | Failure | load | Stiffness |
| Example | (weight %) | (g/cc) | (W/m · K) | (mJ) | (%) | (N) | (N/m) |

| Example | Admixtures (weight %) | Density (g/cc) | Thermal Conduct. (W/m · K) | Energy to Fail. (mJ) | Displacement to Failure (%) | Peak load (N) | Stiffness (N/m) |
|---|---|---|---|---|---|---|---|
| | | | Methocel ® 240 | | | | |
| 49 | 0.5 | 0.19 | 0.045 | 6 | 3.4 | 5.5 | 2.3 |
| 50 | 1.0 | 0.18 | 0.052 | 8 | 6.0 | 4.5 | 0.9 |
| | | | Tylose ® 15002 | | | | |
| 51 | 0.5 | 0.23 | 0.044 | 7 | 4.1 | 5.0 | 1.8 |
| 52 | 1.0 | 0.19 | 0.049 | 3 | 3.1 | 3.5 | 1.7 |

The addition of PVA was shown to have little effect on the densities, thermal conductivities, or mechanical properties of the cups made therefrom. Methocel® 240 and Tylose® 15002 affected the density slightly. The density decreased just over 20% per each addition of 1% of either admixture. The thermal conductivity increased about 10% for the same additions. Methocel® 240 had a positive effect on the energy and displacement-to-failure measurements for dry cups. The energy-to-failure values doubled for each 1% addition, whereas the displacement-to-failure values showed an improvement of 2.5 times. The peak load dropped about 20% for each 1% addition of Methocel® 240, while the stiffness fell more than 70%. A 0.5% addition of Tylose® 15002 increased the energy-to-failure by 60%, the displacement-to-failure by 80% and the peak load by 10%. These increases disappeared with a further (0.5%) addition of Tylose® 15002. The stiffness of dry cups was halved by additions of 1% of either Methocel® or Tylose®.

Generally, PVA was found to have a minimal impact on the properties of the formed cups. Methocel® 240 and Tylose® 15002 were found to either maintain or improve the properties of the cups at lower concentrations. The benefits, however, were lost as the concentration of each was increased.

Examples 53–57

To study the synergistic effect of some admixtures, moldable mixtures were prepared containing varying amounts of RO40 calcium carbonate, both with and without the additives Dispex® A40 and Methocel® 240. The same procedures and apparatus set forth in Examples 1–13 were used to make and test the cups of Examples 53–57. The cups were made from five different mixtures. Mixture 1 contained the following components by weight: 49.75% water, 0.5% magnesium stearate, 19.9% RO40 calcium carbonate, and 29.85% Stalok 400(modified potato starch). Mix 1 further contained 2% Dispex and 0.5% Methocel® 240 by weight of the combined starch-based binder and calcium carbonate. Mixture 2 was similar to Mixture 1, except that the percentage of calcium carbonate was increased to 29.85%, while the starch-based binder was decreased to 19.9%. In Mixture 3, the calcium carbonate was further increased to 39.8%, the starch-based binder decreased to 9.95%, and the other components kept the same as in Mixture 1. Mixture 4 was similar to Mixture 1, except that Dispex was not added. Finally, Mixture 5 was similar to Mix 3, except that Methocel® 240 was not added.

Summarized below are the properties of the cups made from the five mixtures:

| Example | Mixture | Density (g/cc) | Thermal Conduct. (W/m · K) | Energy to Fail. (mJ) | Displacement to Failure (%) | Peak load (N) | Stiffness (N/m) |
|---|---|---|---|---|---|---|---|
| 53 | Mixture 1 | 0.23 | 0.049 | 5 | 2.9 | 4.0 | 1.7 |
| 54 | Mixture 2 | 0.25 | 0.049 | 3 | 2.9 | 3.0 | 1.3 |
| 55 | Mixture 3 | 0.32 | 0.057 | — | — | — | — |
| 56 | Mixture 4 | 0.26 | 0.044 | 7 | 3.5 | 5.5 | 2.3 |
| 57 | Mixture 5 | 0.32 | 0.052 | 4 | 2.1 | 3.0 | 2.1 |

The tests demonstrate that the densities of the articles increased as the concentration of calcium carbonate was increased. The densities of the articles increased, however, if either Dispex A40 or Methocel® 240 was not included in the mix design. The thermal conductivity exhibited a similar increase with increasing calcium carbonate concentration. The energy-to-failure and displacement-to-failure decreased as higher levels of RO40 were included. The samples without Dispex A40 displayed about 30% higher values, whereas the samples produced from a mixture without Methocel® 240 had slightly lower levels of performance. The peak load and stiffness both exhibited inferior levels when Dispex A40 and Methocel® 240 were added to the mixtures.

Although the admixtures were useful in producing articles having higher concentrations of inorganic aggregates, both Dispex A40 and Methocel® 240 produced articles having lower densities and inferior mechanical properties.

Examples 58–62

Cups were made using different amounts of the cross-linking admixture Sunrez 747 to determine its effect on the moldable mixture. The same procedures and apparatus set forth in Examples 1–13 were used to make and test the cups of Examples 58–62. A base mixture was first prepared by combining the following components by weight:

28.15% Stalok 400 (modified potato starch)
19.9% RO40 calcium carbonate
1.7% PVA
49.75% water
0.5% magnesium stearate.

The base mixture was then varied by incrementally increasing the concentration of Sunrez 747 by weight of total solids in the mixture over a range from 2% to 20%. Summarized below are the percentages of Sunrez 747 and the corresponding properties of the resulting cups.

| Example | Sunrez 747 (weight %) | Density (g/cc) | Thermal Conduct. (W/m · K) | Energy to Fail. (mJ) | Displacement to Failure (%) | Peak load (N) | Stiffness (N/m) |
|---------|-----------------------|----------------|----------------------------|----------------------|------------------------------|---------------|------------------|
| 58 | 0 | 0.26 | 0.044 | 4 | 2.8 | 4.8 | 2.5 |
| 59 | 2 | 0.25 | 0.048 | 5 | 2.8 | 5.0 | 2.6 |
| 60 | 5 | 0.24 | 0.048 | 4 | 2.8 | 4.8 | 2.5 |
| 61 | 10 | 0.23 | 0.048 | 7 | 4.4 | 4.2 | 1.5 |
| 62 | 20 | 0.24 | 0.046 | 4 | 3.4 | 4.0 | 1.8 |

The tests showed that Sunrez 747 had limited effect on the cup density. Initially, the density decreased about 2% for each percent of added Sunrez 747. This relationship persisted up to about 5% of the admixture, after which the cup density leveled off. The thermal conductivity showed an initial increase of approximately 4% for the first 2% of added Sunrez 747, but then leveled out. The mechanical properties of the cups also peaked early with the addition of Sunrez 747. The energy and displacement-to-failure of cups showed only minor increases up to 10% and then fell off slightly again. The peak load was fairly level with an apex at 2%. The stiffness curve approximated a step function. There was a plateau where there was no effect of Sunrez 747 addition up to 5%. There was a dramatic decrease in stiffness, roughly 50%, between 5 and 10%; thereafter the stiffness was not affected. In general, moderate improvements in the various properties were found where lower concentrations of Sunrez 747 were added.

Examples 63–70

Five mix designs were evaluated using varying concentrations of calcium carbonate (RO40), and different types of starch, in order to determine the minimum processing time and filling weight at four processing temperatures (160° C., 180° C., 200° C., and 220° C.). As used in the examples, specification, and appended claims, the term "processing time" refers to the time necessary to heat the mixture into a form-stable article. The composition of the five mixtures were as follows:

|  | Stalok 400 (g) | Hylon VII (g) | RO40 (g) | Mg Stearate (g) | Water (g) |
|---|---|---|---|---|---|
| Mixture 1 | 500 | 0 | 0 | 5 | 500 |
| Mixture 2 | 350 | 50 | 100 | 5 | 450 |
| Mixture 3 | 300 | 50 | 150 | 5 | 440 |
| Mixture 4 | 250 | 50 | 200 | 5 | 425 |
| Mixture 5 | 200 | 50 | 250 | 5 | 410 |

Hylon VII is a type of modified corn starch that was substituted for part of the Stalok 400. The moldable mixtures were prepared using the procedures set forth in Examples 1–13. Once the mixtures were prepared a HAAS LB-STA machine was used to make 16 oz. cups having thicknesses of about 4 mm and waffled exteriors. The resulting filling weights and processing times at the selected temperatures are summarized as follows:

| | | Processing Time (sec) | | | | |
|---|---|---|---|---|---|---|
| Example | Temp. (° C.) | Mixture 1 | Mixture 2 | Mixture 3 | Mixture 4 | Mixture 5 |
| 63 | 220 | 40 | 40 | 40 | 40 | 40 |
| 64 | 200 | 50 | 50 | 50 | 45 | 45 |
| 65 | 180 | 75 | 75 | 75 | 75 | 75 |
| 66 | 160 | 170 | 170 | 170 | 165 | 160 |

| | | Filling Weight (g) | | | | |
|---|---|---|---|---|---|---|
| Example | Temp. (° C.) | Mixture 1 | Mixture 2 | Mixture 3 | Mixture 4 | Mixture 5 |
| 67 | 220 | 30.5 | 32.2 | 34.4 | 37.9 | 41.6 |
| 68 | 200 | 33 | 31.5 | 356 | 39.3 | 43.9 |
| 69 | 180 | 31.4 | 33.5 | 35.5 | 37.6 | 44.1 |
| 70 | 160 | 31.7 | 33.7 | 34.1 | 39.7 | 43.9 |

As expected the tests revealed that the processing times decreased as the processing temperatures increased. Although the decrease in processing time was greatest for increases in processing temperatures at the lower ranges, the decrease in processing time was most dramatic where calcium carbonate was included at the higher concentration ranges. The tests also revealed that the minimum filling weight increased with higher concentrations of calcium carbonate. However, the filling weight was independent of the mold temperature.

Examples 71–78

The same compositions and processing parameters defined in Examples 63–70 were used to determine the minimum processing times and filling weights at four processing temperatures (160° C., 180° C., 200° C., and 220° C.) to produce 12 oz. cups having a smooth surface. The experimental results of the effects on the processing time and minimum filling weight are summarized below.

| Example | Temp. (° C.) | Processing Time (sec) | | | | |
|---|---|---|---|---|---|---|
| | | Mixture 1 | Mixture 2 | Mixture 3 | Mixture 4 | Mixture 5 |
| 71 | 220 | 35 | 35 | 35 | 35 | 35 |
| 72 | 200 | 40 | 40 | 40 | 40 | 40 |
| 73 | 180 | 80 | 80 | 80 | 75 | 75 |
| 74 | 160 | 110 | 110 | 110 | 110 | 110 |

| Example | Temp. (° C.) | Filling Weight (g) | | | | |
|---|---|---|---|---|---|---|
| | | Mixture 1 | Mixture 2 | Mixture 3 | Mixture 4 | Mixture 5 |
| 75 | 220 | 28.7 | 29.3 | 33.2 | 37.5 | 41 |
| 76 | 200 | 28 | 31.6 | 33.4 | 37.5 | 40.7 |
| 77 | 180 | 30.5 | 31.5 | 33.8 | 38.8 | 42 |
| 78 | 160 | 28.2 | 31.5 | 36.5 | 38.2 | 40 |

The test revealed findings similar to those outlined above in Examples 63–70.

Examples 79–86

The same compositions and processing parameters defined in Examples 63–70 were used to determine the minimum processing times and filling weights at four processing temperatures (160° C., 180° C., 200° C., and 220° C.) to produce "clam-shell" containers having a smooth surface. The experimental results regarding the processing time and minimum filling weight are summarized below.

| Example | Temp. (° C.) | Processing Time (sec) | | | | |
|---|---|---|---|---|---|---|
| | | Mixture 1 | Mixture 2 | Mixture 3 | Mixture 4 | Mixture 5 |
| 79 | 220 | 30 | 30 | 30 | 30 | 30 |
| 80 | 200 | 35 | 35 | 35 | 35 | 35 |
| 81 | 180 | 45 | 45 | 45 | 45 | 45 |
| 82 | 160 | 50 | 50 | 50 | 50 | 50 |

| Example | Temp. (° C.) | Filling Weight (g) | | | | |
|---|---|---|---|---|---|---|
| | | Mixture 1 | Mixture 2 | Mixture 3 | Mixture 4 | Mixture 5 |
| 83 | 220 | 19.7 | 24.1 | 25.6 | 29.8 | 31.2 |
| 84 | 200 | 19.0 | 23.4 | 24.7 | 27.8 | 32.5 |
| 85 | 180 | 17.9 | 23.4 | 24.6 | 28.7 | 30.5 |
| 86 | 160 | 17.1 | 23.4 | 25.0 | 28.0 | 30.5 |

The tests revealed finding similar to those outlined in Examples 63–70.

Examples 87–91

Using the same process as in Examples 1–13, 12 oz. cups were made using dies at a temperature of 200° C. The mixture for manufacturing the cup consisted of the following components by weight:

24.95% Stalok 400 (modified potato starch)
19.9% RO40 calcium carbonate
4.9% Hylon VII (modified corn starch)
49.75% water
0.5% magnesium stearate.

The dried cups were placed in a high humidity chamber having a relative humidity of about 95% and a temperature of about 45° C. The cups were removed after varying levels of moisture had been absorbed by the starch-bound structural matrix of the cups and tested to determine their mechanical properties. The respective moisture contents and corresponding mechanical properties are outlined below:

| | BASE MIXTURE-10% Hylon-40% CaCO3 | | | |
|---|---|---|---|---|
| Examples | Moisture Content | Peak Load (N) | Displacement to Failure (%) | Energy (mJ) |
| 87 | 0 | 5.5 | 2.9 | 5 |
| 88 | 2 | 8.5 | 3.7 | 12 |
| 89 | 5.5 | 10.5 | 11.8 | 45 |
| 90 | 7.5 | 9.0 | 23.5 | 65 |
| 91 | 9.5 | — | 24.3 | 40 |

The test results reveal a roughly linear correlation between the moisture content and the mechanical properties for low moisture contents. As the moisture content increased, the mechanical properties improve.

Examples 92–94

Using the same processing parameters set forth in Examples 1–13, 12 oz. cups were made from moldable mixtures having varying percentages of calcium carbonate and relatively constant viscosities to determine the effect of calcium carbonate on the required water content and time for removing the water. Summarized below are the compositions tested and the required times to produce a form-stable article having a finished surface.

| Example | Calcium Carbonate (g) | Starch-based binder (g) | Magnesium Stearate (g) | water (g) | Process Time (sec) |
|---|---|---|---|---|---|
| 92 | 250 | 250 | 10 | 425 | 50–55 |
| 93 | 350 | 150 | 10 | 350 | 35–40 |
| 94 | 400 | 100 | 10 | 285 | 30 |

The results show that with increased concentrations of calcium carbonate, less water is needed to obtain a mixture having a constant viscosity. Furthermore, as a result of having less water, the required processing time to produce a form-stable article was decreased.

Examples 95–114

The same five compositions and baking times set forth in Examples 63–70 were used to make 16 oz. cups having a waffled surface. The dried cups were subsequently placed on a scale within a humidity chamber at 45° C. and a relative humidity of 90%. The rate of moisture absorption of the cups was then determined by plotting the weight of the cups as a function of time. Summarized below are tables showing the percent moisture absorption at selected time intervals for each of the five mixtures. A separate table is provided for the cups made at temperatures of 160° C., 180° C., 200° C., and 220° C.

| | | Moisture Absorption (weight %) at 160° C. | | | |
|---|---|---|---|---|---|
| Example | Composition | 400 (sec) | 800 (sec) | 1200 (sec) | 1600 (sec) |
| 95 | Mixture 1 | 5.0 | 8.0 | 11.0 | — |
| 96 | Mixture 2 | 5.0 | 7.5 | 10.0 | 12 |
| 97 | Mixture 3 | 3.5 | 6.0 | 8.0 | 10 |
| 98 | Mixture 4 | 3.5 | 5.5 | 7.5 | 9 |
| 99 | Mixture 5 | 3.0 | 5.0 | 6.0 | 7 |

| | | Moisture Absorption (weight %) at 180° C. | | | |
|---|---|---|---|---|---|
| Example | Composition | 400 (sec) | 800 (sec) | 1200 (sec) | 1600 (sec) |
| 100 | Mixture 1 | 6.5 | 11 | 12 | — |
| 101 | Mixture 2 | 6.0 | 9.0 | 11.5 | 13.5 |
| 102 | Mixture 3 | 4 | 6.5 | 9.0 | 11.0 |
| 103 | Mixture 4 | 4 | 6.0 | 8.0 | 9.5 |
| 104 | Mixture 5 | 2.5 | 4.5 | 6.0 | 7.0 |

| | | Moisture Absorption weight (%) at 200° C. | | | |
|---|---|---|---|---|---|
| Example | Composition | 400 (sec) | 800 (sec) | 1200 (sec) | 1600 (sec) |
| 105 | Mixture 1 | 5.5 | 10.0 | — | — |
| 106 | Mixture 2 | 4.5 | 7.0 | 9.0 | 11.5 |
| 107 | Mixture 3 | 4.5 | 7.0 | 9.0 | 11.0 |
| 108 | Mixture 4 | 4.5 | 7.0 | 8.5 | 10.0 |
| 109 | Mixture 5 | 4.5 | 6.5 | 8.0 | 9.0 |

| | | Moisture Absorption (weight %) at 220° C. | | | |
|---|---|---|---|---|---|
| Example | Composition | 400 (sec) | 800 (sec) | 1200 (sec) | 1600 (sec) |
| 110 | Mixture 1 | 5.0 | 9.5 | 13.0 | — |
| 111 | Mixture 2 | 4.5 | 8.5 | 11.5 | — |
| 112 | Mixture 3 | 4.0 | 7.0 | 9.0 | 11.0 |
| 113 | Mixture 4 | 4.0 | 7.0 | 9.0 | 11.0 |
| 114 | Mixture 5 | 3.0 | 5.0 | 6.5 | 8.0 |

The tests showed that the rate of moisture absorption decreases for all compositions. That is, the more moisture contained within an article, the slower the article absorbs additional moisture. The tests also showed that cups having increased concentrations of calcium carbonate absorb moisture at a lower rate. There is, however, no systematic variation on the absorption rates as a function of the different processing temperatures. It is believed that the differences between tables are due to statistical variations.

Examples 115–136

The same five mixtures and processing times set forth in Examples 63–70 were used to make 12 oz. cups having a smooth surface. The dried cups were subsequently placed on a scale within a humidity chamber at 45° C. and a relative humidity of 90%. The rate of moisture absorption of the cups was then determined by plotting the weight of the cups versus time. Summarized below are tables showing the percent moisture absorption at selected time intervals for each of the five mixture. A separate table is provided for the cups made at mold temperatures of 160° C., 180° C., 200° C., and 220° C.

| | | Moisture Absorption (weight %) at 160° C. | | | |
|---|---|---|---|---|---|
| Example | Composition | 400 (sec) | 800 (sec) | 1200 (sec) | 1600 (sec) |
| 115 | Mixture 1 | 3.5 | 6.0 | 9.0 | — |
| 116 | Mixture 2 | 3.5 | 6.5 | 9.0 | 11.0 |
| 117 | Mixture 3 | 3.5 | 6.0 | 8.0 | 10.0 |
| 118 | Mixture 4 | 3.5 | 6.0 | 8.0 | 9.5 |
| 119 | Mixture 5 | 3.5 | 5.5 | 7.0 | 8.0 |

| | | Moisture Absorption (weight %) at 180° C. | | | |
|---|---|---|---|---|---|
| Example | Composition | 400 (sec) | 800 (sec) | 1200 (sec) | 1600 (sec) |
| 120 | Mixture 1 | 4.5 | 8.0 | 11.5 | — |
| 121 | Mixture 2 | 3.0 | 6.0 | 8.5 | 10.0 |
| 122 | Mixture 3 | 3.0 | 6.0 | 8.0 | 9.5 |
| 123 | Mixture 4 | 2.5 | 5.0 | 6.5 | 8.0 |
| 124 | Mixture 5 | 1.5 | 5.0 | 8.0 | 9.5 |

| | | Moisture Absorption (weight %) at 200° C. | | | |
|---|---|---|---|---|---|
| Example | Composition | 400 (sec) | 800 (sec) | 1200 (sec) | 1600 (sec) |
| 125 | Mixture 1 | 4.5 | 8.5 | 12.0 | — |
| 126 | Mixture 2 | 4.0 | 7.0 | 10.0 | 11.0 |
| 127 | Mixture 3 | 3.0 | 5.5 | 8.0 | 10.0 |
| 128 | Mixture 4 | 3.0 | 5.5 | 7.5 | 9.0 |
| 129 | Mixture 5 | 3.0 | 5.0 | 7.0 | 8.0 |

| | | Moisture Absorption (weight %) at 220° C. | | | |
|---|---|---|---|---|---|
| Example | Composition | 400 (sec) | 800 (sec) | 1200 (sec) | 1600 (sec) |
| 130 | Mixture 1 | 4.5 | 3.5 | 11.5 | — |
| 131 | Mixture 2 | 4.0 | 2.0 | 10.0 | 12.0 |
| 132 | Mixture 3 | 2.5 | 5.5 | 8.0 | 10.0 |
| 133 | Mixture 4 | 2.5 | 5.5 | 7.5 | 8.5 |
| 134 | Mixture 5 | 2.0 | 4.0 | 6.0 | 6.5 |

The tests showed that the rate of moisture absorption decreases for all compositions. That is, the more moisture contained within an article, the slower the articles absorb II additional moisture. The tests also showed that cups having increased concentrations of calcium carbonate absorb moisture at a lower rate. There is, however, no systematic variation of the absorption rates as a function of the different processing temperatures. It is believed that the differences between tables are due to statistical variations.

Examples 135–139

Using the five mixtures set forth in Examples 63–70, 12 oz. cups having a smooth surface were produced using a mold temperature of 200° C. The cups were subsequently placed in a high humidity chamber at 45° C. and 90% humidity. Selected cups were periodically removed during the conditioning stage and tested in order to determine the moisture content necessary to yield an article having a 10 mm displacement-before-failure. A displacement of 10 mm was arbitrarily chosen as providing a cup with a sufficient amount of damage tolerance to make the cup useful. The resulting moisture contents necessary to impart the desired property to the cups at the different mixtures are summarized below:

| Examples | Mixture | Moisture Content (%) | Displacement to Failure (%) |
|---|---|---|---|
| 135 | Mixture 1 | 8.0 | 14.7 |
| 136 | Mixture 2 | 6.7 | 14.7 |
| 137 | Mixture 3 | 6.1 | 14.7 |
| 138 | Mixture 4 | 5.5 | 14.7 |
| 139 | Mixture 5 | 4.9 | 14.7 |

The tests revealed that as the percentage of calcium carbonate was increased in the mixtures, the required amount of moisture needed to impart the desired displacement-to-failure decreased. Comparing the present test results with those in Examples 95–114, shows that, although mixtures having more calcium carbonate absorb moisture at a slower rate, such mixtures require less moisture to obtain the desired properties.

Examples 140–146

Articles were made using different types of calcium carbonate to determine the effect of the particle size and packing density of the inorganic aggregate. Mixtures were made from three different types of calcium carbonate: Carbital 75, RO40, and Marblend. The basic chemical composition for each type of calcium carbonate was the same; however, the particle size distribution, average particle size, and natural packing density (or non compressed packing density), as shown below, varied greatly.

| Type of Calcium Carbonate | Average Particle Size (μm) | Natural Packing Density |
|---|---|---|
| Carbital 75 | 2.395 | 0.3593 |
| RO40 | 40.545 | 0.6869 |
| Marblend | 68.468 | 0.7368 |

The gradation for each type of calcium carbonate was as follows:

| Gradation of Carbital 75 | | |
|---|---|---|
| Sieve Opening (μm) | Retained % | Passing % |
| 18.000 | 0.00 | 100.00 |
| 5.470 | 10.00 | 90.00 |
| 3.043 | 25.00 | 75.00 |
| 1.583 | 50.00 | 50.00 |
| 0.862 | 75.00 | 25.00 |
| 0.490 | 90.00 | 10.00 |

| Gradation of RO40 | | |
|---|---|---|
| Sieve Opening (μm) | Retained % | Passing % |
| 275.000 | 0.00 | 100.00 |
| 134.700 | 10.00 | 90.00 |
| 82.150 | 25.00 | 75.00 |
| 41.308 | 50.00 | 50.00 |
| 14.190 | 75.00 | 25.00 |
| 2.782 | 90.00 | 10.00 |

| Gradation of Marblend | | |
|---|---|---|
| Sieve Opening (μm) | Retained % | Passing % |
| 1000.00 | 0.00 | 100.00 |
| 338.100 | 10.00 | 90.00 |
| 212.200 | 25.00 | 75.00 |
| 36.190 | 50.00 | 50.00 |
| 12.160 | 75.00 | 25.00 |
| 3.761 | 90.00 | 10.00 |

These tables show that, of the three types of calcium carbonate tested, Carbital 75 had by far the smallest average particle size and the smallest particle size distribution, Marblend had the largest, and RO40 was intermediate. Each mixture contained one type of calcium carbonate, Stalok 400 potato starch and water, while no mold releasing agent was used. The mixtures were prepared according to the procedures set forth in Examples 1–13 and then placed between molds having a temperature of about 200° C. The articles were removed from the molds once they had obtained form-stability. The molds were nickel-Teflon coated and had complementary shapes defined to produce a platter. The formed platters were approximately 25 cm long, 18 cm wide, and 3 mm thick. Outlined below are the components for each mixture, the weight of the final platter, and the processing time.

| Example | Calcium Carbonate (g) | Stalok 400 (g) | Water (g) | Platter weight (g) | Processing Time (sec) |
|---|---|---|---|---|---|
| Calcium Carbonate Carbital 75 | | | | | |
| 140 | 100 | 900 | 800 | 31.6 | 40 |
| 141 | 200 | 800 | 800 | 32.5 | 40 |
| 142 | 300 | 700 | 800 | NA | NA |
| Calcium Carbonate RO40 | | | | | |
| 143 | 700 | 300 | 800 | 30.2 | 40 |
| 144 | 800 | 200 | 800 | NA | NA |
| Calcium Carbonate Marblend | | | | | |
| 145 | 700 | 300 | 800 | 30.2 | 40 |
| 146 | 800 | 200 | 800 | NA | NA |

Examples 140 and 141 produced form-stable articles having negligible cracks or defects, although the plates of Example 140 were of somewhat higher quality than those of Example 141. In example 142, where the Carbital 75 was increased to 30% by weight of the total solids, crack-free, form-stable articles could not be made, regardless of the processing time. Examples 143 and 145 produced form-stable articles having negligible cracks or defects using 70% by weight of total solids RO40 and Marblend. The best articles were formed in Example 145. Crack-free, form-stable articles could not be made in Examples 144 and 146 where the concentration of RO40 and Marblend was increased to 80% by weight of the solids.

The above examples teach that functional articles can be made with higher concentrations of inorganic aggregate by using an aggregate material which (1) has a larger average diameter (which yields an aggregate material having a lower specific surface area), and (2) which has a greater particle size distribution (which yields an aggregate material having a higher particle packing density). The maximum amount of Carbital 75 that could be used to produce functional articles was 20% by weight of the solids. In comparison, functional articles could be made using 70% by weight of either RO40 or Marblend. The difference in the concentration of aggregate that could be used is attributed to the fact that RO40 and Marblend had a natural packing density approximately twice that of Carbital 75. The difference is further attributed to the fact that RO40 and Marblend had an average particle size that was approximately twenty to thirty times larger than Carbital 75.

To illustrate, Carbital 75 had a relatively low packing density of about 0.36. As the concentration of Carbital 75 increased and the concentration of starch-based binder decreased, respectively, the volume of interstitial space between the particles increased. As a result, more of the starch-based binder and water was being used to fill the interstitial space as opposed to coating the particles. Furthermore, since the Carbital 75 had a relatively small average particle size (and, hence, a larger specific surface area), more water and starch-based binder were needed to coat the aggregate particles. Eventually, when the concentration of Carbital 75 reached 30% by weight of the solids, the volume of interstitial space was so large that there was insufficient water to adequately disperse the starch-based binder and insufficient starch-based binder to adequately bind the aggregate particles into a form-stable, crack-free structural matrix.

In contrast, the Marblend had a much higher packing density of about 0.73 and a larger average particle size. Accordingly, even at the higher concentration of 70% Marblend by weight of solids, the interstitial space was sufficiently small to permit the starch-based binder and water to adequately bind the aggregate particles into a functional article. At 80% Marblend by weight of solids, however, the volume of interstitial space was again too large for the starch-based binder and water to adequately bind the aggregate particles into a form-stable, crack-free structural matrix. However, it would be expected that by using an aggregate having a packing density higher then that of Marblend, an article could be made having an even higher concentration of inorganic aggregates.

It is also noteworthy that the viscosity of the mixtures decreased as the concentration of Carbital 75 increased and that the viscosity of the mixtures increased with increased concentrations of RO40 and Marblend. As previously discussed, the starch-based binder absorbs the solvent. By replacing a portion of the starch-based binder with an inorganic aggregate, the amount of solvent that would have been absorbed by the starch-based binder is free to lubricate the aggregate particles, flowever, the inorganic aggregate replacing the starch-based binder also produces interstitial space which must be filled by the solvent. Accordingly, if the amount of solvent freed by the removal of the starch-based binder is smaller than the volume of interstitial space created by the addition of the aggregate, then the viscosity of the mixture increases. This process is illustrated by the use of Carbital 75. In contrast, if the amount of solvent freed by the removal of the starch-based binder is larger than the volume of interstitial space created by the addition of more aggregate, then the viscosity of the mixture decreases. This process is illustrated by the RO40 and Marblend.

Examples 147–151

In the following examples each of the components was held constant except for the starch-based binder, which was gradually substituted with rice flour. Because rice flour includes a high percentage of starch, along with some protein, it would be expected to have a binding effect within the structural matrix. In addition, the inert fraction would be expected to act as an inert organic filler. All concentrations are expressed as a percentage by weight of the overall mixture.

| Example | Stalok 400 | Rice Flour | RO40 | Water | Magnesium Stearate |
|---|---|---|---|---|---|
| 147 | 24.8% | 0% | 24.8% | 49.5% | 0.5% |
| 148 | 19.8% | 5.0% | 24.8% | 49.5% | 0.5% |
| 149 | 14.9% | 9.9% | 24.8% | 49.5% | 0.5% |
| 150 | 9.9% | 14.9% | 24.8% | 49.5% | 0.5% |
| 151 | 5.0% | 19.8% | 24.8% | 49.5% | 0.5% |

The compositions of these examples resulted in molded articles in which the average cell diameter of the cells decreased as the percentage of the rice flour was increased and the amount of Stalok 400 (potato starch) was decreased. Hence, these examples show that the cell size can be regulated through the use of controlled mixtures of starch-based binder of different origin. This, in turn, results in articles having significantly different physical and mechanical properties. In this manner, rice flour (or similar grain flours or alternative starch sources) can be used in varying amounts in order to carefully control the physical and mechanical properties of the resulting articles manufactured therefrom. The following are the average cell diameters and skin thicknesses of the articles manufactured using the mix designs of Examples 147–151:

| Example | Average Cell Diameter | Wall Thickness | Skin Thickness |
|---|---|---|---|
| 147 | 670 μm | 2.2 mm | 300 μm |
| 148 | 450 μm | 2.4 mm | 370 μm |
| 149 | 370 μm | 2.5 mm | 330 μm |
| 150 | 300 μm | 2.3 mm | 250 μm |
| 151 | 300 μm | 2.1 mm | 200 μm |

Example 152

In order to increase the average cell size and skin thickness, moldable mixtures are made which have decreased viscosity, even as low as 50 cps at a shear rate of 100 rpm, by altering the base mixture of 49.75% Stalok 400 and inorganic aggregate (combined), 49.75% water, and 0.5% magnesium stearate. This base mixture has a viscosity of 300 cps at a shear rate of 100 rpm. The viscosity of the mixture can be reduced to 50 cps at the same shear rate by adding more water or through the addition of 1% oil by weight.

Alternatively, in order to decrease the average cell size and skin thickness, the viscosity of the moldable mixture can be increased, even up to 100,000 cps at the same shear rate, through the use of less water and/or the addition of cellulosic thickeners (such as Methocel®).

Example 153

A mixture containing 24.8% Stalok 400, 24.8% inorganic aggregate, 49.5% water, and 0.5% magnesium stearate is formed by pregelating the starch-based binder prior to the addition of the aggregate and mold release agent. The pregelation is carried out either through the use of a pre-cooking step or through the use of a pregelated starch-based binder. The precooking step is carried out by heating the vessel containing the starch-based binder mixture over a heated surface or by microwaving the mixture. The yield stress of these pregelated mixtures is between about 3 kPa to about 20 kPa. The mixtures produced by this method are fabricated into articles by the same processing techniques used in the foregoing examples for a pourable mixture.

Examples 154–157

Moldable mixtures containing varying amounts of polyvinyl alcohol ("PVA") were used to manufacture articles. It was found that the use of PVA decreased the processing time.

| Example | Starch-based binder (StaLok) | Calcium Carbonate | Mg Stearate | Water | Polyvinyl Alcohol | Process Time |
|---|---|---|---|---|---|---|
| 154 | 500 g | 500 g | 20 g | 883 g | 1.7 g | 45–50 sec |
| 155 | 500 g | 500 g | 20 g | 917 g | 3.33 g | 40–45 sec |
| 156 | 500 g | 500 g | 20 g | 950 g | 5.0 g | 40–45 sec |
| 157 | 500 g | 500 g | 20 g | 983 g | 6.7 g | 35–40 sec |

Examples 158–160

Mixtures were prepared that contained the following components and concentrations in order to show the effect of solvent concentration on the density and insulation ability of the articles manufactured therefrom.

| Example | Potato Starch (g) | Calcium Carbonate RO40 (g) | Magnesium Stearate (g) | Water (g) |
|---|---|---|---|---|
| 158 | 500 | 500 | 10 | 100 |
| 159 | 500 | 500 | 10 | 200 |
| 160 | 500 | 500 | 10 | 300 |

The articles manufactured from the mixtures of Examples 158–160 demonstrated that using less water resulted in a molded article having smaller cells, higher density, and lower insulation (higher thermal conductivity).

Example 161

A study was performed to determine the effect of varying the number of vent holes within the molding apparatus used to manufacture cups on the structure of the resulting molded cups. The moldable mixture of Example 1 was formed into cups using different molding apparatus in which the number of vent holes was varied so that there were 2, 4, 6, 8, or 10 vent holes of standard size, respectively. The density of the walls of the resulting cups increased as the number of vent holes increased, presumably because of the decrease in pressure that was able to build up, which led to a lower expansion of the cells within the structural matrix of the cup walls. Hence, using fewer vent holes results in a molded article having wall that are less dense and which have larger cells within the structural matrix.

Examples 162–169

Moldable mixtures are made which have a lightweight aggregate in order to yield a more lightweight article having greater insulation ability and lower density. The mixtures used to form such articles are set forth as follows:

| Example | Potato Starch (g) | Perlite (% by volume of mixture) | Magnesium Stearate (g) | Water (g) |
|---|---|---|---|---|
| 162 | 500 | 5 | 10 | 500 |
| 163 | 500 | 10 | 10 | 500 |
| 164 | 500 | 15 | 10 | 500 |
| 165 | 500 | 25 | 10 | 500 |
| 166 | 500 | 40 | 10 | 500 |
| 167 | 500 | 55 | 10 | 500 |
| 168 | 500 | 65 | 10 | 500 |
| 169 | 500 | 85 | 10 | 500 |

The mixtures are formed into cups using the systems and methods set forth above. As the amount of perlite is increased, the resulting cup has a lower density, thermal conductivity, increased stiffness, and increased brittleness. The cups having the optimal balance of the foregoing properties are obtained by using a moldable mixture in the which the concentration of perlite ranges from between about 25% to about 55% perlite by volume of the moldable mixture. However, using more or less than these amounts may be desired for certain articles.

VII. SUMMARY

From the foregoing, it will be appreciated that the present invention provides improved inorganically filled compositions for manufacturing articles that can be formed into a variety of objects presently formed from paper, cardboard, polystyrene, metal, glass, plastic, or other organic materials.

The present invention further provides inorganically filled articles that can be directly formed having the desired flexibility for their intended use.

The present invention additionally provides inorganically filled articles that can simultaneously be formed with a coating.

The present invention also provides inorganically filled articles that can be formed having a smooth surface.

The present invention also provides compositions which yield inorganically filled, cellular articles which have properties similar to those of paper, paperboard, polystyrene, metal, glass, and plastic. Such compositions can be formed into a variety of containers and other objects using slightly modified, currently existing equipment.

The present invention further provides compositions for manufacturing inorganically filled, cellular articles which do not result in the generation of wastes involved in the manufacture of paper, paperboard, plastic, metal, glass, or polystyrene materials.

The present invention further provides compositions, which contain less water to be removed during the manufacturing process (as compared to paper manufacturing) in order to shorten the processing time and reduce the initial equipment capital investment. Further, the articles are readily degradable into substances which are nontoxic and which are commonly found in the earth.

In addition, the present invention provides compositions which make possible the manufacture of containers and other articles at a cost comparable, and even superior, to existing methods of manufacturing paper or polystyrene products.

The present invention also provides compositions which are less energy intensive, which conserve valuable natural resources, and which require lower initial capital investments compared to those used in making articles from conventional materials.

Additionally, the present invention provides compositions for mass-producing inorganically filled, cellular articles which can rapidly be formed and substantially dried within a matter of minutes from the beginning of the manufacturing process.

Finally, the compositions allow for the production of highly inorganically filled cellular materials having greater flexibility flexural strength, toughness moldability, and mass-producibility compared to materials having a high content of inorganic filler.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An article of manufacture comprising:

a starch-bound cellular matrix formed by gelatinizing a starch-based binder in water and then causing the starch-based binder to substantially harden by removing a substantial portion of the water by evaporation to thereby form the starch-bound cellular matrix, wherein the starch-bound cellular matrix includes an outer skin portion having a density and an interior foam portion having a density that is significantly lower than the density of the outer skin portion, the starch-bound cellular matrix further including optional components dispersed therein; and a coating applied to at least a portion of the outer skin portion of the starch-bound cellular matrix selected from the group consisting of edible oils, drying oils, melamine, phenolic resins, polyester resins, epoxy resins, terpene resins, urea-formaldehyde reins, styrene polymers, polyvinyl chloride, polyvinyl alcohol, polyvinyl acetate, polyacrylates, polyamides, hydroxypropylmethylcellulose, methocel, polyethylene glycol, acrylics, acrylic copolymers, polyurethane, polylactic acid, polyhydroxybutyrate-hydroxyvalerate copolymers, starches, soybean protein, waxes, and mixtures thereof.

2. An article of manufacture as defined in claim 1, wherein the starch-based binder comprises a starch selected from the group consisting of potato starch, corn starch, waxy corn starch, rice starch, wheat starch, starches derived from cereals, tubers, and roots, and mixtures thereof.

3. An article of manufacture as defined in claim 1, wherein the starch-based binder is included in an amount in a range from about 10% to about 80% by weight of total solids in the starch-bound cellular matrix.

4. An article of manufacture as defined in claim 1, wherein the starch-based binder is included in an amount in a range from about 30% to about 70% by weight of total solids in the starch-bound cellular matrix.

5. An article of manufacture as defined in claim 1, wherein the starch-based binder is included in an amount in a range from about 40% to about 60% by weight of total solids in the starch-bound cellular matrix.

6. An article of manufacture as defined in claim 1, further including an inorganic aggregate filler substantially homogeneously dispersed throughout the starch-bound cellular matrix.

7. An article of manufacture as defined in claim 6, wherein the inorganic aggregate filler comprises calcium carbonate.

8. An article of manufacture as defined in claim 6, wherein the inorganic aggregate filler is selected from the group consisting of perlite, vermiculite, sand, crushed sandstone, crushed limestone, glass beads, hollow glass spheres, mica, clay, kaolin, crushed rock, exfoliated rock, and mixtures thereof.

9. An article of manufacture as defined in claim 6, wherein the inorganic aggregate filler is included in an amount in a range from about 20% to about 90% by weight of total solids in the starch-bound cellular matrix.

10. An article of manufacture as defined in claim 6, wherein the inorganic aggregate filler is included in an amount in a range from about 30% to about 70% by weight of total solids in the starch-bound cellular matrix.

11. An article of manufacture as defined in claim 1, wherein the starch-bound cellular matrix further includes a mold-release agent.

12. An article of manufacture as defined in claim 1, wherein the starch-bound cellular matrix further includes fibers substantially homogeneously dispersed throughout the starch-bound cellular matrix.

13. An article of manufacture as defined in claim 12, wherein the fibers are selected from the group consisting of sisal, hemp, cotton, plant, leaf, abaca, bagasse, wood, graphite, silica, ceramic, and metal fibers, and mixtures thereof.

14. An article of manufacture as defined in claim 12, wherein a portion of the starch-based binder includes pregelatinized or modified starch.

15. An article of manufacture as defined in claim 1, wherein the starch-bound cellular matrix further includes a natural polymer selected from the group consisting of alginic acid, phycocolloids, agar, gum arabic, guar gum, locust bean gum, gum karaya, gum tragacanth, cellulose-based materials, protein-based materials, and mixtures thereof.

16. An article of manufacture as defined in claim 1, wherein the starch-bound cellular matrix further includes a synthetic polymer selected from the group consisting of polyvinyl alcohol, polyvinyl acetate, polyacrylic acid, polylactic acid, and mixtures thereof.

17. An article of manufacture as defined in claim 1, wherein the starch-bound cellular matrix has a density in a range from about 0.05 g/cm$^3$ to about 1 g/cm$^3$.

18. An article of manufacture as defined in claim 1, wherein the starch-bound cellular matrix has a density in a range from about 0.1 g/cm$^3$ to about 0.5 g/cm$^3$.

19. An article of manufacture as defined in claim 1, wherein the starch-bound cellular matrix is in the form of a container selected from the group consisting of cups, plates, clam-shell boxes, food trays, and bowls.

20. An article of manufacture as defined in claim 1, wherein the starch-bound cellular matrix has a thickness up to about 10 cm.

21. An article of manufacture as defined in claim 1, wherein the starch-bound cellular matrix has a thickness in a range from about 1 mm to about 1 cm.

22. An article of manufacture as defined in claim 1, wherein the starch-bound cellular matrix has a thickness in a range from about 2 mm to about 5 mm.

23. An article of manufacture as defined in claim 1, wherein the starch-bound cellular matrix further includes a plasticizer.

24. An article of manufacture as defined in claim 23, wherein the plasticizer is selected from the group consisting of glycerin, monoglycerides, diglycerides, polyethylene glycol, sorbitol, and mixtures thereof.

25. An article of manufacture as defined in claim 1, wherein the starch-bound cellular matrix further includes an organic particulate filler.

26. An article of manufacture as defined in claim 1, wherein the coating is applied to the outer skin portion of the starch-bound cellular as a liquid which subsequently hardens to form a liquid-tight barrier.

27. An article of manufacture as defined in claim 1, further including an additional coating applied to the outer skin portion of the starch-bound cellular matrix selected from the group consisting of other cellulosic ethers, cellulose acetate, other cellulose-based materials, polyethylene, mixtures of the foregoing, and derivatives of the foregoing.

28. An article of manufacture as defined in claim 1, wherein the coating further includes an inorganic coating material dispersed therein.

29. An article of manufacture as defined in claim 1, further including an inorganic coating material applied to the outer skin portion of the starch-bound cellular matrix selected from the group consisting of sodium silicate, calcium carbonate, aluminum oxide, silicon oxide, kaolin, clay, ceramics, and mixtures thereof.

30. An article of manufacture as defined in claim 1, wherein the coating is applied to the outer skin portion of the starch-bound cellular matrix as a laminating material.

31. An article of manufacture as defined in claim 30, wherein the laminating material is applied in the form of a substantially uniform film.

32. An article of manufacture as defined in claim 30, wherein the laminating material is applied in the form of a sheet.

33. An article of manufacture as defined in claim 30, wherein the laminating material is selected from the group consisting of polylactic acid, polyhydroxybutylate-hydroxyvalerate copolymer, other polyesters, polyvinyl alcohol, polyvinyl acetate, polyvinyl chloride, polyamides, melamine, hydroxypropylmethylcellulose, methylcellulose, and mixtures of the foregoing.

34. An article of manufacture as defined in claim 1, wherein the coating is utilized as an adhesive.

35. An article of manufacture as defined in claim 1, wherein the starch-bound cellular matrix degrades after prolonged exposure to water.

36. An article of manufacture comprising:
a starch-bound cellular matrix formed by gelatinizing a starch-based binder in water and then causing the starch-based binder to substantially harden by removing a substantial portion of the water by evaporation to thereby forming the starch-bound cellular matrix, wherein the starch-bound cellular matrix further includes optional components dispersed therein, has a thickness less than about 1 cm, and degrades after prolonged exposure to water; and
a coating applied to at least a portion of the starch-bound cellular matrix, wherein the coating comprises a biodegradable polymer selected from the group consisting of biodegradable polyamides, polyvinyl acetate, polyvinyl alcohol, starches, polylactic acid, polyhydroxybutyrate-hydroxyvalerate copolymer, other biodegradable polyesters, hydroxypropylmethylcellulose, methocel, soybean protein, and mixtures thereof.

37. An article of manufacture as defined in claim 36, wherein the starch-bound cellular matrix includes an outer skin portion having a density and an interior foam portion having a density that is significantly lower than the density of the outer skin portion.

38. An article of manufacture as defined in claim 36, wherein the coating is applied to the starch-bound cellular as a liquid which subsequently hardens to form a substantially solidified coating.

39. An article of manufacture as defined in claim 36, wherein the coating is applied to the starch-bound cellular as a laminating material.

40. An article of manufacture as defined in claim 36, wherein the coating is applied to the starch-bound cellular as an adhesive.

41. An article of manufacture as defined in claim 36, further including an additional coating applied to the outer skin portion of the starch-bound cellular matrix selected from the group consisting of other cellulosic ethers, cellulose acetate, other biodegradable cellulose-based polymer materials, other biodegradable polymers, polyethylene, waxes, derivatives of the foregoing, and mixtures of the foregoing.

42. A method for manufacturing articles of manufacture having a starch-bound cellular matrix comprising:
heating an aqueous starch-based mixture including starch and water in order to first gelatinize the starch and then cause it to substantially solidify as a result of evaporation of water therefrom to thereby form the starch-bound cellular matrix in a desired shape of the article of manufacture; and
applying a laminate film coating to at least a portion of the starch-bound cellular matrix.

43. A method as defined in claim 42, wherein the laminate film coating is a film or sheet comprising a plastic or elastomer selected from the group consisting of polylactic acid, polyhydroxybutyrate-hydroxyvalerate copolymer, other biodegradable polyesters, polyvinyl alcohol, polyvinyl acetate, polyvinyl chloride, polyamides, melamine, cellulosic others, cellulose acetate, other cellulosic polymers, starches, other biodegradable polymers, polyethylene, and mixtures of the foregoing.

44. A method as defined in claim 42, further including an inorganic filler dispersed within the laminating film.

45. A method as defined in claim 42, wherein the starch-based mixture further includes fibers dispersed therein.

46. A method as defined in claim 42, wherein the starch-based mixture further includes an inorganic filler dispersed therein.

47. A method as defined in claim 42, wherein the starch-bound cellular matrix has a thickness of less than about 5 mm.

48. A method as defined in claim 42, wherein the starch-bound cellular matrix includes an outer skin portion having a density and an interior foam portion having a density that is significantly less than the density of the outer skin portion.

49. A method for manufacturing articles of manufacture having a starch-bound cellular matrix comprising:
heating an aqueous starch-based mixture including starch and water in order to first gelatinize the starch and then cause it to substantially solidify as a result of evaporation of water therefrom to thereby form the starch-bound cellular matrix in a desired shape of the article of manufacture; and applying a coating to at least a portion of the starch-bound cellular matrix selected from the group consisting of edible oils, drying oils, melamine, phenolic resins, polyester resins, epoxy resins, terpene resins, urea-formaldehyde resins, styrene polymers, polyethylene, polyvinyl chloride, polyvinyl alcohol, polyvinyl acetate, polyacrylates, polyamides, hydroxypropylmethylcellulose, methocel, poyethylene glycol, acrylics, acrylic copolymers, polyurethane, polylactic acid, polyhydroxybutyrate-hydroxyvalerate copolymers, starches, soybean protein, waxes, and mixtures thereof.

50. A method as defined in claim 49, wherein the coating further includes an inorganic filler dispersed therein.

51. A method as defined in claim 49, wherein the starch-based mixture further includes an inorganic filler.

52. A method as defined in claim 49, wherein the starch-based mixture further includes fibers dispersed therein.

53. A method as defined in claim 49, wherein the coating is applied as a laminate film.

* * * * *

UNITED STATES PATENT AND TRADEMARK OFFICE
CERTIFICATE OF CORRECTION

PATENT NO.    : 6,030,673
DATED         : February 29, 2000
INVENTOR(S)   : Per Just Andersen; Simon K. Hodson It is certified that error appears in the above-identified patent and that said Letters Patent is hereby corrected as shown below:

Title page,
Other Publications,
Line 3, after "Academy of" change "TEchnical" to -- Technical --

Column 3,
Line 9, change "2,3,7.8" to -- 2,3,7,8 --
Line 39, after "significant" change "air." to -- air, --

Column 6,
Line 53, before "modulus" delete "II"
Line 54, after "strength," change "flexura" to -- flexural --

Column 8,
Line 27, change "(CaSo$_4$.1/2H$_2$O)" to -- (CaSo$_4$· 1/2H$_2$O) --
Line 31, change "(CaSo$_4$.2H$_2$O)" to -- (CaSo$_4$·2H$_2$O) --
Line 32, before "also" delete "be"

Column 9,
Line 31, after "bound to" insert a comma

Column 12,
Line 4, after "water" insert a comma

Column 16,
Line 40, change "object" to -- objects --

Column 17,
Line 66, after "thereby" insert -- fills --
Line 67, change "clogging" to -- clogs --

Column 20,
Line 45, change "Temperature" to -- Temperatures --

Column 23,
Line 37, after "molds" change "arc" to -- are --

Column 26,
Line 30, after "gelated" insert a comma
Line 30, after "Since" change "pro-gelated" to -- pre-gelated --

UNITED STATES PATENT AND TRADEMARK OFFICE
CERTIFICATE OF CORRECTION

PATENT NO. : 6,030,673
DATED : February 29, 2000
INVENTOR(S) : Per Just Andersen; Simon K. Hodson It is certified that error appears in the above-identified patent and that said Letters Patent is hereby corrected as shown below:

Column 27,
Line 9, after "invention" change "arc" to -- are --
Line 23, after "removed" change "form" to -- from --

Column 32,
Line 35, after "solvent" change "include" to -- includes --

Column 33,
Line 48, change "Anderson" to -- Andersen --

Column 34,
Line 54, change "perlite." to -- perlite, --

Column 35,
Line 41, after "such" change "a" to -- as --

Column 37,
Line 53, after "inorganically" insert -- filled --
Line 61, after "width" change "arc" to -- are --

Column 38,
Line 52, after "wich" change "precipitate" to -- precipitates --

Column 39,
Line 25, change " hydroxymethylethyicellulose," to -- hydroxymethylethycellulose, --
Line 26, change "ethyceliulose," to -- ethycellulose --

Column 40,
Line 24, after "Tylose®" insert -- ) --

Column 45,
Line 66, change "arc" to -- are --

Column 49,
Line 51, change "Acrosil" to -- Aerosil --

Column 52,
In Example 31, change "0.46" to -- 0.046 --

UNITED STATES PATENT AND TRADEMARK OFFICE
CERTIFICATE OF CORRECTION

PATENT NO.   : 6,030,673
DATED        : February 29, 2000
INVENTOR(S)  : Per Just Anderson; Simon K. Hodson It is certified that error appears in the above-identified patent and that said Letters Patent is hereby corrected as shown below:

Column 53,
In Example 40, change "0.79" to -- 0.17 --

Column 54,
Line 54, after "and the" change "prope rtics" to -- properties --

Column 58,
Line 30, after "prepared" insert a comma
Line 54, change "356" to -- 35.6 --
Line 58, after "expected" insert a comma Column 62,
Line 5, after "five" change "mixture" to -- mixtures --
Line 57, after "absorb" delete "II"

Column 65,
Line 52, after "higher" change "then" to -- than --
Line 63, change "particles, flowever," to -- particles. However, --

Column 68,
Line 4, after "having" change "wall" to -- walls --

Column 71,
Line 44, change "polyhydroxybutylate" to -- polyhydroxybutyrate --

Signed and Sealed this

Eleventh Day of September, 2001

*Attest:*

*Attesting Officer*

NICHOLAS P. GODICI
*Acting Director of the United States Patent and Trademark Office*